United States Patent
Plourde, Jr. et al.

(10) Patent No.: US 7,962,011 B2
(45) Date of Patent: Jun. 14, 2011

(54) CONTROLLING SUBSTANTIALLY CONSTANT BUFFER CAPACITY FOR PERSONAL VIDEO RECORDING WITH CONSISTENT USER INTERFACE OF AVAILABLE DISK SPACE

(76) Inventors: Harold J. Plourde, Jr., Lawrenceville, GA (US); Arturo A. Rodriguez, Norcross, GA (US)

( * ) Notice: Subject to any disclaimer, the term of this patent is extended or adjusted under 35 U.S.C. 154(b) by 1574 days.

(21) Appl. No.: 10/010,270

(22) Filed: Dec. 6, 2001

(65) Prior Publication Data

US 2003/0110513 A1    Jun. 12, 2003

(51) Int. Cl.
H04N 5/76 (2006.01)
H04N 5/445 (2011.01)
H04N 7/173 (2011.01)
H04N 7/16 (2011.01)

(52) U.S. Cl. .......... 386/295; 386/291; 386/294; 725/58; 725/133; 725/141; 725/153

(58) Field of Classification Search ............ 725/89, 725/134, 58, 133, 141, 153; 386/295, 291, 386/294
See application file for complete search history.

(56) References Cited

U.S. PATENT DOCUMENTS

| | | | |
|---|---|---|---|
| 4,706,121 A | 11/1987 | Young | |
| 4,908,713 A | 3/1990 | Levine | |
| 4,963,994 A | 10/1990 | Levine | |
| 5,253,066 A | 10/1993 | Vogel | |
| 5,262,856 A | 11/1993 | Lippman et al. | |
| 5,293,357 A | 3/1994 | Hallenbeck | |
| 5,343,250 A | 8/1994 | Iwamura | |
| 5,353,121 A | 10/1994 | Young et al. | 348/563 |
| 5,371,551 A | 12/1994 | Logan et al. | |
| 5,410,343 A | 4/1995 | Coddington et al. | |
| 5,438,423 A | 8/1995 | Lynch et al. | |
| 5,477,262 A | 12/1995 | Banker et al. | |
| 5,479,268 A | 12/1995 | Young et al. | |
| 5,508,815 A | 4/1996 | Levine | |
| 5,568,272 A | 10/1996 | Levine | |
| 5,600,573 A * | 2/1997 | Hendricks et al. | 725/109 |
| 5,661,526 A | 8/1997 | Hamamoto et al. | |
| 5,675,375 A | 10/1997 | Riffee | |
| 5,701,383 A | 12/1997 | Russo et al. | |

(Continued)

FOREIGN PATENT DOCUMENTS

EP        0 789 488        8/1997

(Continued)

OTHER PUBLICATIONS

Sanna et al., Special Edition Using Windows NT Workstation 4.0, Second Edition, pp. 128-143.*

(Continued)

Primary Examiner — Hoang-Vu A Nguyen-Ba
(74) Attorney, Agent, or Firm — Merchant & Gould, P.C.

(57) ABSTRACT

A system manages the allocation and storage of media content instance files in a hard disk of a storage device of a media client device in a subscriber television system. In one embodiment among others, the system includes a memory for storing logic, a buffer space in the hard disk for buffering media content instances as buffered media content instance files, and a processor configured with the logic to track the size of permanent media content instance files and the buffered media content instance files to provide an indication of available free space, such that the indication is independent of the buffer space.

44 Claims, 26 Drawing Sheets

U.S. PATENT DOCUMENTS

| | | |
|---|---|---|
| 5,724,646 A | 3/1998 | Ganek et al. |
| 5,809,204 A | 9/1998 | Young et al. |
| 5,854,887 A | 12/1998 | Kindell et al. |
| 5,864,639 A | 1/1999 | Chao |
| 5,889,920 A | 3/1999 | Compoint et al. |
| 5,900,885 A | 5/1999 | Stortz |
| 5,915,068 A | 6/1999 | Levine |
| 5,963,702 A | 10/1999 | Yamashita |
| 5,990,881 A | 11/1999 | Inoue et al. |
| 5,990,975 A | 11/1999 | Nan et al. |
| 5,999,691 A | 12/1999 | Takagi et al. |
| 6,002,832 A | 12/1999 | Yoneda |
| 6,014,727 A | 1/2000 | Creemer |
| 6,018,612 A | 1/2000 | Thomason et al. |
| 6,023,720 A | 2/2000 | Aref et al. |
| 6,029,160 A | 2/2000 | Cabrera et al. |
| 6,032,180 A | 2/2000 | Nishikawa |
| 6,052,562 A | 4/2000 | Dorenbosch |
| 6,055,314 A | 4/2000 | Spies et al. |
| RE36,801 E | 8/2000 | Logan et al. |
| 6,100,883 A | 8/2000 | Hoarty |
| 6,118,498 A | 9/2000 | Reitmeier |
| 6,118,834 A | 9/2000 | Rasenen |
| 6,163,335 A | 12/2000 | Barraclough |
| 6,175,871 B1 | 1/2001 | Schuster et al. |
| 6,177,931 B1 | 1/2001 | Alexander et al. |
| 6,211,858 B1 | 4/2001 | Moon et al. |
| 6,226,447 B1 | 5/2001 | Sasaki et al. |
| 6,230,220 B1 | 5/2001 | Cohen et al. |
| 6,233,389 B1 | 5/2001 | Barton et al. |
| 6,233,390 B1 | 5/2001 | Yoneda |
| 6,298,373 B1 | 10/2001 | Burns et al. |
| 6,311,011 B1 | 10/2001 | Kuroda |
| 6,330,252 B1 | 12/2001 | Shojima |
| 6,334,217 B1 | 12/2001 | Kim |
| 6,378,129 B1 | 4/2002 | Zetts .................... 725/94 |
| 6,385,386 B1 | 5/2002 | Aotake ................... 386/68 |
| 6,430,363 B2 | 8/2002 | Sasaki et al. |
| 6,445,872 B1 | 9/2002 | Sano et al. |
| 6,490,000 B1 | 12/2002 | Schaefer et al. |
| 6,501,397 B1* | 12/2002 | Radha et al. ............. 341/60 |
| 6,542,203 B1 | 4/2003 | Shadwell et al. |
| 6,543,053 B1 | 4/2003 | Li et al. .................... 725/88 |
| 6,591,421 B1 | 7/2003 | Sullivan |
| 6,594,329 B1 | 7/2003 | Susnow |
| 6,625,709 B2 | 9/2003 | Aiken et al. |
| 6,625,811 B1 | 9/2003 | Kaneko |
| 6,665,869 B1 | 12/2003 | Ellis et al. |
| 6,678,463 B1* | 1/2004 | Pierre et al. ............. 386/83 |
| 6,714,722 B1 | 3/2004 | Tsukidate |
| 6,744,967 B2 | 6/2004 | Kaminski et al. |
| 6,766,100 B1 | 7/2004 | Komar et al. |
| 6,775,843 B1 | 8/2004 | McDermott |
| 6,782,550 B1 | 8/2004 | Cao ....................... 725/39 |
| 6,798,971 B2 | 9/2004 | Potrebic |
| 6,803,968 B1 | 10/2004 | Numata |
| 6,850,691 B1 | 2/2005 | Stam et al. |
| 6,868,225 B1 | 3/2005 | Brown et al. |
| 6,920,567 B1 | 7/2005 | Doherty et al. |
| 6,971,121 B2 | 11/2005 | West et al. |
| 6,985,669 B1 | 1/2006 | Unger |
| 6,993,782 B1 | 1/2006 | Newberry et al. |
| 7,024,676 B2 | 4/2006 | Klopfenstein |
| 7,028,329 B1 | 4/2006 | Mizutani |
| 7,231,136 B2 | 6/2007 | Sasaki et al. |
| 7,257,308 B2 | 8/2007 | Plourde, Jr. et al. |
| 7,409,140 B2 | 8/2008 | Rodriguez et al. |
| 7,512,315 B2 | 3/2009 | Kaminski |
| 7,522,817 B2 | 4/2009 | Srinivasan et al. |
| 7,577,336 B2 | 8/2009 | Srinivasan et al. .......... 386/95 |
| 2001/0002224 A1 | 5/2001 | Sasaki et al. |
| 2001/0019658 A1 | 9/2001 | Barton et al. |
| 2001/0028782 A1 | 10/2001 | Ohno et al. |
| 2001/0033343 A1 | 10/2001 | Yap et al. |
| 2001/0033736 A1 | 10/2001 | Yao et al. |
| 2001/0043800 A1 | 11/2001 | Gotoh et al. |
| 2001/0051037 A1 | 12/2001 | Safadi et al. |
| 2002/0009285 A1 | 1/2002 | Safadi et al. |
| 2002/0019984 A1* | 2/2002 | Rakib ................... 725/111 |
| 2002/0037160 A1 | 3/2002 | Locket et al. |
| 2002/0040475 A1* | 4/2002 | Yap et al. ................. 725/39 |
| 2002/0046404 A1 | 4/2002 | Mizutani |
| 2002/0059623 A1 | 5/2002 | Rodriguez et al. |
| 2002/0071653 A1 | 6/2002 | Cowley et al. |
| 2002/0076195 A1 | 6/2002 | Nakajima et al. |
| 2002/0090004 A1 | 7/2002 | Rinchiuso |
| 2002/0110352 A1 | 8/2002 | Potrebic et al. |
| 2002/0146233 A1 | 10/2002 | Barton et al. |
| 2002/0168178 A1 | 11/2002 | Rodriguez et al. |
| 2002/0174430 A1* | 11/2002 | Ellis et al. ................ 725/46 |
| 2002/0174445 A1 | 11/2002 | Miller et al. |
| 2002/0199185 A1 | 12/2002 | Kaminski et al. |
| 2003/0028706 A1 | 2/2003 | Okada |
| 2003/0035650 A1 | 2/2003 | Demas et al. |
| 2003/0040962 A1 | 2/2003 | Lewis |
| 2003/0068154 A1 | 4/2003 | Zylka |
| 2003/0095792 A1 | 5/2003 | Ogikubo |
| 2003/0099458 A1 | 5/2003 | Mizukami et al. |
| 2003/0108331 A1 | 6/2003 | Plourde et al. |
| 2003/0110504 A1 | 6/2003 | Plourde et al. ............ 725/89 |
| 2003/0110513 A1 | 6/2003 | Plourde et al. |
| 2003/0128302 A1 | 7/2003 | Potrebic et al. |
| 2003/0156826 A1 | 8/2003 | Sonoda et al. |
| 2003/0206719 A1 | 11/2003 | Bumgardner et al. |
| 2003/0215211 A1 | 11/2003 | Coffin |
| 2003/0228126 A1 | 12/2003 | Buxton |
| 2003/0231855 A1 | 12/2003 | Gates et al. |
| 2003/0235391 A1 | 12/2003 | Gates et al. |
| 2004/0005142 A1 | 1/2004 | Yoo et al. |
| 2004/0013406 A1 | 1/2004 | Barton et al. |
| 2004/0042103 A1 | 3/2004 | Mayer |
| 2004/0091249 A1 | 5/2004 | Mekenkamp et al. |
| 2004/0175094 A1 | 9/2004 | Mautner et al. |
| 2004/0184776 A1 | 9/2004 | Inoue et al. |
| 2004/0197078 A1 | 10/2004 | Yoon et al. |
| 2004/0208477 A1 | 10/2004 | Bumgardner et al. |
| 2004/0218905 A1 | 11/2004 | Green et al. |
| 2004/0228609 A1 | 11/2004 | Nakamura et al. |
| 2004/0240840 A1 | 12/2004 | Ledermann et al. |
| 2004/0258389 A1 | 12/2004 | Castillo |
| 2004/0258396 A1 | 12/2004 | Nakamura et al. |
| 2005/0002638 A1 | 1/2005 | Putterman et al. |
| 2005/0002639 A1 | 1/2005 | Putterman et al. |
| 2005/0002640 A1 | 1/2005 | Putterman et al. |
| 2005/0041954 A1 | 2/2005 | Austin |
| 2005/0047749 A1 | 3/2005 | Kaibe |
| 2005/0078938 A1 | 4/2005 | Crohas |
| 2005/0111819 A1 | 5/2005 | Cormack et al. |
| 2005/0111838 A1 | 5/2005 | Arishima |
| 2005/0120373 A1 | 6/2005 | Thomas et al. |
| 2005/0132418 A1 | 6/2005 | Barton et al. |
| 2005/0158029 A1 | 7/2005 | Irikuchi et al. |
| 2005/0259961 A1 | 11/2005 | Sano |
| 2005/0259962 A1 | 11/2005 | Sano et al. |
| 2005/0259963 A1 | 11/2005 | Sano et al. |
| 2005/0265694 A1 | 12/2005 | Green et al. |
| 2005/0276567 A1 | 12/2005 | Okuyama et al. |
| 2006/0002682 A1 | 1/2006 | Kanamori |
| 2006/0045472 A1 | 3/2006 | Poslinski |
| 2006/0051059 A1 | 3/2006 | Krakirian et al. |
| 2006/0140584 A1* | 6/2006 | Ellis et al. ................ 386/83 |
| 2006/0153523 A1 | 7/2006 | Ishida et al. |
| 2006/0177197 A1 | 8/2006 | Nakamura et al. |
| 2006/0188221 A1 | 8/2006 | Kee |
| 2006/0206912 A1* | 9/2006 | Klarfeld et al. ............ 725/40 |
| 2006/0228096 A1 | 10/2006 | Hoshino et al. |
| 2006/0239659 A1 | 10/2006 | Chng |
| 2007/0047919 A1 | 3/2007 | Yoshida et al. |
| 2007/0077028 A1 | 4/2007 | Bodkin et al. |
| 2007/0110393 A1 | 5/2007 | Jang |
| 2007/0154174 A1 | 7/2007 | Sasaki et al. |
| 2007/0226767 A1 | 9/2007 | Kaminski ................. 725/94 |
| 2008/0013920 A1 | 1/2008 | Plourde et al. ............ 386/83 |
| 2008/0138033 A1 | 6/2008 | Rodriguez et al. ......... 386/92 |
| 2008/0181574 A1 | 7/2008 | Ellis et al. ................ 386/83 |
| 2009/0196568 A1 | 8/2009 | Kaminski et al. .......... 386/46 |
| 2010/0251284 A1 | 9/2010 | Ellis et al. |

FOREIGN PATENT DOCUMENTS

| | | |
|---|---|---|
| EP | 0 936 615 | 8/1999 |
| EP | 1 014 715 | 6/2000 |
| EP | 1 113 668 | 7/2001 |
| JP | 2-228842 | 9/1990 |
| WO | WO 92/22983 * | 12/1992 |
| WO | WO 9222983 * | 12/1992 |
| WO | WO 96/41740 | 12/1996 |
| WO | WO 99/65237 | 12/1999 |
| WO | WO 00/04726 | 1/2000 |
| WO | WO 00/27114 | 5/2000 |
| WO | WO 00/58967 | 10/2000 |
| WO | WO 00/60500 | 10/2000 |
| WO | WO 00/60591 | 10/2000 |
| WO | WO 01/82600 | 11/2001 |
| WO | WO 02/093299 A2 | 11/2002 |
| WO | WO 02/093901 A2 | 11/2002 |
| WO | WO 03/051044 A1 | 6/2003 |
| WO | WO 03/051047 A1 | 6/2003 |
| WO | WO 03/051052 A1 | 6/2003 |
| WO | WO 03/081915 A1 | 10/2003 |

OTHER PUBLICATIONS

Scientific-Atlanta, Inc. Pending U.S. Appl. No. 10/008,624, filed Dec. 6, 2001, Title: "Converting Time-Shift Buffering for Personal Video Recording Into Permanent Recordings," Inventors: Harold J. Plourde, Jr. and Arturo A. Rodriguez.

Scientific-Atlanta, Inc. Pending U.S. Appl. No. 10/008,439, filed Dec. 6, 2001, Title: "Dividing and Managing Time-Shift Buffering Into Program Specific Segments Based on Defined Durations," Inventors: Harold J. Plourde, Jr. and Arturo A. Rodriguez.

Scientific-Atlanta, Inc. Pending U.S. Appl. No. 10/010,781, filed Dec. 5, 2001, Title: "Application Management and Interface for Cluster Control of Time Shift Buffer," Inventor: Harold J. Plourde, Jr.

Scientific-Atlanta, Inc. Pending U.S. Appl. No. 10/005,628, filed Dec. 5, 2001, Title: "Disk Driver Cluster Management of Time Shift Buffer with File Allocation Table Structure," Inventor: Harold J. Plourde, Jr.

Scientific-Atlanta, Inc. Pending U.S. Appl. No. 10/015,349, filed Dec. 11, 2001, Title: "Controlling Personal Video Recording Functions from Interactive Television," Inventors: Mark E. Schutte and Valerie G. Gutknecht.

Scientific-Atlanta, Inc. Pending U.S. Appl. No. 10/034,028, filed Dec. 20, 2001, Title: "Program Position User Interface for Personal Video Recording Time Shift Buffer," Inventors: Dariusz S. Kaminski and Robert O. Banker.

Scientific-Atlanta, Inc. Pending U.S. Appl. No. 10/102,043, filed Mar. 20, 2002, Title: "Composite Buffering," Inventors: John Eric West and Arturo A. Rodriguez.

Scientific-Atlanta, Inc. Pending U.S. Appl. No. 10/143,123, filed May 10, 2002, Title: "Channel Buffering and Display Management System for Multi-Tuner Set-Top Box," Inventors: Arturo A. Rodriguez and Ramesh Nallur.

Scientific-Atlanta, Inc. Pending U.S. Appl. No. 10/143,647, filed May 10, 2002, Title: "Managing Time Shift Buffers," Inventors: Dariusz S. Kaminski, Arturo A. Rodriguez, Robert O. Banker and Valerie G. Gutknecht.

U.S. Official Action mailed Oct. 21, 2004 in U.S. Appl. No. 10/102,043.

U.S. Official Action mailed May 3, 2006 in U.S. Appl. No. 10/008,624.

U.S. Official Action mailed Oct. 19, 2006 in U.S. Appl. No. 10/008,624.

U.S. Official Action mailed Jan. 17, 2007 in U.S. Appl. No. 10/143,647.

U.S. Official Action mailed May 21, 2007 in U.S. Appl. No. 10/143,647.

U.S. Official Action mailed Nov. 19, 2007 in U.S. Appl. No. 10/143,647.

U.S. Official Action mailed Jun. 9, 2008 in U.S. Appl. No. 10/008,439.

Ex Parte Quayle mailed Jun. 11, 2008 in U.S. Appl. No. 10/143,647.

U.S. Official Action mailed Jan. 27, 2009 in U.S. Appl. No. 10/008,439.

U.S. Official Action mailed Jul. 22, 2009 in U.S. Appl. No. 11/751,754.

U.S. Official Action mailed Aug. 21, 2009 in U.S. Appl. No. 10/008,439.

European Search Report cited in Application No. 02 747 828.8 mailed Jul. 3, 2009.

International Search Report cited in Application No. PCT/US02/38868 mailed Mar. 26, 2003.

International Search Report cited in Application No. PCT/US02/38778 mailed Apr. 3, 2003.

International Search Report cited in Application No. PCT/US02/38777 mailed Apr. 4, 2003.

International Search Report cited in Application No. PCT/US02/14887 mailed Nov. 12, 2002.

International Search Report cited in Application No. PCT/US02/14874 mailed Nov. 20, 2002.

International Search Report cited in Application No. PCT/US03/08597 mailed Jul. 11, 2003.

Supplementary European Search Report cited in Application No. 02 804 729.8 mailed Jun. 21, 2007.

Supplementary European Search Report cited in Application No. 02 791 374.8 mailed Feb. 13, 2009.

Supplementary European Search Report cited in Application No. 02 736 739.0 mailed Mar. 23, 2009.

Supplementary European Search Report cited in Application No. 03 745 157.2 mailed Jun. 19, 2008.

PCT Written Opinion in Application No. PCT/US02/38868 dated Sep. 25, 2003.

PCT Written Opinion in Application No. PCT/US02/38778 dated Oct. 27, 2003.

PCT Written Opinion in Application No. PCT/US02/38777 dated Oct. 28, 2003.

PCT Written Opinion in Application No. PCT/US02/14874 dated Feb. 11, 2003.

PCT Written Opinion of the International Preliminary Examining Authority in Application No. PCT/US03/08597 dated Oct. 28, 2004.

Canadian Office Action dated Mar. 31, 2009 cited in Application No. 2,571,256.

Canadian Office Action dated Jun. 22, 2006 cited in Application No. 2,446,604.

Canadian Office Action dated Jan. 11, 2007 cited in Application No. 2,446,617.

Canadian Office Action dated Sep. 16, 2008 cited in Application No. 2,446,617.

Canadian Office Action dated Feb. 13, 2009 cited in Application No. 2,469,542.

Canadian Office Action dated Mar. 19, 2007 cited in Application No. 2,469,554.

Canadian Office Action dated Apr. 8, 2008 cited in Application No. 2,469,558.

Canadian Office Action dated Feb. 10, 2009 cited in Application No. 2,479,347.

European Examination dated Nov. 14, 2007 cited in Application No. 02 804 729.8.

European Examination dated Apr. 2, 2009 cited in Application No. 02 794 161.6.

Dish Network DVR/PVR Receiver-DVR Receiver (Dual-Turner), DVR 921 High Definition; DVR Receiver (Dual-Turner), found at www.afreedish.com/com/dish-network-dvr-receiver.html; 4 pgs.; printed Jul. 13, 2007.

Motorola-Connected Home Solutions-Digital Video Solutions-DCH3416 Host Set-top; DCH3416 Host set-top; found at http://broadband.motorola.com/ business/digitalvideo/product_dch3416_settop.asp; 2 pgs.; printed Jul. 13, 2007.

Motorola DVR; entitled "Motorola Dual-Tuner DVR High-Definition Set-top DCT6412"; found at http://broadband.motorola.com/dvr/dct6412asp; 4 pgs.; printed Jul. 13, 2007.

IPTV Dual Turner SD-DVR; entitled "Pace Introduces Vegas DVR Product"; found at http://www.iptv.industry.com/ar/3o.htm; 3 pgs.; printed Jul. 13, 2007.

Mavromatic; entitled "Pioneer's Dual Tuner HD-DVR"; found at http://www.mavromatic.com/archives/000228; 4 pgs.; printed Jul. 13, 2007.

U.S. Official Action mailed Dec. 1, 2009 in U.S. Appl. No. 11/751,754.

European Examination dated Oct. 13, 2009 cited in Appln No. 02 736 739.0.

European Examination dated Oct. 22, 2009 cited in Appln No. 02 794 161.6.

U.S. Official Action mailed Jan. 22, 2010 in U.S. Appl. No. 10/008,439.

U.S. Official Action mailed Oct. 7, 2010 in U.S. Appl. No. 10/008,439.

U.S. Official Action mailed Jun. 18, 2010 in U.S. Appl. No. 11/751,754.

Canadian Office Action dated Dec. 20, 2010 cited in Appln No. 2,446,604.

Canadian Office Action dated Apr. 14, 2010 cited in Appln No. 2,469,542.

Canadian Office Action dated Apr. 12, 2010 cited in Appln No. 2,479,347.

Canadian Office Action dated Oct. 19, 2010 cited in Appln No. 2,469,554.

European Examination dated May 25, 2010 cited in Appln No. 02 791 374.8.

Raadt et al., "Cryptography in OpenBSD: An Overview," In Proc. Of the 1999 USENIX Annual Technical Conference, Freenix Track, Jun. 1999, pp. 93-101.

U.S. Final Official Action mailed Jan. 21, 2011 in U.S. Appl. No. 11/751,754.

European Examination dated Dec. 17, 2009 cited in Appln No. 02 747 828.8.

U.S. Final Official Action mailed Jan. 21, 2011 in U.S. Appl. No. 11/751,754.

U.S. Non-final Official Action mailed Apr. 13, 2011 in U.S. Appl. No. 10/008,439.

* cited by examiner

```
typedef struct {
    char * avFilename;     /* filename of A/V file (media content instance) */
    char * programData;    /* EPG guide data about media content instance   */
    int    record;         /* 0 = temporary, 1 = "recorded"                 */
    long   startTime;      /* starting time of buffering media content instance */
}avFileData;
```

```
typedef struct {
    tsbNode    *nextNode;  /* pointer to next media content instance     */
    tsbNode    *prevNode;  /* pointer to previous media content instance */
    avFileData *nodeData;  /* data for current media content instance    */
}tsbNode;
```

FIG. 10B

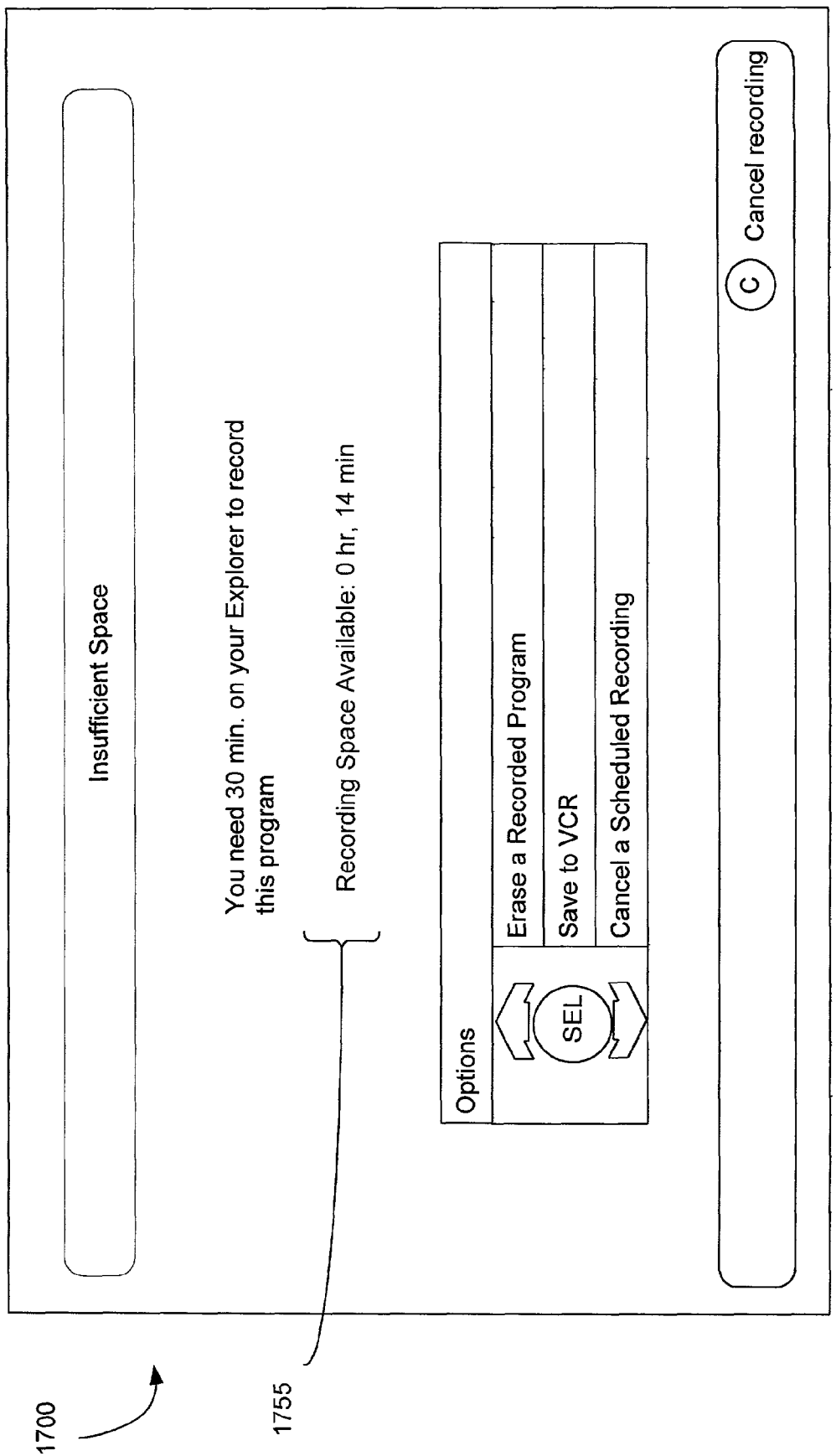

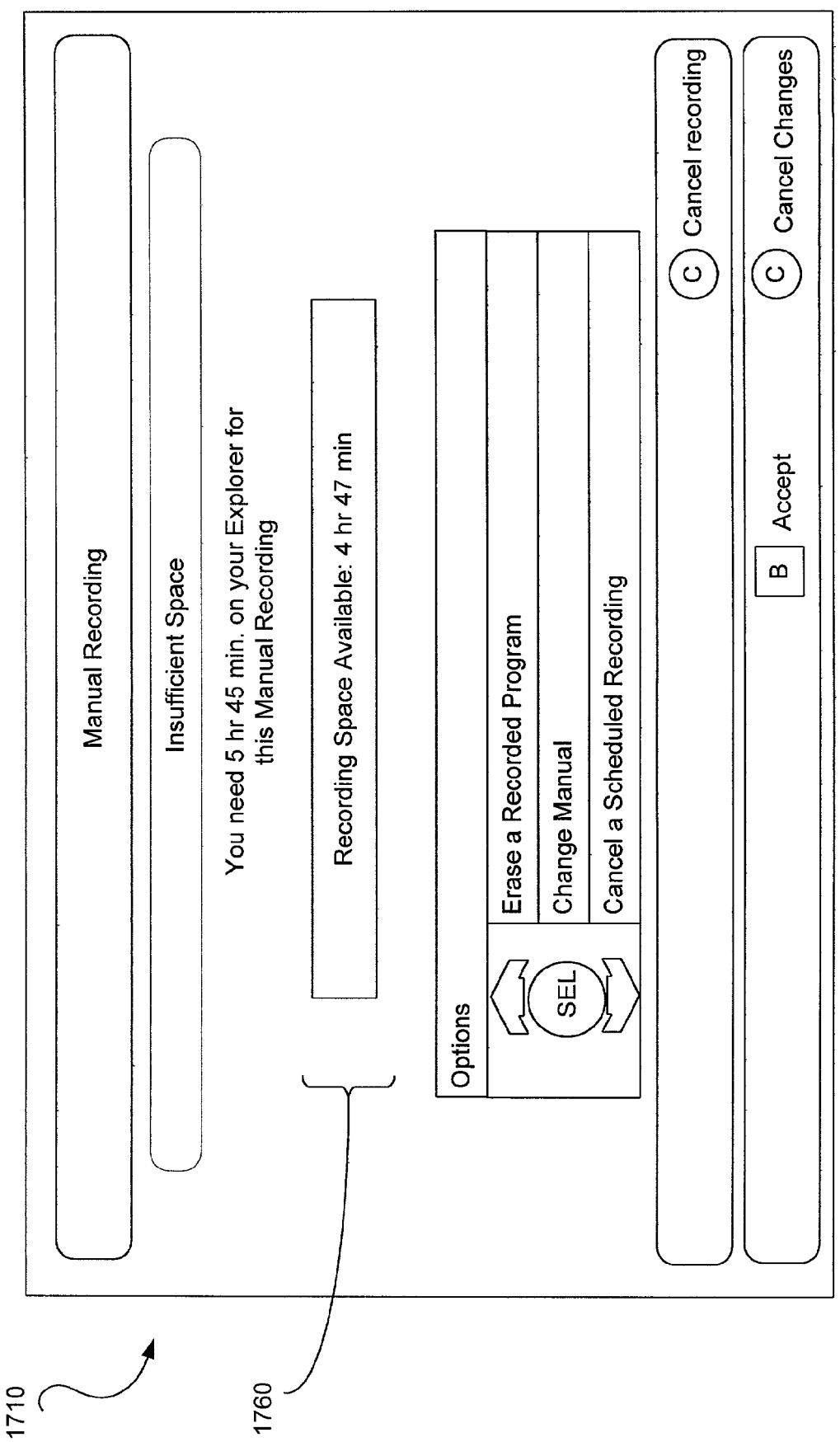

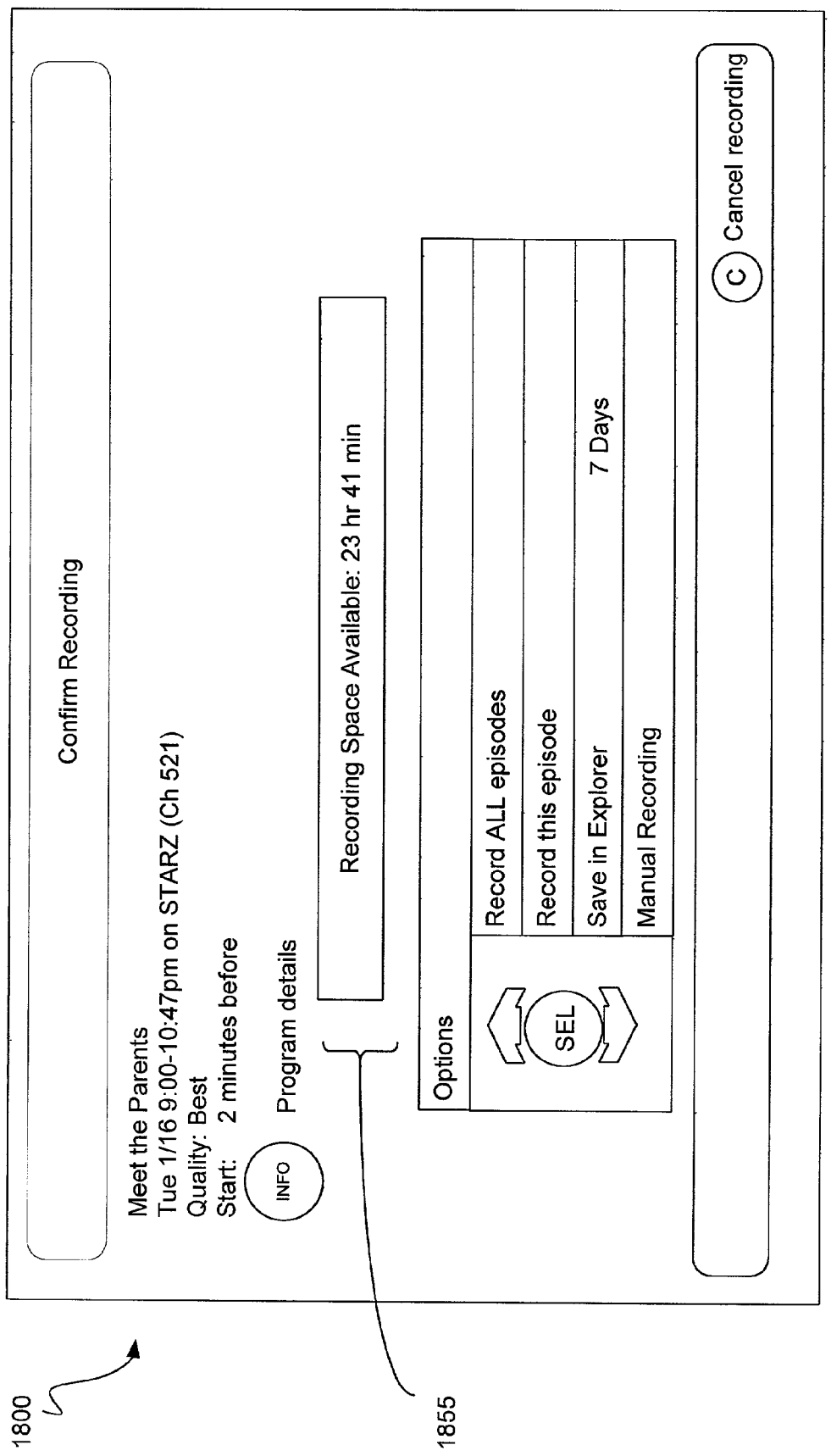

CONTROLLING SUBSTANTIALLY CONSTANT BUFFER CAPACITY FOR PERSONAL VIDEO RECORDING WITH CONSISTENT USER INTERFACE OF AVAILABLE DISK SPACE

CROSS-REFERENCE TO RELATED APPLICATIONS

This application is related to copending U.S patent applications entitled "CONVERTING TIME-SHIFT BUFFERING FOR PERSONAL VIDEO RECORDING INTO PERMANENT RECORDINGS" and "DIVIDING AND MANAGING TIME-SHIFT BUFFERING INTO PROGRAM SPECIFIC SEGMENTS BASED ON DEFINED DURATIONS," which are being filed on the same day as the present application and are both hereby entirely incorporated herein by reference.

TECHNICAL FIELD

The present invention is generally related to television systems, and, more particularly, is related to a system and method for maintaining a time shift buffer.

BACKGROUND OF THE INVENTION

With recent advances in digital transmission technology, subscriber television systems are now capable of providing much more than the traditional analog broadcast video. In implementing enhanced programming, the home communication terminal device ("HCT"), otherwise known as the set-top box, has become an important computing device for accessing media content services (and media content within those services) and navigating a user through a maze of available services. In addition to supporting traditional analog broadcast video functionality, digital HCTs (or "DHCTs") now also support an increasing number of two-way digital services such as video-on-demand and personal video recording.

Typically, a DHCT is connected to a cable or satellite, or generally, a subscriber television system, and includes hardware and software necessary to provide the functionality of the digital television system at the user's site. Preferably, some of the software executed by a DHCT is downloaded and/or updated via the subscriber television system. Each DHCT also typically includes a processor, communication components, and memory, and is connected to a television or other display device, such as a personal computer. While many conventional DHCTs are stand-alone devices that are externally connected to a television, a DHCT and/or its functionality may be integrated into a television or personal computer or even an audio device such as a programmable radio, as will be appreciated by those of ordinary skill in the art.

DHCTs are typically capable of providing users with a very large number and variety of media content choices. As the number of available media content choices increases, viewing conflicts arise whereby the user must choose between watching two or more media content instances (e.g. discrete, individual instances of media content such as, for a non-limiting example, a particular television show or "program"), all of which the user would like to view. Further, because of the large number of viewing choices, the user may miss viewing opportunities. Buffering of media content instances in memory, or more recently, in storage devices (e.g. hard disk drives) coupled to the DHCT, has provided some relief from the conflict in viewing choices. However, current buffering mechanisms for personal video recording are confusing to the user, and inefficient. Therefore, there exists a need to make it easier and more convenient for users to view a plurality of desirable media content instances.

Thus, a heretofore unaddressed need exists in the industry to address the aforementioned deficiencies and inadequacies.

BRIEF DESCRIPTION OF THE DRAWINGS

The preferred embodiments of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

FIG. 10A is a programming diagram of example software programming code in conventional "C" computer language for keeping a data record for a management file associated with audio/video media content instance file stored in the time shift buffer, in accordance with one embodiment of the invention.

FIG. 10B is a programming diagram of example software programming code in conventional "C" computer language for providing a linked management file for each media content instance file in the time shift buffer, in accordance with one embodiment of the invention.

FIG. 17A is a screen diagram of an example screen display barker, with consistent free space indication, that can be overlaid on the display of a currently viewed media content instance after the permanent recording sequence has begun for a scheduled permanent recording, in accordance with one embodiment of the invention.

FIG. 17B is an example screen display barker, with consistent free space indication, that can be overlaid on the display of a currently viewed media content instance after the permanent recording sequence has begun for a manual permanent recording, in accordance with one embodiment of the invention.

FIG. 18 is a screen diagram of an example confirm recording screen display, with consistent free space indication, in accordance with one embodiment of the invention.

DETAILED DESCRIPTION OF THE PREFERRED EMBODIMENTS

The preferred embodiments of the invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those having ordinary skill in the art. Furthermore, all "examples" given herein are intended to be non-limiting and among others.

Figure 1A:
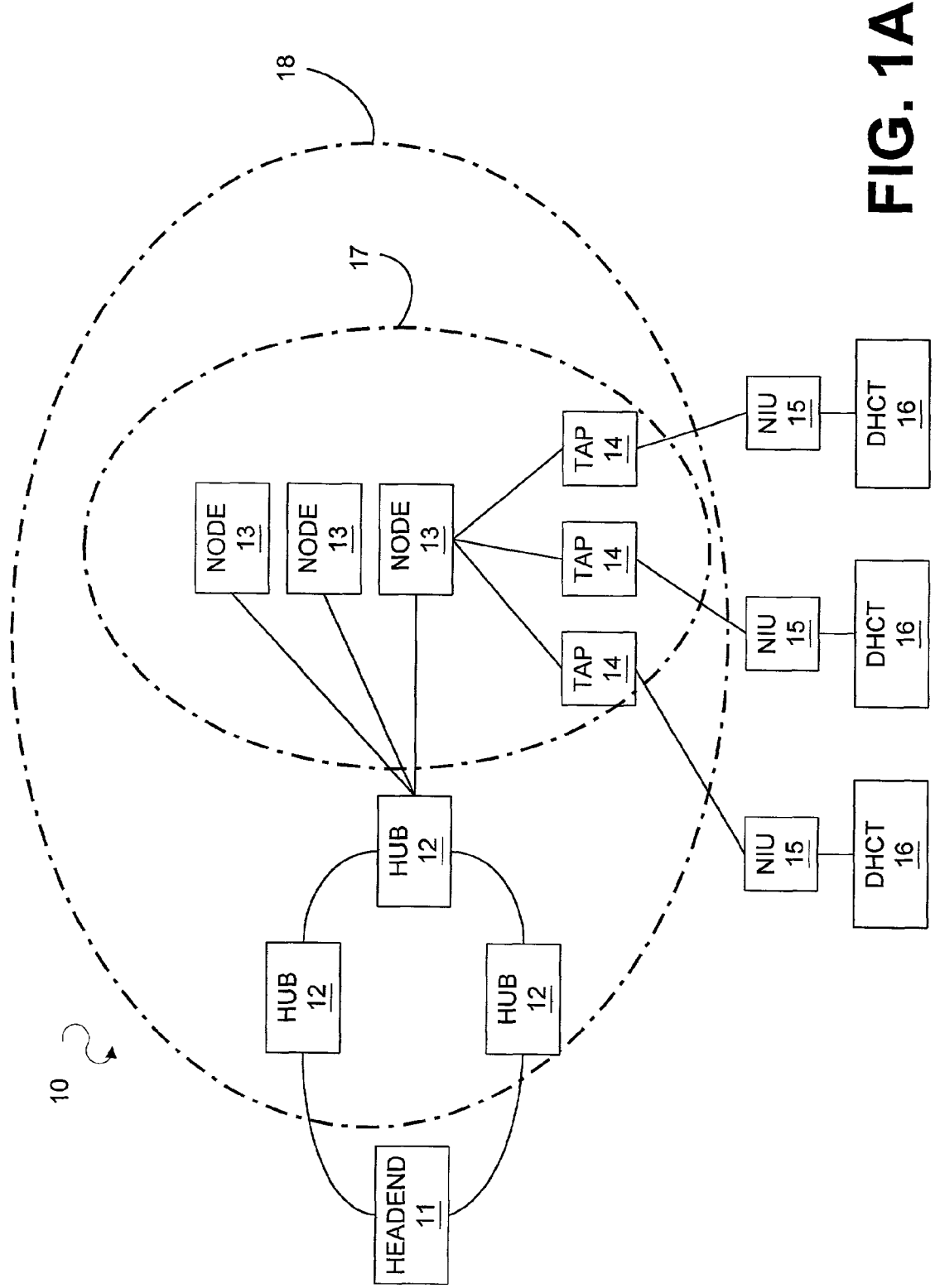
FIG. 1A is a block diagram of an example subscriber television system in accordance with one embodiment of the invention.

One embodiment of the present invention is generally implemented as part of a subscriber television system such as a digital broadband delivery system (DBDS) or cable television system (CTS). For example, a subscriber television system (STS) and its operation will be described initially, with the understanding that other conventional data delivery systems are within the scope of the preferred embodiments of the present invention. FIG. 1A shows a block diagram view of a subscriber television system (STS) 10, which is generally a high quality, reliable and integrated network system that is preferably capable of delivering video, audio, voice and data services to digital home communication terminals (DHCTs) 16. Although FIG. 1A depicts a high level view of a CTS 10, it should be appreciated that a plurality of subscriber television systems can tie together a plurality of regional networks into an integrated global network so that DHCT users can receive media content provided from anywhere in the world.

Further, it will be appreciated that the STS 10 shown in FIG. 1A is merely illustrative and should not be construed as implying any limitations upon the scope of the preferred embodiments of the present invention. For instance, subscriber television systems also included within the scope of the preferred embodiments of the invention include systems not utilizing physical structured cabling for transmission, such as, but not limited to, satellite systems. Further, transmission media included within the scope of the preferred embodiments of the invention include, but are not limited to, hybrid fiber/coax (HFC), optical, satellite, radio frequency (RF), frequency modulated (FM), and microwave. Further, data provided from the headend 11 to the DHCTs 16 and programming necessary to perform the functions discussed below will be understood to be present in the STS 10, in accordance with the description below.

The STS 10 preferably delivers broadcast video signals as digitally formatted signals in addition to delivering traditional broadcast analog video signals. Furthermore, the system can preferably support one way broadcast services as well as both one-way data services and two-way media content and data services. The two-way operation of the network preferably allows for user interactivity with services, such as Pay-Per-View programming, Near Video-On-Demand (NVOD) programming according to any of several known NVOD implementation methods, View-on-Demand (VOD) programming (according to any of several VOD implementation methods), and interactive applications, such as Internet connections.

The STS 10 also provides the interfaces, network control, transport control, session control, and servers to access media content from media content services, and distributes media content to DHCT users. As shown in FIG. 1A, a typical STS 10 comprises a head end 11, hubs 12, an HFC access network 17, and DHCTs 16. It should be appreciated that although a single component (e.g. a head end) is illustrated in FIG. 1A, a STS 10 can feature a plurality of any one of the illustrated components or may be configured with alternative embodiments for any one of the individual components or with yet other additional components not enumerated above.

Media content provided by one or more content providers (not shown) is communicated by the content providers to one or more head ends 11. From those head ends 11 the media content is then communicated over a communications network 18 that includes a plurality of HFC access networks 17 (only one HFC access network 17 is illustrated). The HFC access network 17 typically comprises a plurality of HFC nodes 13, each of which may serve a local geographical area. The hub 12 connects to the HFC node 13 through a fiber portion of the HFC access network 17. The HFC node 13 is connected to a tap 14 which, in one implementation, is connected to a network interface unit (NIU) 15 which is connected to a digital home communication terminal (DHCT) 16. In other implementations, the HFC node 13 is connected directly to a DHCT 16. The NIU 15, when implemented, is normally located at a user's property and provides a transparent interface between the HFC node 13 and the users' internal wiring. Coaxial cables are typically used to couple nodes 13, taps 14 and NIUs 15 because the electrical signals can be easily repeated with radio frequency (RF) amplifiers. As the high-level operations of many of the functions of a subscriber television system (STS) 10 are well known to those of ordinary skill in the art, further high level description of the overall STS 10 of FIG. 1A will not be contained herein.

Figure 1B:
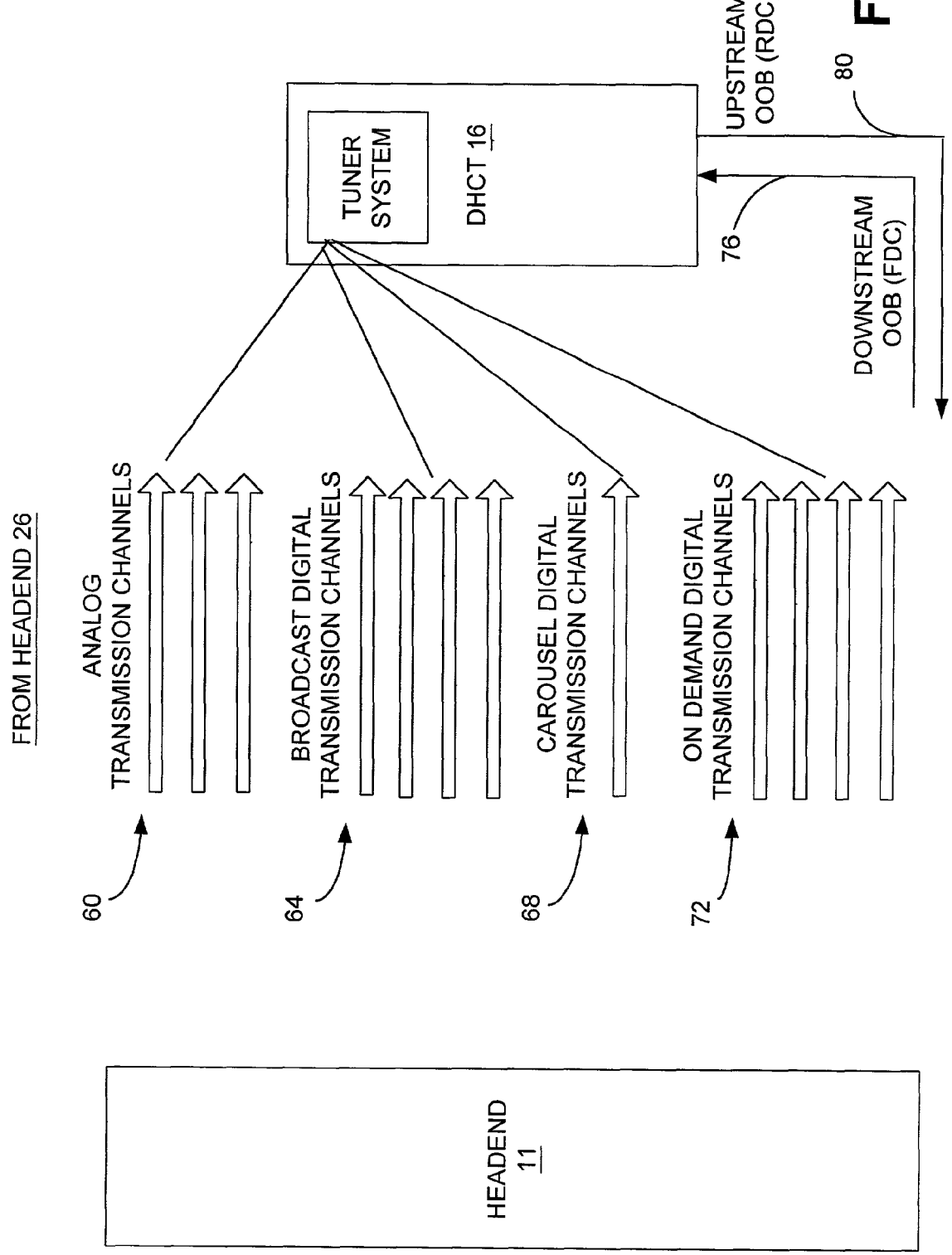
FIG. 1B shows a block diagram of the transmission signals supported by the subscriber television system of FIG. 1A, and input into the DHCT from the headend, in accordance with one embodiment of the invention.

FIG. 1B is a block diagram illustrating the transmission signals supported by the STS 10 (FIG. 1A), where the transmission signals 60, 64, 68, 72 and 76 are input into a DHCT 16 in accordance with one embodiment of the invention. Preferably, one or more content providers (not shown) provide the content that is included in the transmission signals. Transmission signals can be generated at a headend 11 or at a hub 12 (FIG. 1A) that might function as a mini-headend and which therefore possesses some of the headend functionality. In some implementations, the transmission signals can be provided by one or more of the content providers.

As depicted in FIG. 1B, the STS 10 (FIG. 1A) can simultaneously support a number of transmission signal types, transmission rates, and modulation formats. The ability to carry analog and digital signals over a large bandwidth are characteristics of a Hybrid Fiber/Coax (HFC) Network typically employed in a STS, as in the STS 10 of FIG. 1A. As will be appreciated by those of ordinary skill in the art, analog and digital signals in HFC networks can be multiplexed using Frequency Division Multiplexing (FDM), which enables many different types of signals to be transmitted over the STS 10 to the DHCT 16. Typically, a STS 10 using HFC supports downstream (i.e., in the direction from the headend 11 to the DHCT 16) frequencies from 50 MHz to 870 MHz, whereas upstream frequencies (i.e., in the direction from the DHCT 16 to higher levels of the system) are in the 5 MHz to 42 MHz band. Generally, the RF bandwidth spacing for analog and digital services is 6 MHz. Furthermore, for a typical 870 MHz system in the U.S., a possible downstream RF spectrum subdivision plan uses 6 MHz spaced frequency subdivisions, or spans, within the 50 MHz to 550 MHz band for analog video transmission signals and within the 550 MHz to 870 MHz range for digital transmission signals. The Analog Transmission Signals (ATSS) 60 shown in FIG. 1B are typically broadcast in 6 MHz frequency subdivisions, typically referred to in analog broadcasting as channels, having an analog broadcast signal composed of analog video and analog audio, and include Broadcast TV Systems Committee (BTSC) stereo and Secondary Audio Program (SAP) audio.

Referring again to FIG. 1B, the downstream direction transmission signals, having been multiplexed, and in one embodiment using frequency division multiplexing (FDM), are often referred to as in-band transmission signals and include Analog Transmission Signals (ATSs) 60 and Digital Transmission Signals (DTS) 64, 68, 72 (also known as Digital Transport Signals). These transmission signals carry video, audio and data services. For example, these transmission signals may carry television signals, Internet data, or any additional types of data, such as Electronic Program Guide (EPG) data. Additionally, as will be appreciated by those of ordinary skill in the art, additional data can be sent with the analog video image in the Vertical Blanking Interval (VBI) of the video signal and stored in DHCT memory or a DHCT local physical storage device (not shown). It should be appreciated, however, that the amount of data that can be transmitted in the VBI of the analog video signal is typically significantly less than data transmitted in a DTS.

Like the ATSs 60, the DTCs 64, 68, 72 each occupies 6 MHz of the RF spectrum. However, the DTSs 64, 68, 72 are digital transmission signals consisting of 64- or 256-Quadrature Amplitude Modulated (QAM) digital signals formatted as MPEG-2 transport streams, allocated in a separate frequency range. As will be described in more detail below, the MPEG-2 transport stream enables transmission of a plurality of DTS types over each 6 MHz RF spacing, as compared to a 6 MHz ATS. The three types of digital transport signals illustrated in FIG. 1B include broadcast digital transmission signals 64, carousel digital transmission signals 68, and on-demand transmission signals 72.

MPEG-2 transport may be used to multiplex video, audio, and data in each of these Digital Transmission Signals (DTSs). However, because an MPEG-2 transport stream allows for multiplexed video, audio, and data into the same stream, the DTSs do not necessarily have to be allocated in separate 6 MHz RF frequencies, unlike ATSs 60. On the other hand, each DTS is capable of carrying multiple broadcast digital media content instances, multiple cycling data carousels containing broadcast data, and data requested on-demand by the subscriber. Data is formatted, such as in Internet Protocol (IP), mapped into MPEG-2 packets, and inserted into the multiplexed MPEG-2 transport stream. Encryption can be applied to the data stream for security so that the data may be received only by authorized DHCTs. The authorized DHCT 16 is provided with the mechanisms to receive, among other things, additional data or enhanced services. Such mechanisms can include "keys" that are required to decrypt encrypted data.

Each 6 MHz RF subdivision assigned to a digital transmission signal can carry the video and audio streams of the media content instances of multiple television (TV) stations, as well as media content and data that is not necessarily related to those TV media content instances, as compared to one TV channel broadcast over one ATS 60 that consumes the entire 6 MHz. The digital data is inserted into MPEG transport streams carried through each 6 MHz frequency subdivision assigned for digital transmission, and then de-multiplexed at the subscriber DHCT so that multiple sets of data can be produced within each tuned 6 MHz frequency span, or subdivision.

Although broadcast in nature, the carousel DTSs 68 and on-demand DTSs 72 offer different functionality. Continuing with FIG. 1B, the broadcast DTSs 64 and carousel DTSs 68 typically function as continuous feeds for indefinite time, whereas the on-demand DTSs 72 are continuous feeds sessions for a limited time. All DTS types are capable of being transmitted at high data rates. The broadcast DTSs 64 carry typical data comprising multiple digitally-MPEG-2 compressed and formatted TV source signals and other continuously fed data information. The carousel DTSs 68 carry broadcast media content or data that is systematically broadcast in a cycling fashion but updated and revised as needed. Thus, the carousel DTSs 68 serve to carry high volume data such as media content and data and possibly, other data at high data rates. The carousel DTSs 68 preferably carry data formatted in directories and files by a Broadcast File System (BFS) (not shown), which is used for producing and transmitting data streams throughout the STS 10, and which provides an efficient means for the delivery of application executables and application media content and data to the DHCT, as will be described below. Media content and data received by the DHCT 16 in such manner can then be saved in the DHCT memory and/or transferred to the DHCT storage device for later use. The on-demand DTSs 72, on the other hand, can carry particular information such as compressed video and audio pertaining to subscriber requested media content instance preview and/or media content instance descriptions, as well as other specialized data information.

The User-to-Network Download Protocol of the MPEG-2 standard's DSM-CC specification (Digital Storage Media—Command and Control) provides the data carousel protocol used for broadcasting data from a server located at headend 11, or elsewhere. It also provides the interactive download protocol for reliable downloading of data from a server (possibly the same server) to an individual DHCT through the on-demand DTSs. Each carousel and on-demand DTS is defined by a DSM-CC session. Therefore, some of the basic functionality reflected in the DHCT 16 when the DHCT does not have a local physical storage device is somewhat similar to a networked computer (i.e., a computer without a persistent storage device), in addition to traditional set top box functionality, as is well known to those of ordinary skill in the art. A DHCT 16 with a storage device reduces data access latency when the data is stored in the local physical storage device ahead of time.

Also shown in FIG. 1B are Out-Of-Band (OOB) signals that provide continuously available two-way signaling to the subscribers' DHCT 16 regardless of which in-band signals are tuned to by the individual DHCT in-band tuners, as described below. The OOB signals consists of a Forward Data Signal (FDS) 76 and a Reverse Data Signal (RDS) 80. The OOB signals can comply to any one of a number of well known transport protocols but preferably comply to either a DAVIC 1.1 Transport Protocol with FDS of 1.544 mega-bits per second (Mbps) or more using quadrature phase shift keying (QPSK) modulation and an RDS of 1.544 Mbps or more using QPSK modulation, or to a DOCSIS Transport Protocol with FDS of 27 Mbps using 64-QAM modulation and a RDS of 1.544 Mbps or more using QPSK modulation or 16-QAM modulation. The OOB signals provide the two-way operation of the network, which allows for subscriber interactivity with the applications and services provided by the network. Furthermore, the OOB signals are not limited to a 6 MHz spectrum, but generally to a smaller spectrum, such as 1.5 or 3 MHz.

Figure 2:
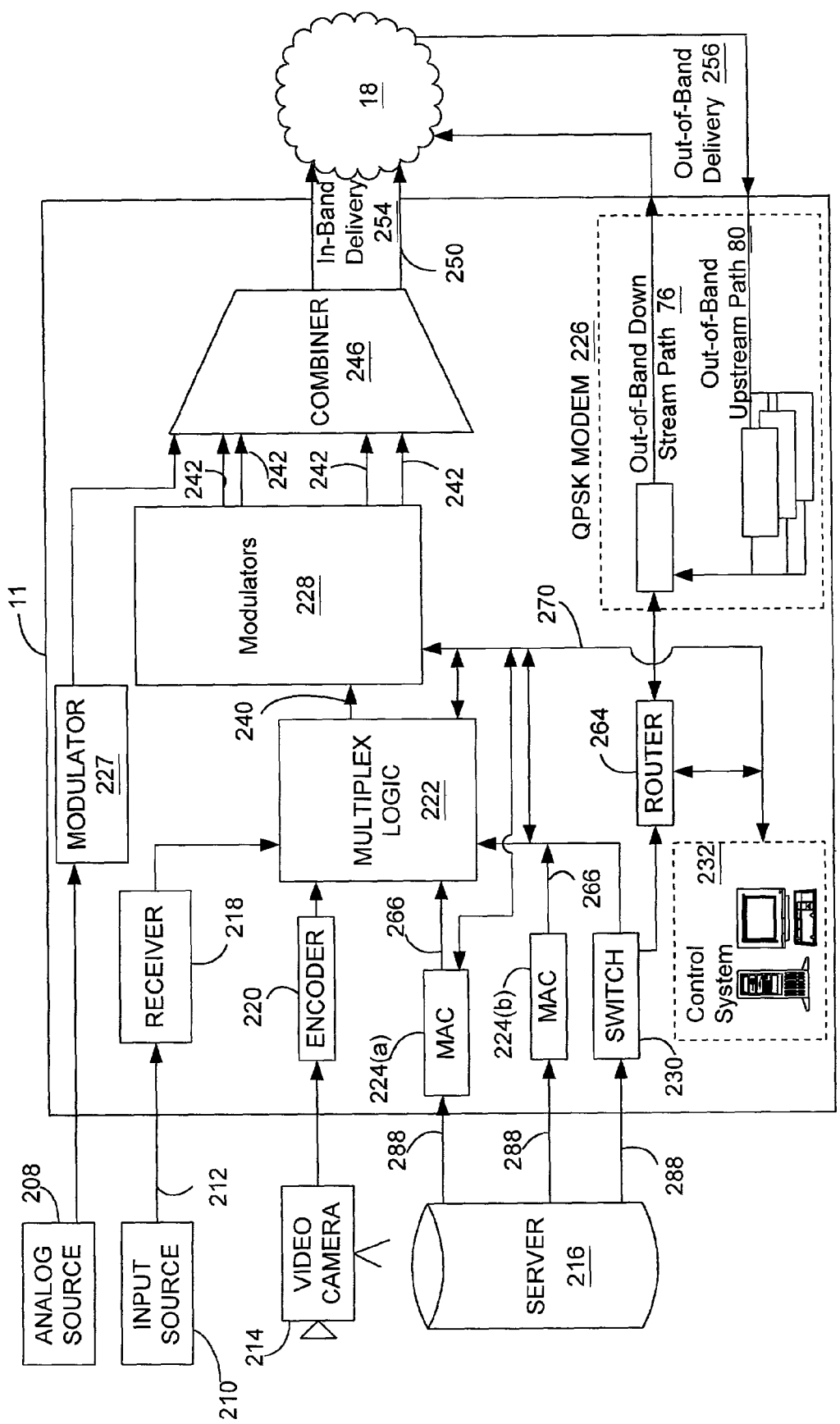
FIG. 2 is a block diagram of an example headend as depicted in FIG. 1A and related equipment, in accordance with one embodiment of the invention.

FIG. 2 is an overview of a headend 11, which provides the interface between the STS 10 and the service and content providers. The overview of FIG. 2 is equally applicable to a hub 12, and the same elements and principles may be implemented at a hub 12 instead of the headend 11 as described herein. The headend 11 receives content from a variety of service and content providers, which can provide input in a variety of ways. The headend 11 combines the content from the various sources and distributes the content to subscribers via the distribution systems of the network 18.

In a typical system, the programming, services and other information from content providers can be distributed according to a variety of mechanisms. The input signals may be transmitted from sources to the headend 11 via a variety of transmission paths, including satellites (not shown), and terrestrial broadcast transmitters and antennas (not shown). The headend 11 can also receive content from a direct feed source 210 via a direct line 212. Other input sources from content providers include a video camera 214, analog input source 208, or an application server 216. The application server 216 may include more than one line of communication. One or more components such as analog input source 208, input source 210, video camera 214, and application server 216 can be located external to the headend 11, as shown, or internal to the headend as would be appreciated by one having ordinary skill in the art. The signals provided by the content or programming input sources can include a single media content instance (i.e. individual instances of media content such as an episode of a television show, a movie, or web-page, etc.) or a multiplex that includes several media content instances.

The headend 11 generally includes one or more receivers 218 that are each associated with a content source. MPEG encoders, such as encoder 220, are included for digitally encoding at least some local programming or a real-time feed from video camera 214, or the like. The encoder 220 outputs the respective compressed video and audio streams corresponding to the analog audio/video signal received at its input. For example, encoder 220 can output formatted MPEG-2 or MPEG-1 packetized elementary (PES) streams or transport streams compliant to the syntax and semantics of the ISO MPEG-2 standard, respectively. The PES or transport streams may be multiplexed with input signals from switch 230, receiver 218 and control system 232. The multiplexing logic 222 processes the input signals and multiplexes at least a portion of the input signals into transport stream 240.

Analog input source 208 can provide an analog audio/video broadcast signal, which can be input into modulator 227. From modulator 227, a modulated analog output signal can be combined at combiner 246 along with other modulated signals for transmission into transmission medium 250. Alternatively, analog audio/video broadcast signal from analog input source 208 can be input into modulator 228. Alternatively, analog audio/video broadcast signal can be input directly from modulator 227 to transmission medium 250. The analog broadcast media content instances are transmitted via respective radio-frequency (RF) channels, each assigned for transmission of an analog audio/video signal such as NTSC video, as described in association with FIG. 1B.

The switch, such as asynchronous transfer mode (ATM) switch 230, provides an interface to an application server 216. There can be multiple application servers 216 providing a variety of services such as a Pay-Per-View service, including video on demand (VOD), a data service, an Internet service, a network system, or a telephone system. Service and content providers may download content to an application server located within the STS 10. The application server 216 may also be located within the headend 11 or elsewhere within the STS 10, such as in a hub 12. The various inputs into the headend 11 are then combined with the other information from the control system 232, which is specific to the STS 10, such as local programming and control information, which can include among other things conditional access information. The headend 11 contains one or more modulators 228 to convert the received transport streams 240 into modulated output signals suitable for transmission over the transmission medium 250 through the network 18. Each modulator 228 may be a multimodulator including a plurality of modulators, such as, but not limited to, QAM modulators, that radio frequency modulate at least a portion of the transport streams 240 to become output transport streams 242. The output signals 242 from the various modulators 228 or multimodulators are combined, using equipment such as a combiner 246, for input into the transmission medium 250, which is sent via the in-band delivery path 254 to subscriber locations (not shown). In-band delivery path 254 can include DTSs 64, 68, 72, and ATS 60, as described with FIG. 1B. In one embodiment, the server 216 also provides various types of data 288 to the headend 11. The data is received, in part, by the media access control functions 224 that output MPEG transport packets containing data 266 instead of digital audio/video MPEG streams.

The control system 232 enables the television system operator to control and monitor the functions and performance of the STS 10. The control system 232 interfaces with various components, via communication link 270, in order to monitor and/or control a variety of functions, including the frequency spectrum lineup of the programming for the STS 10, billing for each subscriber, and conditional access for the content distributed to subscribers. Information, such as conditional access information, is communicated from the control system 232 to the multiplexing logic 222 where it is multiplexed into a transport stream 240.

Among other things, the control system 232 provides input to the modulator 228 for setting the operating parameters, such as selecting certain media content instances or portions of transport streams for inclusion in one or more output transport streams 242, system specific MPEG table packet organization, and/or conditional access information.

Control information and other data can be communicated to hubs 12 and DHCTs 16 via an in-band delivery path 254 or via an out-of-band delivery path 256.

The out-of-band data is transmitted via the out-of-band FDS 76 (FIG. 1B) of transmission medium 250 by means such as, but not limited to, a Quadrature Phase-Shift Keying (QPSK) modem array 226. Two-way communication utilizes the RDS80 (FIG. 1B) of the out-of-band delivery path 256. Hubs 12 and DHCTs 16 transmit out-of-band data through the transmission medium 250, and the out-of-band data is received in headend 11 via out-of-band RDS80. The out-of-band data is routed through router 264 to an application server 216 or to control system 232. The out-of-band control information includes such information as a pay-per-view purchase instruction and a pause viewing command from the subscriber location to a video-on-demand type application server located internally or external to the headend 11, such as application server 216, as well as any other data sent from the DHCT 16 (FIG. 1A) or hubs 12, all of which will preferably be properly timed. The control system 232 also monitors, controls, and coordinates all communications in the subscriber television system, including video, audio, and data. The control system 232 can be located at headend 11 or remotely.

The transmission medium 250 distributes signals from the headend 11 to the other elements in the subscriber television system, such as a hub 12, a node 13, and subscriber locations (FIG. 1A). The transmission medium 250 can incorporate one or more of a variety of media, such as optical fiber, coaxial cable, and hybrid fiber-coax (HFC), satellite, direct broadcast, or other transmission media.

Figure 3A:
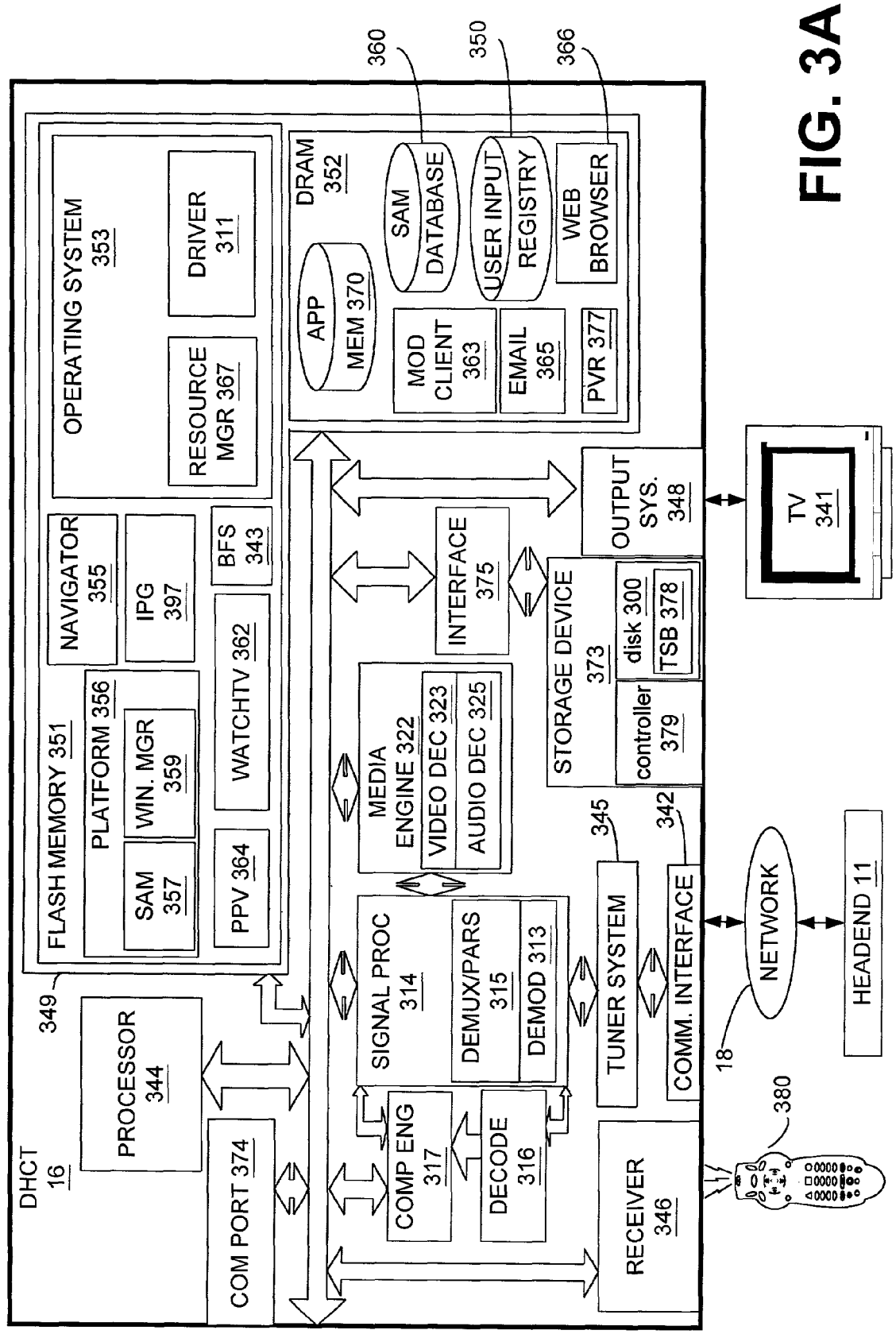
FIG. 3A is a block diagram of an example DHCT as depicted in FIG. 1A and related equipment, in accordance with one embodiment of the invention.

FIG. 3A is a block diagram illustration of a DHCT 16 that is coupled to a headend 11 and to a television, in accordance with one embodiment. It will be understood that the DHCT 16 shown in FIG. 3A is merely illustrative and should not be construed as implying any limitations upon the scope of the preferred embodiments of the invention. For example, some of the functionality performed by applications executed in the DHCT 16 (such as the MOD client application 363) may instead be performed at the headend 11 and vice versa, or not at all in some embodiments. A DHCT 16 is typically situated at a user's residence or place of business and may be a stand alone unit or integrated into another device such as, for example, a television set or a personal computer or other display devices or an audio device. The DHCT 16 preferably includes a communications interface 342 for receiving signals (video, audio and/or other data) from the headend 11 through the network 18 and for providing any reverse information to the headend 11 through the network 18.

The DHCT 16 further preferably includes at least one processor 344 for controlling operations of the DHCT 16, an output system 348 for driving the television display 341, and a tuner system 345 for tuning into a particular television channel or frequency to be displayed and for sending and receiving various types of data or media content to and from the headend 11. The DHCT 16 may include, in other embodiments, multiple tuners for receiving downloaded (or transmitted) media content. Tuner system 345 can select from a plurality of transmission signals (FIG. 1B) provided by the subscriber television system. Tuner system 345 enables the DHCT 16 to tune to downstream media and data transmissions, thereby allowing a user to receive digital or analog media content delivered in the downstream transmission via the subscriber television system. The tuner system 345 includes, in one implementation, an out-of-band tuner for bi-directional quadrature phase shift keying (QPSK) data communication and a quadrature amplitude modulation (QAM) tuner (in band) for receiving television signals. Additionally, a receiver 346 receives externally-generated information, such as user inputs or commands from an input device or other devices.

According to another embodiment of the invention, a telephone modem (not shown) in the DHCT 16 can be utilized for upstream data transmission and a headend 11, hub 12 (FIG. 1A) or other component located upstream in the STS 10 (FIG. 1A) can receive data from a telephone network corresponding with the telephone modem and can route the upstream data to a destination internal or external to the STS 10, such as an application data server in the headend 11 or content provider.

The DHCT 16 includes signal processing system 314, which comprises demodulating system 313 and transport demultiplexing and parsing system 315 (herein demultiplexing system) to process broadcast media content and/or data. One or more of the systems of signal processing system 314 can be implemented with software, a combination of software and hardware, or preferably in hardware. Demodulating system 313 comprises functionality for RF signal demodulation, either an analog transmission signal or a digital transmission signal. For instance, demodulating system 313 can demodulate a digital transmission signal in a carrier frequency that was modulated, among others, as a QAM-modulated signal. When tuned to a carrier frequency corresponding to an analog TV signal transmission, demultiplexing system 315 is bypassed and the demodulated analog TV signal that is output by demodulating system 313 is instead routed to analog video decoder 316. Analog video decoder 316 converts the analog video signal (i.e. the video portion of a media content instance that comprises a video portion and an audio portion) received at its input into a respective non-compressed digital representation comprising a sequence of digitized pictures and their respective digitized audio. Presented at the input to analog video decoder 316 is an analog video signal such as NTSC video comprising of audio and video. In one implementation, the video consists of a sequence of fields spaced apart at approximately one-sixtieth of a second. A pair of consecutive fields constitutes a picture. The odd field contains the odd-numbered lines of the picture and the even field contains the even-numbered lines of the picture. Analog video decoder 316 outputs the corresponding sequence of digitized pictures and respective digitized audio. Each picture is a two dimensional entity of picture elements and each picture element contains a respective set of values. A picture element value comprises luminance and chrominance information that are representative of brightness and color information at the spatial location of the picture element within the picture.

Digitized pictures and respective audio output by analog video decoder 316 are presented at the input of compression engine 317. Digitized pictures and respective audio output by analog video decoder 316 can also be presented to an input of media engine 322 via an interface (not shown) dedicated for non-compressed digitized analog video and audio, such as ITU-656, for display on TV 341. Compression engine 317 is coupled to localized memory 349, preferably DRAM 352, for input and processing of the input digitized pictures and their respective digitized audio. Alternatively, compression engine 317 can have its own integrated memory (not shown). Compression engine 317 processes the sequence of digitized pictures and digitized audio and converts them into a video compressed stream and an audio compressed stream, respectively. The compressed audio and video streams are produced in accordance with the syntax and semantics of a designated audio and video coding method, such as specified by the MPEG-2 audio and MPEG-2 video ISO standard, so that they can be interpreted by video decoder 323 and audio decoder 325 for decompression and reconstruction at a future time. Each compressed stream consists of a sequence of data packets containing a header and a payload. Each header contains a unique program identification, or PID, associated with the respective compressed stream.

Compression engine 317 multiplexes the audio and video compressed streams into a transport stream, such as an MPEG-2 transport stream, for output. Furthermore, compression engine 317 can preferably compress audio and video corresponding to more than one program in parallel (e.g., two tuned analog TV signals) and to multiplex the respective audio and video compressed streams into a single transport stream. Output of compressed streams and/or transport streams produced by compression engine 317 is input to signal processing system 314. Parsing capabilities 315 within signal processing 314 allow for interpretation of sequence and picture headers, for instance, annotating their locations within their respective compressed stream for future retrieval from storage device 373. A compressed analog media content instance (e.g., TV program episode or show) corresponding to a tuned analog transmission channel can be output as a transport stream by signal processing 314 and presented as input for storage in storage device 373 via interface 375 as will be described below. The packetized compressed streams can be also output by signal processing 314 and presented as input to media engine 322 for decompression by video decompression engine 323 and audio decompression engine 325 for its display on TV 341, as will be described below.

Demultiplexing system 315 can include MPEG-2 transport demultiplexing. When tuned to carrier frequencies carrying a digital transmission signal, demultiplexing system 315 enables the separation of packets of data, corresponding to the compressed streams of information belonging to the desired media content instances, for further processing. Concurrently, demultiplexing system 315 precludes packets in the multiplexed transport stream that are irrelevant or not desired, such as packets of data corresponding to compressed streams of media content instances of other media content signal sources (e.g. other TV channels), from further processing.

Parsing capabilities of demultiplexing system 315 include reading and interpreting the received transport stream without disturbing its content, such as to interpret sequence and picture headers, for instance, to annotate their locations within their respective compressed stream for future retrieval from storage device 373. Thus, the components of signal processing system 314 are capable of QAM demodulation, forward error correction, and demultiplexing MPEG-2 transport streams, and parsing packetized elementary streams and elementary streams. A compressed media content instance corresponding to a tuned carrier frequency carrying a digital transmission signal can be output as a transport stream by signal processing 314 and presented as input for storage in storage device 373 via interface 375 as will be described below. The packetized compressed streams can be also output by signal processing 314 and presented as input to media engine 322 for decompression by video decompression engine 323 and audio decompression engine 325 as will be described below.

One having ordinary skill in the art will appreciate that signal processing system 314 will preferably include other components not shown, including memory, decryptors, samplers, digitizers (e.g. analog-to-digital converters), and multiplexers, among others. Further, other embodiments will be understood, by those having ordinary skill in the art, to be within the scope of the preferred embodiments of the present invention, including analog signals (e.g. NTSC) that bypass one or more elements of the signal processing system 314 and are forwarded directly to the output system 348. Further, outputs presented at corresponding next-stage inputs for the aforementioned signal processing flow may be connected via accessible memory 349 in which the outputting device stores the output data and the inputting device thereafter inputs the output data written to memory 349 by the respective outputting device. Outputting and inputting devices include analog video decoder 316, compression engine 317, media engine 322, signal processing system 314, and components or sub-components thereof. Further, it will be understood by those having ordinary skill in the art that components of signal processing system 314 can be spatially located in different areas of the DHCT 16. Further, it will be understood by those having ordinary skill in the art that, although the components of signal processing system 314 are illustrated as being in communication with an incoming signal from the communications interface 342, the signal may not necessarily be in the order shown for all signals.

The DHCT 16 also includes media engine 322, which includes digital video decoder 323 also known as video decompression engine, and digital audio decoder 325 also known as audio decompression engine, and other digital signal processing components not shown, as would be appreciated by those having ordinary skill in the art. For example, demultiplexing system 315 is in communication with tuner system 345, and processor 344 to effect reception of digital compressed video streams, digital compressed audio streams, and data streams corresponding to one or more media content instances to be separated from other media content instances and/or streams transported in the tuned transmission channel and to be stored in a first part (not shown) of DRAM 352 of DHCT 16 assigned to receive packets of one or more media content instances. Other dedicated memory may also be used for media content instance packets.

Furthermore, while conducting this process, demultiplexing system 315 demultiplexes and separates desired compressed streams from the received transport stream without disturbing its content. Further, parser 315 parses (i.e., reads and interprets) compressed streams such as to interpret sequence headers and picture headers, and deposits a transport stream carrying compressed streams of a media content instance into DRAM 352. Processor 344 causes transport stream in DRAM 352 to be transferred to the storage device 373 via interface 375. Under program control by processor 344, the demultiplexing system 315 in communication with the digital video decoder 323, storage device 373, and processor 344 effect notification and/or transfer of received packets of one or more compressed streams corresponding to one or more media content instances from a first part of DRAM 352 to a second part (not shown) of DRAM 352 assigned to the digital video decoder 323 and the digital audio decoder 325. Alternatively, media engine 322 can have access to a dedicated localized DRAM (not shown). Upon demultiplexing and parsing the transport stream carrying one or more media content instances, signal processing system 314 outputs to DRAM 352 ancillary data in the form of a table or data structure (not shown) comprising the relative or absolute location of the beginning of certain pictures in the compressed media content instance for convenience in retrieval during future operations.

In another embodiment, according to a plurality of tuners, and respective number of demodulating systems 313, demultiplexing systems 315, and signal processing systems 314, a respective number of broadcast digital media content instances are received and routed to the hard disk 300 of storage device 373 simultaneously. Alternatively, a single demodulating system 313, a single demultiplexing system 315, and a single signal processing system 314, each with sufficient processing capabilities can serve to process more than one digital media content instance.

In another embodiment according to the aforementioned description, a first tuner of tuning system 345 receives an analog video signal corresponding to a first media content instance and a second tuner simultaneously receives a digital compressed stream corresponding to a second media content instance. First media content instance is processed as an analog video signal and second media content instance is processed as a digital compressed stream as described above.

In one implementation, compression engine 317 can output formatted MPEG-2 or MPEG-1 packetized elementary streams (PES) inside a transport stream, all compliant to the syntax and semantics of the ISO MPEG-2 standard. Alternatively, compression engine 317 can output other digital formats that are compliant to other standards. The digital compressed streams output by compression engine 317 corresponding to a first media content instance are deposited in local memory for compression engine 317 and routed to demultiplexing system 315. Demultiplexing system 315 parses (i.e., reads and interprets) the transport stream generated by compression engine 317 without disturbing its content, such as to interpret picture headers, and deposits the transport stream into DRAM 352. Processor 344 causes transport stream in DRAM 352 to be transferred to the storage device 373. While parsing the transport stream, demultiplexing system 315 outputs to memory 352 ancillary data in the form of a table or data structure (not shown) comprising the relative or absolute location of the beginning of certain pictures in the compressed media content stream for the first media content instance for convenience in retrieval during future operations. In this way, random access operations such as fast forward, rewind, and jumping to a location in the compressed media content instance can be attained.

In another embodiment, according to a plurality of tuners, a respective number of analog video decoders 316, and a respective number of compression engines 317, the aforementioned compression of analog video and audio is performed and routed to hard disk 300 of the storage device 373 simultaneously for a respective number of analog media content instances. Alternatively, a single compression engine with sufficient processing capabilities can serve to compress more than one analog media content instance.

The DHCT 16 may also include one or more wireless or wired interfaces, also called communication ports 374, for receiving and/or transmitting data to other devices. For instance, the DHCT 16 may feature USB (Universal Serial Bus), Ethernet (for connection to a computer), IEEE-1394 (for connection to media content devices in an entertainment center), serial, and/or parallel ports. The user inputs may be, for example, provided by an input device including a computer or transmitter with buttons or keys located either on the exterior of the terminal or by a hand-held remote control device 380 or keyboard that includes user-actuated buttons.

In one implementation, the DHCT 16 includes system memory 349, which includes FLASH memory 351 and dynamic random access memory (DRAM) 352, for storing various applications, modules and data for execution and use by the processor 344. Basic functionality of the DHCT 16 is provided by an operating system 353 that is primarily stored in FLASH memory 351. Among other elements, the operating system 353 includes at least one resource manager 367 that provides an interface to resources of the DHCT 16 such as, for example, computing resources. Also included within operating system 353 is one or more device drivers that provides operating instructions to an internal or external storage device, such as storage device 373, and peripheral devices not shown. For example, device driver 311 provides operating instructions to the storage device controller 379 of the storage device 373 to effect, among other functions, read and/or write operations to the hard disk of the storage device 373.

One or more programmed software applications, herein referred to as applications, or application clients, are executed by utilizing the computing resources in the DHCT 16. The applications may be resident in FLASH memory 351 or downloaded into DRAM 352. Applications stored in FLASH memory 351 or DRAM 352 are executed by processor 344 (e.g., a central processing unit or digital signal processor) under the auspices of the operating system 353. Data required as input by an application is stored in DRAM 352 or FLASH memory 351 and read by processor 344 as need be during the course of the application's execution. Input data may be data stored in DRAM 352 by a secondary application or other source, either internal or external to the DHCT 16, or possibly anticipated by the application and thus created with the application at the time it was generated as a software application, in which case it is stored in FLASH memory 351. Data generated by an application is stored in DRAM 352 by processor 344 during the course of the application's execution. DRAM 352 also includes application memory 370 that various applications may use for storing and/or retrieving data.

An application referred to as navigator 355 is also resident in FLASH memory 351 for providing a navigation framework for services provided by the DHCT 16. The navigator 355 registers for and in some cases reserves certain user inputs related to navigational keys such as channel increment/decrement, last channel, favorite channel, etc. The navigator 355 also provides users with television related menu options that correspond to DHCT functions such as, for example, blocking a channel or a group of channels from being displayed in a channel menu.

The FLASH memory 351 also contains a platform library 356. The platform library 356 is a collection of utilities useful to applications, such as a timer manager, a compression manager, a configuration manager, an HTML parser, a database manager, a widget toolkit, a string manager, and other utilities (not shown). These utilities are accessed by applications via application programming interfaces (APIs) as necessary so that each application does not have to contain these utilities. Two components of the platform library 356 that are shown in FIG. 3A are a window manager 359 and a service application manager (SAM) client 357.

The window manager 359 provides a mechanism for implementing the sharing of the screen regions and user input. The window manager 359 on the DHCT 16 is responsible for, as directed by one or more applications, implementing the creation, display, and de-allocation of the limited DHCT 16 screen resources. It allows multiple applications to share the screen by assigning ownership of screen regions, or windows. The window manager 359 also maintains, among other things, a user input registry 350 in DRAM 352 so that when a user enters a key or a command via the remote control device 380 or another input device such as a keyboard or mouse, the user input registry 350 is accessed to determine which of various applications running on the DHCT 16 should receive data corresponding to the input key and in which order. As an application is executed, it registers a request to receive certain user input keys or commands. When the user presses a key corresponding to one of the commands on the remote control device 380, the command is received by the receiver 346 and relayed to the processor 344. The processor 344 dispatches the event to the operating system 353 where it is forwarded to the window manager 359 which ultimately accesses the user input registry 350 and routes data corresponding to the incoming command to the appropriate application.

The SAM client 357 is a client component of a client-server pair of components, with the server component (not shown) being located on the headend 11, preferably in the control system 232 (FIG. 2). A SAM database 360 (i.e. structured data such as a database or data structure) in DRAM 352 includes a data structure of services and a data structure of channels that are created and updated by the headend 11. Herein, database will refer to a database, structured data or other data structures as is well known to those of ordinary skill in the art. Many services can be defined using the same application component, with different parameters. Examples of services include, without limitation and in accordance with one implementation, presenting television programs (available through a WatchTV application 362), pay-per-view events (available through a PPV application 364), digital music (not shown), media-on-demand (available through an MOD application 363), and an interactive program guide (IPG) 397. In general, the identification of a service includes the identification of an executable application that provides the service along with a set of application-dependent parameters that indicate to the application the service to be provided. As a non-limiting example, a service of presenting a television program (i.e. media content instance) could be executed by WatchTV application 362 with a set of parameters specifying the HBO to view HBO or with a separate set of parameters to view CNN. Each association of the application component (tune video) and one parameter component (HBO or CNN) represents a particular service that has a unique service I.D. The SAM client 357 also interfaces with the resource manager 367, as discussed below, to control resources of the DHCT 16.

Application clients can also be downloaded into DRAM 352 at the request of the SAM client 357, typically in response to a request by the user or in response to a message from the headend 11. In this example, DRAM 352 includes a media-on-demand application (MOD) 363, an e-mail application 365, PVR application 377, and a web browser application 366. It should be clear to one with ordinary skill in the art that these applications are not limiting and merely serve as examples for this present embodiment of the invention. Furthermore, one or more DRAM based applications may be resident, as an alternative embodiment, in FLASH memory 351. These applications, and others provided by the subscriber television system operator, are top-level software entities on the network for providing services to the user.

In one implementation, applications executing on the DHCT 16 work with the navigator 355 by abiding by several guidelines. First, an application utilizes the SAM client 357 for the provision, activation, and suspension of services. Second, an application shares DHCT 16 resources with other applications and abides by the resource management policies of the SAM client 357, the operating system 353, and the DHCT 16. Third, an application handles situations where resources are only available with navigator 355 intervention. Fourth, when an application loses service authorization while providing a service, the application suspends the service via the SAM (the navigator 355 will reactivate an individual service application when it later becomes authorized). Finally, an application client, or application, is designed to not have access to certain user input keys reserved by the navigator (i.e., power, channel +/−, volume +/−, etc.).

The MOD client application 363 provides the user with lists of available media content titles for each media content instance to choose from and with media content instances requested by the user. The MOD client application 363 provides media content instances to the user by engaging, preferably, in a direct two-way IP (Internet Protocol) connection with VOD content servers (not shown) that would be located, in one embodiment, in the headend 11 (FIG. 2).

An executable program or algorithm corresponding to an operating system (OS) component, or to a client platform component, or to an application client, or to respective parts thereof, can reside in and execute out of DRAM 352 and/or FLASH memory 351. Likewise, data input into or output from any executable program can reside in DRAM 352 or FLASH memory 351. Furthermore, an executable program or algorithm corresponding to an operating system component, or to a client platform component, or to an application client, or to respective parts thereof, can reside in FLASH memory 351, or in a local storage device (such as storage device 373) connected to DHCT 16 and be transferred into DRAM 352 for execution. Likewise, data input for an executable program can reside in FLASH memory 351 or a storage device and be transferred into DRAM 352 for use by an executable program or algorithm. In addition, data output by an executable program can be written into DRAM 352 by an executable program or algorithm and be transferred into FLASH memory 351 or into a storage device. In other embodiments, the executable code is not transferred, but instead, functionality is effected by other mechanisms.

The DHCT 16 includes at least one storage device 373 to provide storage for downloaded media content. PVR application 377 (described in greater detail below), in cooperation with the operating system 353 and the device driver 311, effects, among other functions, read and/or write operations to the storage device 373. Herein, references to write and/or read operations to the storage device 373 will be understood to mean operations to the medium or media of the storage device 373 unless indicated otherwise. The device driver 311 is a software module preferably resident in the operating system 353. The device driver 311, under management of the operating system 353, communicates with the storage device controller 379 to provide the operating instructions for the storage device 373. As conventional device drivers and device controllers are well known to those of ordinary skill in the art, further discussion of the detailed working of each will not be described further here. Storage device 373 is preferably internal to DHCT 16, coupled to a common bus through a communication interface 375, preferably an integrated drive electronics (IDE) or small computer system interface (SCSI), although IEEE-1394 or USB, among others, can be used. Alternatively, the storage device 373 can be externally connected to (and thus removable from) the DHCT 16 via a communication port 374 implemented as IEEE-1394 or USB or as a data interface port such as a SCSI or an IDE interface. In one implementation, under the auspices of the real-time operating system 353 executed by processor 344, and in coordination with the PVR application client 377, transmitted media content (herein understood to also refer to other types of data in addition to, or instead of, media content instances) are received in DHCT 16 via communications interface 342 and stored in a temporary cache (not shown) in memory 349. The temporary cache is implemented and managed to enable media content transfers from the temporary cache to storage device 373, or, in concert with the insertion of a newly arriving media content into the temporary cache. In one implementation, the fast access time and high data transfer rate characteristics of the storage device 373 enable media content to be read from the temporary cache in memory 349 and written to storage device 373 in a sufficiently fast manner. Orchestration of multiple simultaneous data transfer operations is effected so that while media content is being transferred from the cache in memory 349 to storage device 373, new media content is received and stored in the temporary cache of memory 349.

Processor 344 in communication generally with device driver 311 and storage device controller 379 and demultiplexing system 315 effect retrieval of compressed video streams, compressed audio streams, and data streams corresponding to one or more media content instances from storage device 373. Retrieved streams are deposited in an output cache in storage device 373 and transferred to memory 352, and then processed for playback according to mechanisms that would be understood by those having ordinary skill in the art. In some embodiments, the media content instances are retrieved and routed from the hard disk 300 to the digital video decoder 323 and digital audio decoder 325 simultaneously, and then further processed for eventual presentation on a display device or other device.

Storage device 373 can be an optical storage device or a magnetic storage device, among others, and is preferably a hard disk drive. Storage device 373 comprises storage for media content that can be written to for storage and later read from for retrieval for presentation. The storage device 373 preferably includes at least one hard disk 300 and a controller 379, which receives operating instructions from the device driver 311 and implements those instructions to cause read and/or write operations to the hard disk 300. The operating system 353, in cooperation with the device driver 311, communicates with the storage device controller 379 to format the hard disk 300, causing the hard disk to be divided radially into sectors 301 and concentric circles called tracks 302, as illustrated by the block diagram illustration of the example hard disk 300 in FIG. 3B. Note from FIG. 3B that the same number of sectors 301 per track 302 are illustrated, but other embodiments with a different number of tracks per side, or sectors per track, or bytes per track, in different zones of tracks are within the scope of the preferred embodiments of the invention. The sector 301 is the basic unit of storage on the hard disk 300. In one implementation, each sector 301 of a hard disk 300 can store 512 bytes of user data. While data is stored in 512-byte sectors on the hard disk 300, the cluster, such as example cluster 303, is the minimum unit of data storage the operating system 353 uses to manage the storage of information. Two or more sectors on a single track make up a cluster.

Figure 3B:
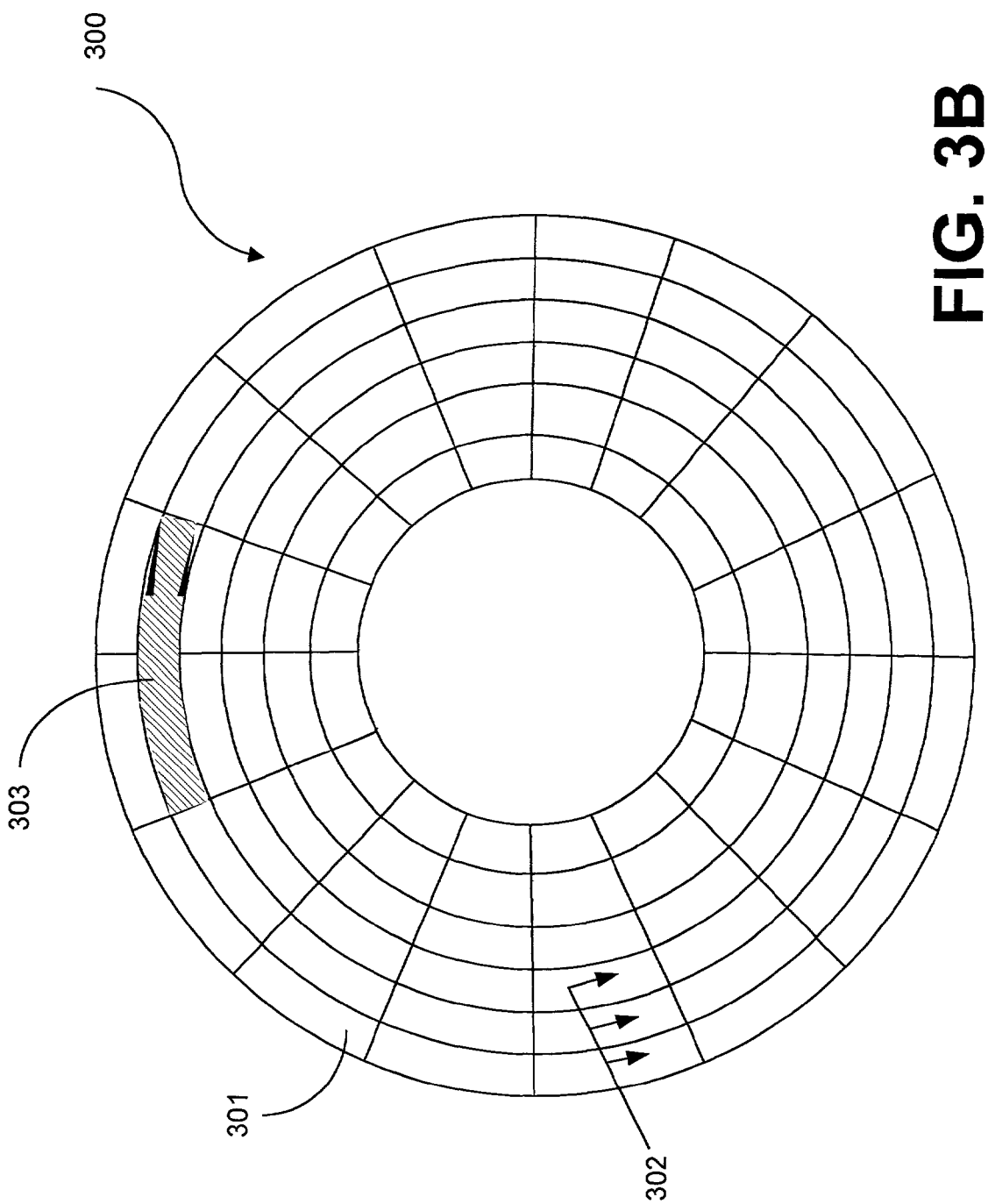
FIG. 3B is a block diagram of an example hard disk and hard disk elements located within the storage device coupled to the DHCT depicted in FIG. 3A.
Figure 3C:
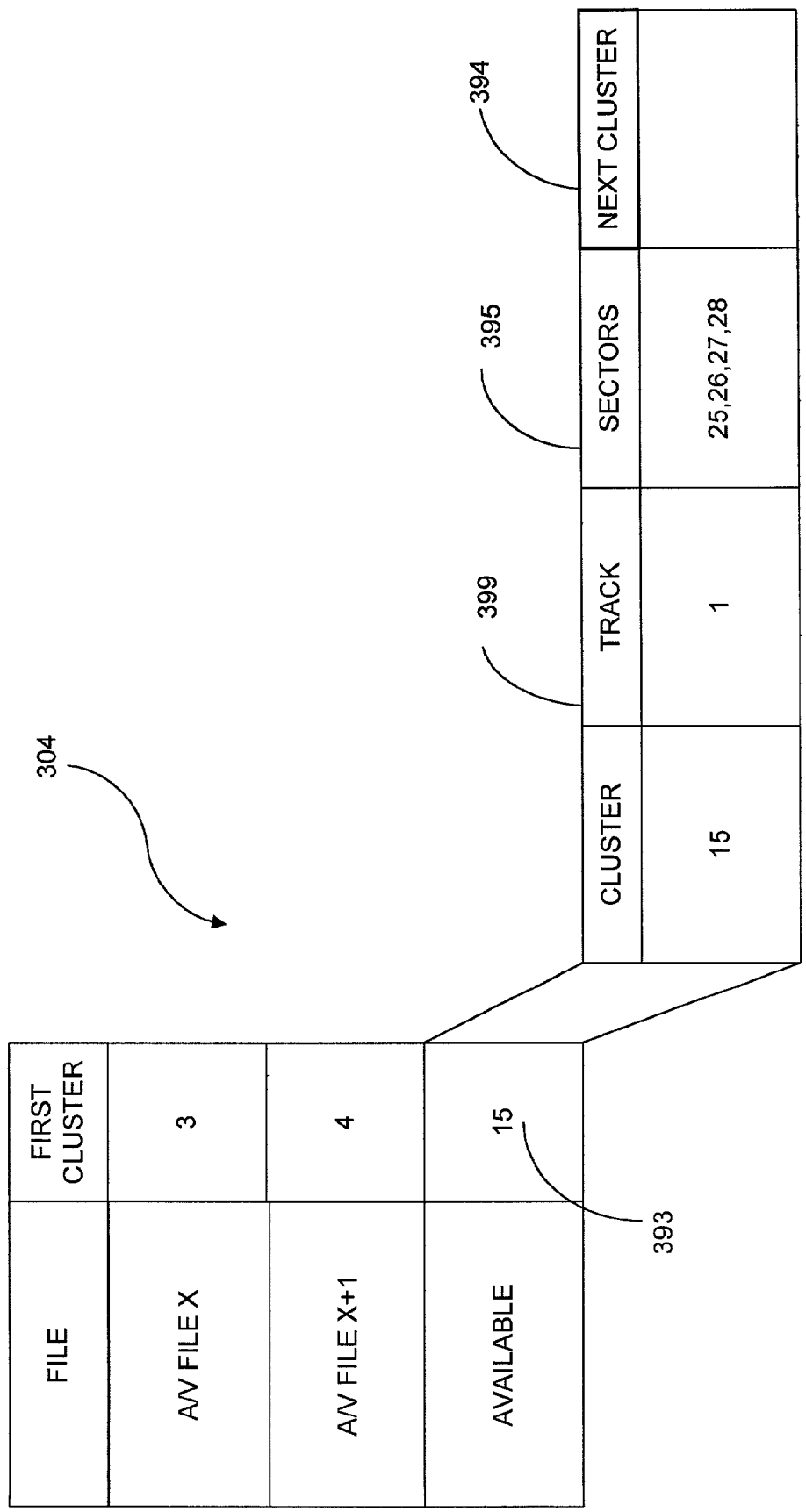
FIG. 3C is a block diagram of an example file allocation table found in a hard disk sector as depicted in FIG. 3B.

In a addition to formatting, the operating system 353, device driver 311, and controller 379 cooperate to create a special file in one of the hard disk sectors called a file allocation table (FAT), such as the example FAT 304 illustrated in FIG. 3C. Note that the FAT 304 shown in FIG. 3C includes a partial view showing a few rows and columns of information. The FAT 304 is where the operating system 353 stores the information about the hard disk clusters and the files associated with those clusters. The operating system 353 can determine where a file's data is located by using the directory entry for the file and file allocation table (FAT) 304 entries. The directory entry gives information about a directory such as its related files and subdirectories and create time, and special permissions. A FAT entry describes the physical locations of data for a media content instance file (i.e. the file the media content instance is written to on the hard disk 300 (FIG. 3B)). Similarly, the FAT 304 also keeps track of which clusters are free, or open, and thus available for use. When the PVR application 377 creates (or extends) a media content instance file, the operating system 353, in cooperation with the device driver 11, queries the FAT 304 for an available cluster to begin writing the media content instance. For a non-limiting example, to buffer a downloaded media content instance into the storage device 373, the PVR application 377 creates a media content instance file and media content instance file name for the media content instance to be downloaded. The operating system 353, in cooperation with the device driver 311, checks the FAT 304 for an available, or writeable, cluster to write the media content instance to, such as cluster 15 (as indicated in block 393 of the FAT 304). From the FAT 304, the operating system 353 also determines that cluster 15 is comprised of sectors 25,26,27, and 28 (as indicated from block 395 from the FAT 304) on track 1 (block 399). The PVR application 377 effects the device driver 311, through communication with the operating system 353, to cause the controller 379 to write the downloaded media content instance to cluster 15 under a particular media content instance file name. The FAT 304 is then updated with the new media content instance file name corresponding to cluster 15. If the media content instance requires more data space than what cluster 15 can offer, the operating system 353 queries the FAT 304 for the location of another available cluster to continue writing the media content instance to hard disk space. Upon finding another cluster, the FAT 304 is updated (block 394) to keep track of which clusters are linked to store a particular media content instance under the given media content instance file name.

When more than one cluster is required to write data to hard disk 300, the clusters corresponding to one particular media content instance file may or may not be adjacent or contiguous clusters. The clusters corresponding to a particular media content instance file can be fragmented throughout the hard disk space. As described earlier, a file allocation table (FAT) keeps track of which clusters are employed to write a downloaded media content instance to the hard disk 300. Further, systems well known to those of ordinary skill in the art, such as defragmentators, can be employed to cause the clusters associated with a particular media content instance file to be contiguous. This process of writing the media content instance to the hard disk 300 under the given media content instance file name continues until the PVR application 377 determines that it is time to stop and close the file. The PVR application 377 makes this determination as to the stop time of a downloaded media content instance (i.e. when a particular show is over), in one embodiment, based on media content instance guide data the PVR application stores in an associated management file, as will be explained in further detail below. When the PVR application 377 receives and stores the media content instance guide data, the PVR application 377 sets up a timer interrupt (or in other embodiments, polls the operating system 353) with the operating system 353. The operating system 353, in coordination with a real-time clock (not shown) within the DHCT 16, alerts the PVR application 377 (FIG. 3A) to the end of the received media content instance. Read operations from the hard disk 300 similarly employ the FAT with cooperation among the PVR application 377, operating system 353, and device driver 311. When media content instance files are deleted through the PVR application 377, the operating system 353 causes the device driver 311 to flag this new status in the FAT by flagging the clusters for that deleted media content instance file as available (or writeable). The flagging may be implemented by a symbol in the file entry directory for the targeted media content instance file. Clusters for temporarily buffered media content instance files and permanently recorded media content instance files corresponding to recorded media content instances in the TSB 378 and permanently recorded space, respectively, will have corresponding media content instance file names in the FAT. In contrast, available clusters on the hard disk 300 will have some flag or indication in the corresponding FAT entry to signal to the device driver 311 and operating system 353 that such clusters are write-able (e.g. available for designation as clusters to be used for buffering or permanent recording).

The PVR application 377 provides for media content recording functionality by enabling the temporary writing to, and if requested, more permanent recording to the storage device 373. Through mechanisms explained below, media content received into the TSB 378 will have a temporary recording designation. That is, media content stored in clusters of the TSB 378 will have a temporary residence. This receiving of media content into the TSB 378 for temporary residence will also be referred to as buffering. The media content stored in the TSB 378 will either be deleted (i.e. its associated management file record will be deleted and the clusters storing the media content will be configured as writeable for eventual write operations that overwrite the media content within those clusters) or retained (through election by the user) as a permanent recording. A permanent recording will be understood to mean media content that is stored for an extended period of time as decided by the user. Permanent recordings are stored in non-buffer clusters (i.e. not in clusters of the TSB 378) that are not used for the TSB 378 in instances when the user elects in advance to make a scheduled recording of a media content instance that has not yet been tuned to at the DHCT 16. A permanent recording can also be achieved by selecting a media content instance stored in the TSB 378 and designating the media content instance as permanent. As will be described below, this designation can occur, in one implementation, by selecting the desired content via a user interface screen. The PVR application 377 responds by "flagging" the associated management file as permanent. This designation for the desired media content instance is relayed to the device driver 311 and/or operating system 353, which effects the removal of the associated clusters from the TSB 378. Thus, permanent recordings will preferably be more permanent than media content in the TSB 378, and permanent recordings can eventually be deleted from the disk space, typically at the explicit request of a user, as one example. This deletion occurs, in one implementation, by configuring the associated non-buffer clusters as writeable, and thus eventually available for the TSB 378 or scheduled recordings.

Media content may be transmitted or downloaded from a remote location, such as, for example, a remote server located in the head end 11, or from a home communication network, or from other consumer electronic devices. In accordance with the preferred embodiment, the PVR application 377 manages buffer space, or a time shift buffer (TSB) 378, of downloaded media content instances, or programs (content), and/or data, at the application level for each tuner. Hence, each tuner in tuner system 345 has a respective TSB 378. Note that buffering is understood to mean temporarily receiving media content, resulting either from reception of a broadcast digital channel or a digital compressed version of a broadcast analog channel, and/or data into the buffer space, or TSB 378, of the storage device 373. In one embodiment, buffering for a digital compressed video program, or media content instance, results from a sourced video program instance and its associated audio signal that originated as an analog video signal received in DHCT 16 as a broadcast TV program instance received via network communication interface 342 (FIG. 3A). Such analog video signals are compressed into digital form by the encoder 317 (FIG. 3A), or other digitizing hardware or software, in DHCT 16 as explained above.

In another embodiment, buffering for a digital compressed video program instance (i.e. media content instance) results from a sourced video program instance and its associated audio signal that originated as an analog video signal received in DHCT 16 via analog audio and video connectors (not shown) in DHCT 16 such as an S-Video input or composite video input and originating from a consumer electronic device such as an analog video camcorder.

In another embodiment, buffering for a digital compressed video program instance results from a sourced video program instance and its associated audio signal that originated as a broadcast digital TV program instance received in DHCT 16 via network communication interface 342 (FIG. 3A).

In another embodiment, buffering for a digital compressed video program instance results from a sourced video program instance and its associated audio signal that originated as an on-demand digital video program instance received in DHCT 16 via network communication interface, wherein such digital video program instance resided in a server at headend 11 (FIG. 2).

In another embodiment, buffering for a digital compressed video program instance results from a sourced video program instance and its associated audio signal that originated as a digital video program instance received in DHCT 16 via a digital video interface or a home network interface such as USB, IEEE-1394 or Ethernet, wherein such digital video program instance resided in storage in a personal computer or a digital consumer electronic device such as a digital video camcorder.

In another embodiment, buffering for a digital compressed video program instance results from a sourced video program instance and its associated audio signal that originated as a digital video program instance received in DHCT 16 via a digital video interface or a communication interface such as IDE, SCSI, USB, IEEE-1394 or Ethernet, wherein such digital video program instance resided in a storage device externally connected to DHCT 16 such as a DVD player or an internal or external storage device.

There is a duration associated with the TSB 378, which represents how much data is held by the TSB 378. This duration could represent, in one embodiment, actual media content instance time. The PVR application 377, in a time-duration embodiment, will preferably maintain a substantially constant buffer space capacity suitable for a certain duration of media content instance time, for example, 3-4 hours worth of media content instances. Media content instance-time tracking is related to hard disk space tracking if a constant data rate, or buffering rate, is assumed or estimated. In a preferred embodiment, the duration of the TSB 378 represents hard disk space. The PVR application 377 can set a buffer size capacity, for example 3 gigabytes (GB), and then track disk space used for the TSB 378 to ensure a substantially constant TSB capacity. For example, before the PVR application 377 effects a write to the storage device 373, it can query the device driver 311 (through the operating system 353) to determine the available hard disk space. After the write operation, the PVR application 377 again can poll the device driver 311 to get an update on available hard disk space. As will be evident in the description below, the TSB 378 preferably comprises a plurality of clusters, the number of which is normally less than the capacity of the TSB 378 due to the continual management of the TSB 378 through the deletion and replacement of media content instances. The variation of the amount of clusters in the TSB 378 at any time will preferably represent a small percentage of the TSB capacity, resulting in a substantially constant size TSB over time.

The PVR application 377 preferably maintains the TSB 378 by creating a management file associated with each tuned media content instance. The PVR application 377 "knows" at what time the media content instance was tuned into from the recording of a real-time clock value forwarded by the operating system 353. The PVR application 377 also receives media content instance guide data, for example from an IPG application 397 (FIG. 3A), that receives updated media content instance information from the head end 11 and that provides start and end times (i.e. duration) of each media content instance. With this information and an internal clock (not shown), the PVR application 377 can create a list of management files associated with each buffered media content instance, and store the duration and start time of each media content instance in memory 352 (FIG. 3A) in order to keep track of the media content instances stored in the storage device 373. In other embodiments, the management files can be stored on the hard disk 300 (FIG. 3B).

Figure 4:
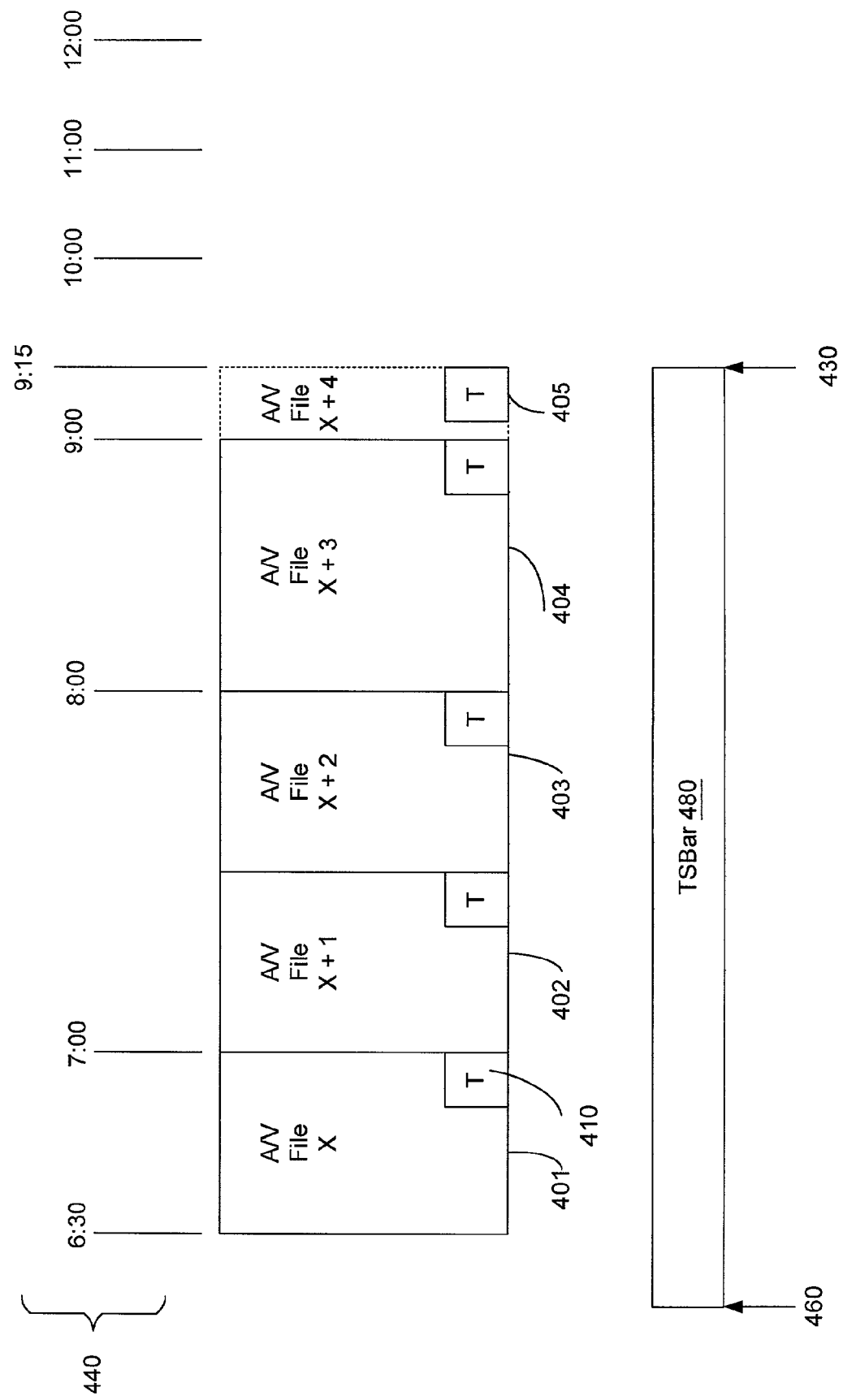
FIG. 4 is a block diagram illustration of media content instance files in a time shift buffer, with a live point of 9:15, in accordance with one embodiment of the invention.

FIGS. 4-9 are block diagrams that provide example illustrations of how a 3-GB TSB 378 can be managed at the application level. Assume a constant bit rate of 2 mega bits per second (Mbps), which corresponds approximately to 3 hours worth of media content in the TSB 378. It is understood that the 3-GB TSB 378 is a non-limiting example, and other durations of buffer hard disk space (or time for a time-duration embodiment) for constant or variable bit rates of different values are within the scope of the preferred embodiments. FIG. 4 illustrates the file allocation and buffer shift as time elapses for a 3-GB (or 3-hr) time shift buffer (TSB) 378 (FIG. 3A). Referring to FIG. 4, four different completed media content instances (such as a broadcast TV show) and one media content instance in its beginning stages are stored in the TSB 378 (FIG. 3A) of the storage device 373 (FIG. 3A), and preferably managed and represented by the PVR application 377 (FIG. 3A) as five management files preferably with a management data structure as described below in association with FIGS. 10A and 10B. In other embodiments, pointers to the management files may be linked. Alternatively, the management files may not be linked, or may be maintained in other types of data structures, for example, data base records, etc. Each management file includes a unique filename of an associated media content instance, represented in the figures by the notation "A/V File x" 401, "A/V File x+1" 402, etc. Each management file also receives and stores media content instance guide data such as scheduled start and end times of the buffered media content instance. The management files also include a file status indicator 410. The file status indicator 410 is configured by the PVR application 377 (FIG. 3A) with a value of "0" for temporary, or "1" for permanently recorded. The file status indicator 410 is illustrated as a letter in a small block in the lower right hand corner of each block in FIG. 4. The letters "T" or "R" indicate whether the media content instance file is configured by the PVR application 377 (FIG. 3A), through an associated management file, as a temporary file or a permanently recorded file, respectively. Although shown as a "T" in each media content instance file, it will be understood that the file status indicator 410 is just a graphical representation of what the PVR application 377 is accomplishing at the associated management file level. At the top of FIG. 4 is a time line 440 demarcating the buffering start and end times of each media content instance, and hence the duration of each media content instance file. At the bottom portion of FIG. 4 is TSBar 480, which is intended to illustrate a rolling (i.e. time lapsed) 3 GB segment corresponding to the TSB 378 capacity (that in this example, happens to be 3-hours long). In other words, TSBar 480 depicts a specific, defined amount of disk space for the capacity of the TSB 378 that effectively advances (via a process where clusters are removed and replaced, as described below) as the time of day progresses. TSBar 480 is shown with a beginning 460 at the left most end and a live point 430 at the right most end. The live point 430 represents the current point in time of buffering media content instances. Live point 430 thus corresponds to the current time of receipt of buffered media content instances into the TSB 378 of the storage device 373 under a media content instance file name, such as "A/V file x+4" of media content instance file 405. As illustrated in FIG. 4, the new media content instance started at 9:00, and the current buffering location or live point 430 is at 9:15. Thus the new media content instance has been buffering to the TSB 378 under media content instance file name "A/V file x+4" of media content instance file 405 for an elapsed time of 15 minutes. All of the buffered media content instances are initially designated by PVR application 377 as temporary, as indicated by the "T" in the file status indicator 410.

Figure 5:
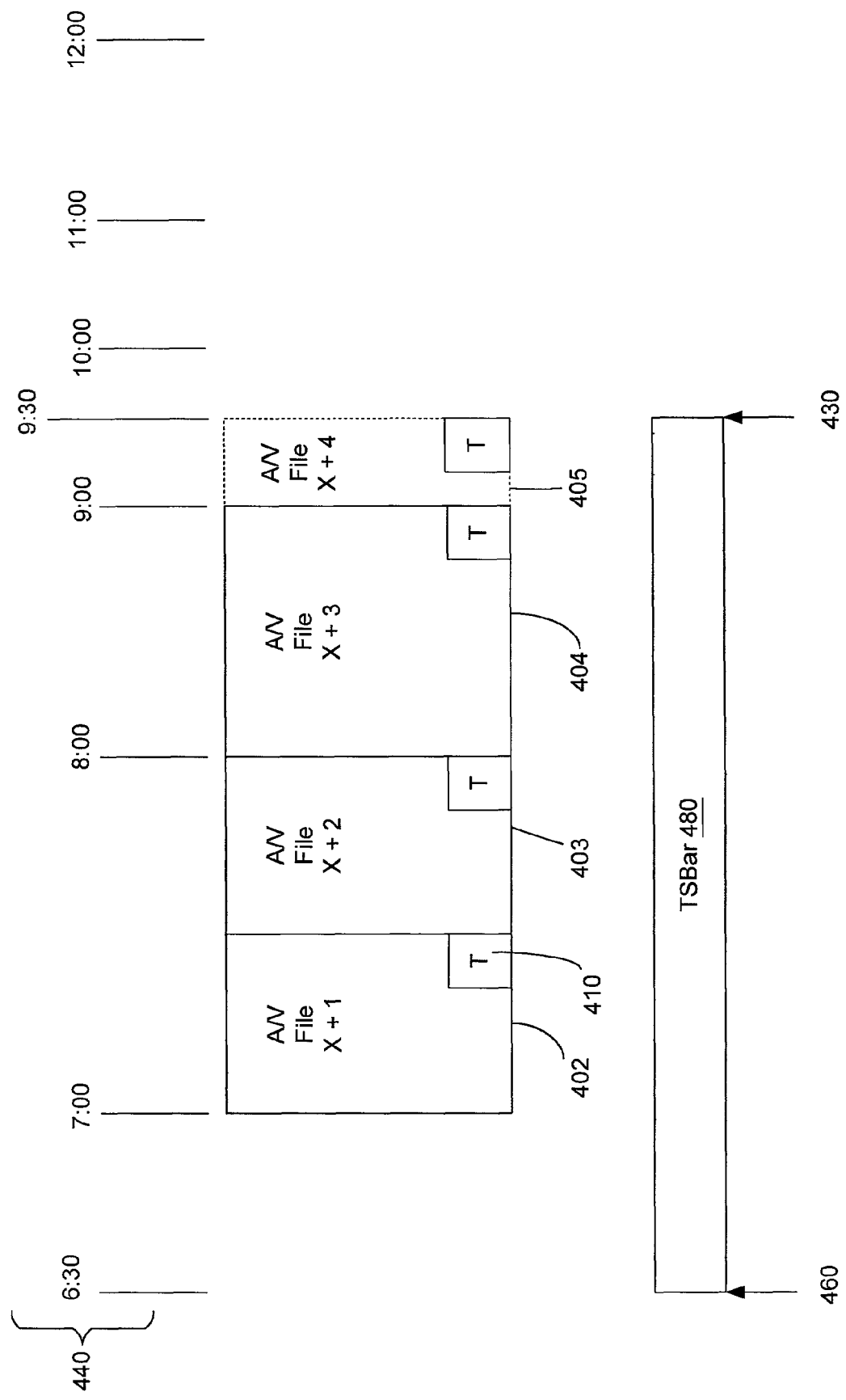
FIG. 5 is a block diagram illustration of media content instance files in the time shift buffer, where the current media content instance download causes the automatic deletion of the earliest temporary media content instance file based on approximately exceeding buffer capacity, in accordance with one embodiment of the invention.

FIG. 5 represents the current time at 9:30, as indicated by live point 430. The beginning 460 of the TSBar 480 has shifted as time elapsed and will soon be greater than the start time for the 6:30 media content instance represented by "A/V file x" 401 (FIG. 4). In other words, since the capacity of the TSB 378 would be about to be exceeded, the PVR application 377 (FIG. 3A) will act to maintain the TSB capacity (of 3-GB) as substantially constant. As described earlier, the PVR application 377 maintains a substantially constant TSB capacity by deleting the earliest "temporary" media content instance file corresponding to the earliest media content instance buffered into the storage device 373. Because the "A/V file x" 401 has an associated management file "flagged" as temporary, "A/V file x" 401 is now deleted. As noted above, "deleting" preferably includes designating the associated clusters as writeable, or available, in a FAT and removing the management file, or record, from the data structure maintained by the PVR application 377. That is, the management file, with its corresponding filename and data, for the deleted media content instance stored in the TSB 378 of the storage device hard disk 300 (FIG. 3A), is cleared from memory, so that, in one implementation, the PVR application 377 is prevented from gaining access to the management file again.

Figure 6:
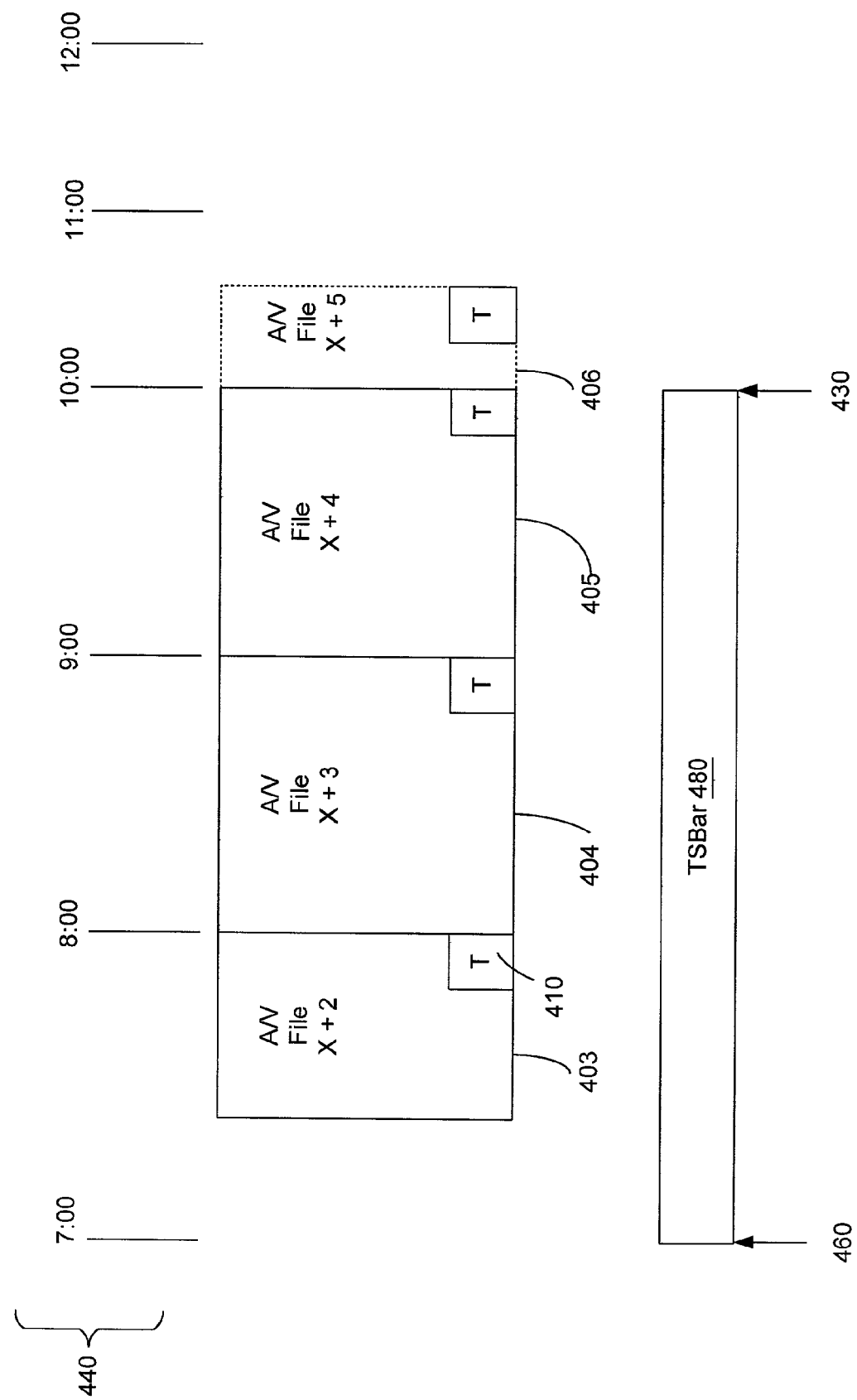
FIG. 6 is a block diagram illustration of media content instance files in the time shift buffer, with an example of a new media content instance starting at 10:00, in accordance with one embodiment of the invention.

FIG. 6 represents a live point 430 of 10:00. At this point, the 9:00 media content instance is over and its corresponding file, "A/V file x+4" 405, is closed. A new "A/V file x+5" 406 is created for the 10:00 media content instance as well as an associated management file in the data structure maintained by the PVR application 377. Shortly after the live point 430 at 10:00, the TSB capacity will be exceeded. Thus, the PVR application 377 looks for the earliest management file designated as temporary. Because "A/V file x+1" 402 has an associated management file designated (or "flagged") as temporary, "A/V file x+1" 402 is now deleted, as discussed above.

Figure 7:
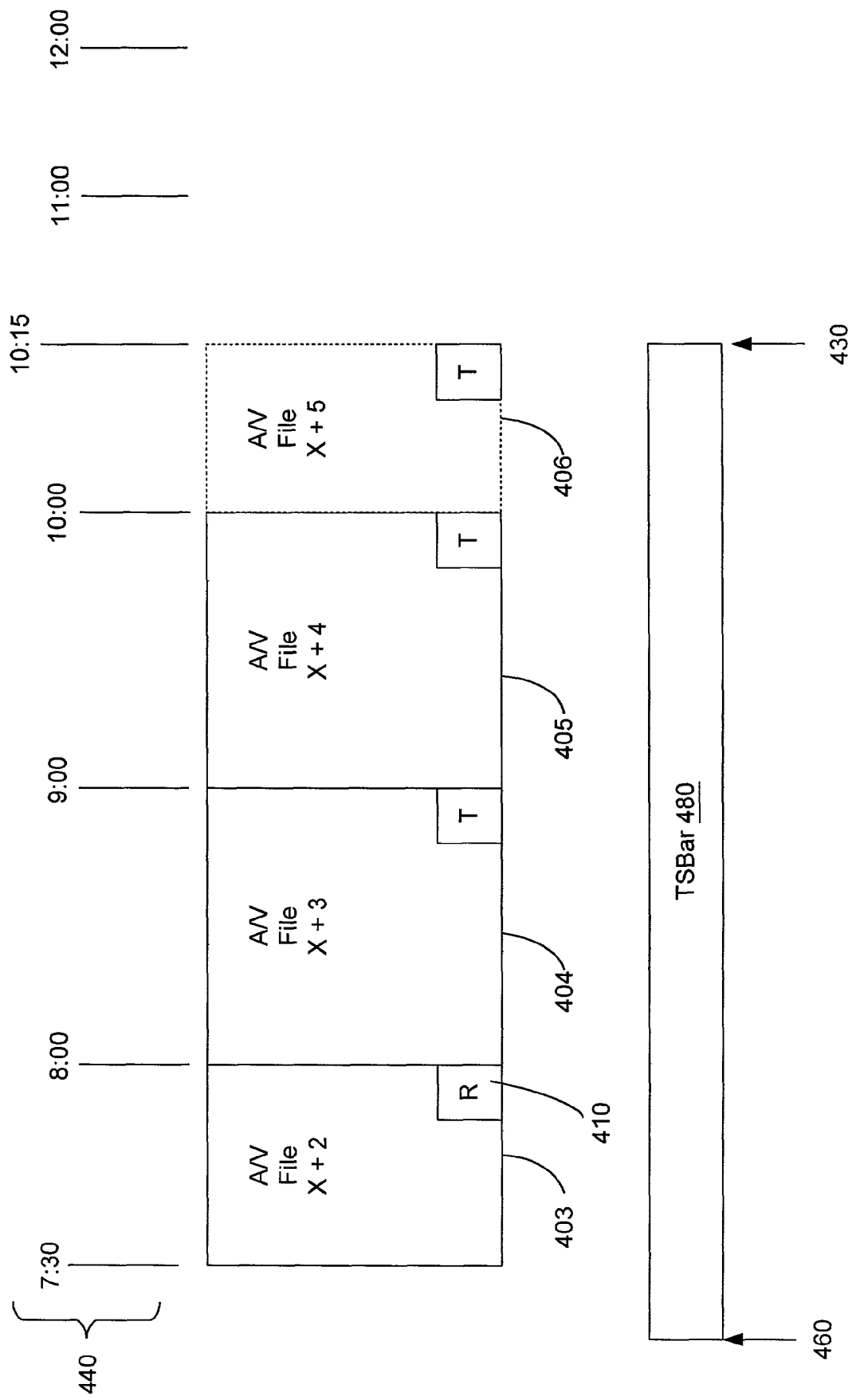
FIG. 7 is a block diagram illustration of media content instance files in the time shift buffer, wherein the user decides to convert an earlier media content instance from temporary to permanent recorded status, in accordance with one embodiment of the invention.
Figure 8:
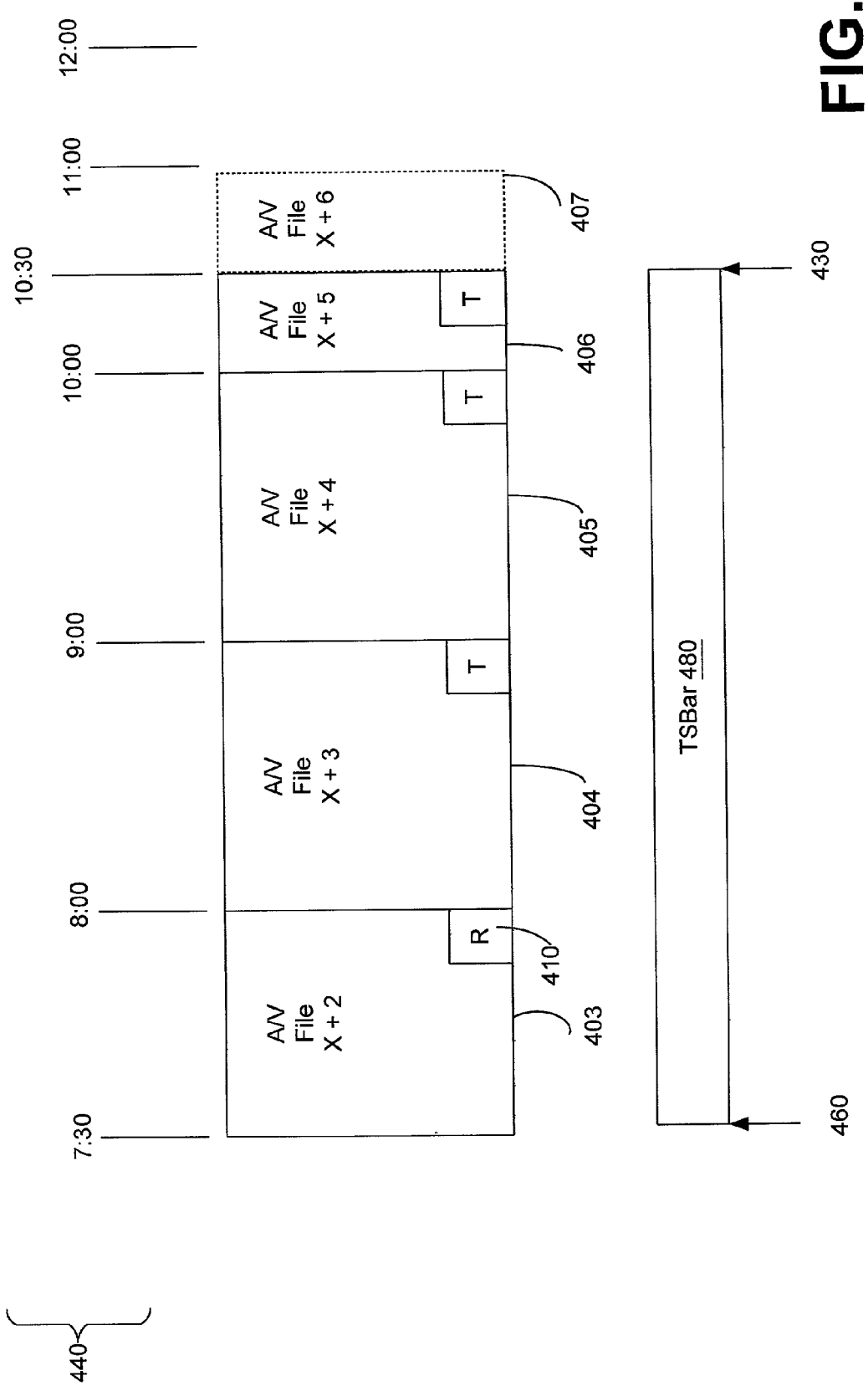
FIG. 8 is a block diagram illustration of media content instance files in the time shift buffer, demonstrating that the permanently recorded media content instance of FIG. 7 is not deleted due to its permanent recording status when buffer capacity is approximately exceeded, in accordance with one embodiment of the invention.

FIG. 7 depicts a live point 430 of 10:15. At this time, the user has, for example, decided to permanently record the 7:30 media content instance corresponding to "A/V file x+2" 403. Consequently, "A/V file x+2" 403 is designated by the PVR application 377 throughout the management data structure as permanently recorded, as indicated by the "R" in the file status indicator 410, which effectively removes the clusters storing the media content instance, represented by file "A/V file x+2" 403, from the TSB 378. FIG. 8 represents a live point 430 of 10:30. At this point, the 10:00 media content instance stored in the storage device 373 under filename "A/V file x+5" is over and "A/V file x+5" 406 is closed. A new file, "A/V file x+6" 407, is created for representing the 10:30 media content instance, and a new associated management file is created also. Shortly after this point, the beginning 460 of the TSBar 480 has "shifted" beyond the start time for the 7:30 media content instance written under filename "A/V file x+2". However, the file "A/V file x+2" 403 has an associated management file "flagged" as permanently recorded, and consequently, "A/V file x+2" 403 is not deleted by the PVR application 377 (FIG. 3A). In fact, because the PVR application 377 is tracking disk space, the capacity of the TSB 378 will not have been exceeded because the A/V file 403 had an associated management file that was designated by the PVR application as permanently recorded (and thus the corresponding media content instance will be stored in clusters outside of the TSB 378). Note that the block diagrams depicted in FIG. 7 and FIG. 8 are not intended to show that the media content instance corresponding to "A/V File x+2" 403, the media content instance now permanently recorded, is a part of the TSB 378. Instead, the reason for its depiction over TSBar 480 is to illustrate that "A/V File x+2" 403 and its associated content still exists but the content is removed from the TSB 378 and the file is managed by the PVR application 377 as a permanent recording).

Figure 9:
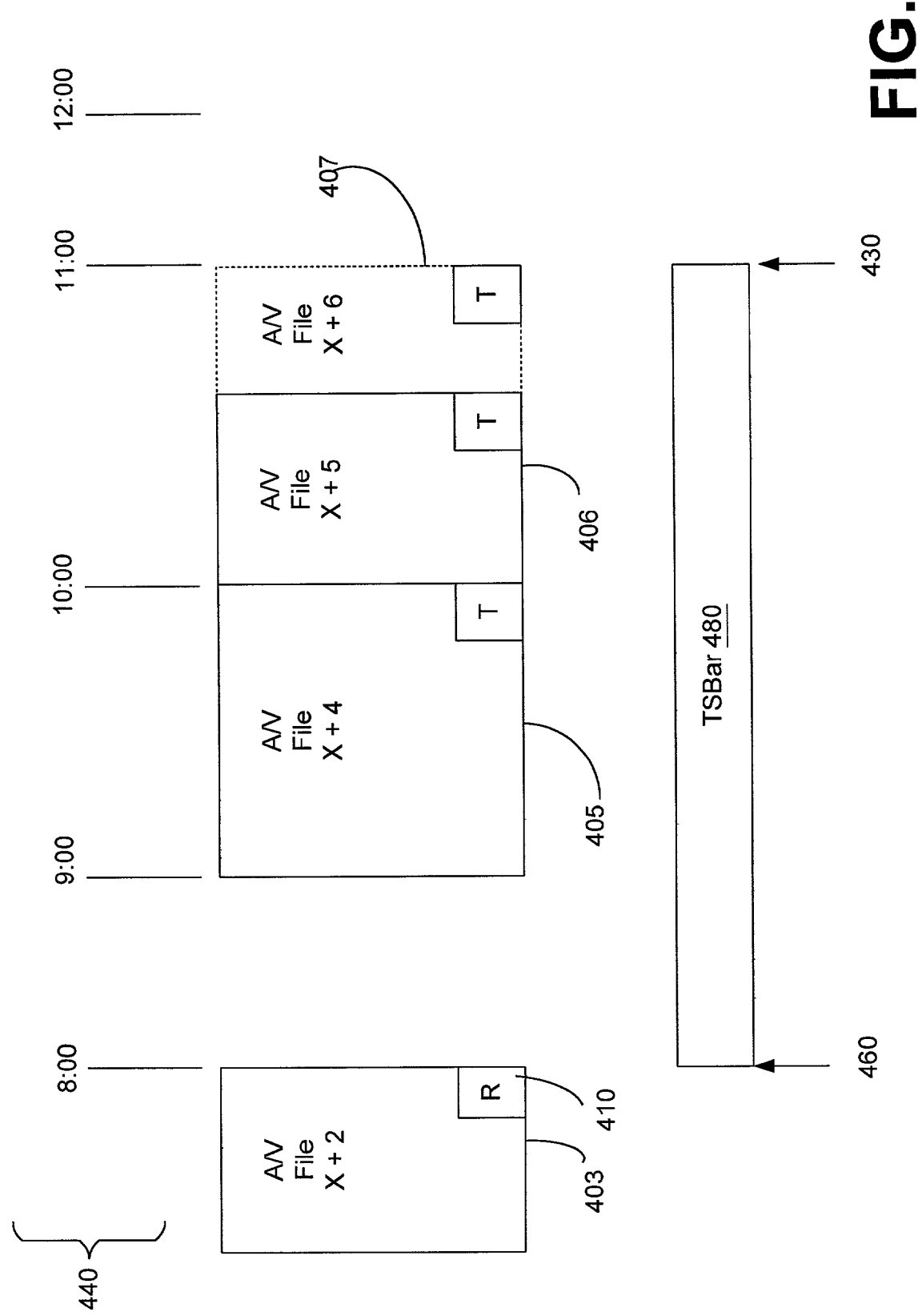
FIG. 9 is a block diagram illustration of media content instance files in the time shift buffer wherein the earliest temporary media content instance is removed to make room for a new media content instance when buffer capacity is approximately exceeded, in accordance with one embodiment of the invention.

FIG. 9 represents a live point of 11:00. At this point, the hour-long 10:30 media content instance is still buffering into the storage device 373 under filename "A/V file x+6". Also shortly after at this point, the beginning 460 of the TSBar 480 has "shifted" to a point in time that is greater than the start time for the 8:00 media content instance stored on the hard disk 300 under filename "A/V file x+3" for A/V file 404 (FIG. 8). This shift represents the fact that the TSB capacity of 3 GB is about to be exceeded. The PVR application 377 searches its management data structure to identify the earliest media content instance file designated as temporary. Since this media content instance (A/V file 404) is represented by the earliest management file marked temporary, it is now deleted, along with the associated management file. "A/V file x+2" 403, configured as permanently recorded via its associated management file, continues to exist (as does its associated management file).

FIGS. 10A and 10B are programming diagrams of example software programming code in conventional "C" computer language illustrating the application-level management audio/video files representing each media content instance received into the TSB 378. As discussed above, the management file structure is a linked list maintained by the PVR application 377 (FIG. 3A). Alternatively, among others, the management file structure can be a linked list in a table, similar to a computer spread sheet software program, records in a database, etc. Each media content instance received into the TSB 378 causes the PVR application 377 to create a link, or node, in a list of nodes representing the plurality of media content instances downloaded to the hard disk 300 of the storage device 373 (FIG. 3A). Each node is thus a management file corresponding to each received media content instance. Each node, or "tsbNode", is defined by the entire software programming structure of FIG. 10B. As noted, each "tsbNode" includes characterizing data for that media content instance (i.e. the characterizing data for each media content instance includes the data represented by the entire programming structure, "avFileData", in FIG. 10A), and "instructions" for the PVR application 377 to follow to traverse the list, such as a pointer to the next "tsbNode" (FIG. 10B) and a pointer to the previous "tsbNode" (FIG. 10B). The characterizing data for each media content instance is represented by the structure shown in FIG. 10A. This data is stored in DRAM 352, or alternatively, can be stored in the storage device 373. The brackets shown in the example programming structure of FIG. 10A provide a mechanism to group all of the elements of the "avFileData" together. Thus, "avFileData" comprises, in one implementation, four elements that include a media content instance filename, media content instance guide data, status indicator, and start time. Line 1092 illustrates that the PVR application 377 provides a filename for the newly created A/V file, or media content instance file. The PVR application 377 will cause the received media content instance to be written into the storage device 373 buffer space (i.e. TSB 378) under a given media content instance file name, for example, "A/V file x". Line 1094 illustrates that the PVR application 377 receives media content instance guide data (for example, IPG data) associated with each media content instance file, including, but not limited to, scheduled start and stop times. This media content instance guide data is preferably communicated to the PVR application 377 from an IPG data structure in memory 349 or from a remote location such as, for example, the head end 11. Line 1096 illustrates that when a media content instance file is created for a media content instance, the associated management file is marked or flagged by the PVR application 377 as either temporary ("0") or permanently recorded ("1"). The default setting is "0" (temporary). When a user requests that at least one of the media content instances included in the time shift buffer (TSB) 378 becomes permanently recorded, this request is communicated to the PVR application 377 and the flag is set to "1". The PVR application 377 then causes the media content instance to be allocated in non-buffer space (i.e. the associated clusters are removed from the TSB 378, or rather, re-designated as non-buffer space clusters) in the storage device 373. Line 1098 illustrates that the PVR application 377 keeps track of when the media content instance is buffered in order to determine the oldest temporary media content instance file in the time shift buffer (TSB) 378. This is a real-time value provided by the operating system 353 in cooperation with real-time clock (not shown) within the DHCT 16.

This recording of "startTime" enables the PVR application 377 to delete the management file corresponding to the first buffered media content instance, resulting in the "removal" or "deletion" (i.e. made writeable) of the earliest, temporarily configured media content instance in the TSB 378 of the storage device 373 to make room for a newly received media content instance. If a user has not chosen to keep (or "permanently record") a media content instance, the PVR application 377 will automatically "delete" temporary files based on available temporary storage in the TSB 378, preferably "deleting" the earliest saved file first, as described above. Thus, when a new media content instance begins (e.g. an 8:00 show), the PVR application 377 creates a new "tsbNode" (FIG. 10B) and adds it to the list of "tsbNodes". Then, the PVR application 377 creates the "avFileData" structure of FIG. 10A. The PVR application 377 will create a media content instance file name, and associate the filename with the media content instance guide data for that "tsbNode", it will configure the management file as temporary (set to "0"), and will record a start time for buffering the media content instance.

FIG. 10B is a block diagram of a non-limiting example of a mechanism for structuring each linked management file for each media content instance downloaded to the TSB 378 with executable code in a "C" structure. As shown, the example programming structure includes programming lines of data type "node" ("tsbNode"), with variables "nextNode" and "prevNode" pointing to 32-bit memory addresses indicating where the management file and corresponding characterizing data for the last node (i.e. management file) and the next node is located. The time shift buffer (TSB) 378 may be represented as a linked list of "tsbNodes" in a data structure in the PVR application 377. Alternatively, this structure may be resident in other locations in memory 349, including but not limited to application memory 370. The media content instance file itself is located by the operating system 353 (FIG. 3A) through the mechanism of the PVR application 377 providing the media content instance file name contained in the "avFilename" element (FIG. 10A, line 1092). The actual play point within the media content instance file can be additional data (not shown) added to the "avFileData" structure of FIG. 10A. Thus, the PVR application 377 can track where in the media content instance a user has, for example, rewound to. The PVR application 377 keeps a pointer to the current record location in the temporary file and plays back from that point when transitioning from, for example, Live TV to a trick mode (e.g. rewind, replay, etc.). When the beginning of a media content instance file is reached from a rewind operation, the PVR application 377 will rewind to the end of the previous recorded media content instance file. At any point in a media content instance the user can select to "permanently record" the media content instance because the PVR application 377 recognizes any point within a media content instance as being represented by a particular media content instance file name. The PVR application 377 will then mark management file as permanently recorded instead of temporary and will not automatically delete it or the associated media content instance file, as discussed above.

Figure 11:
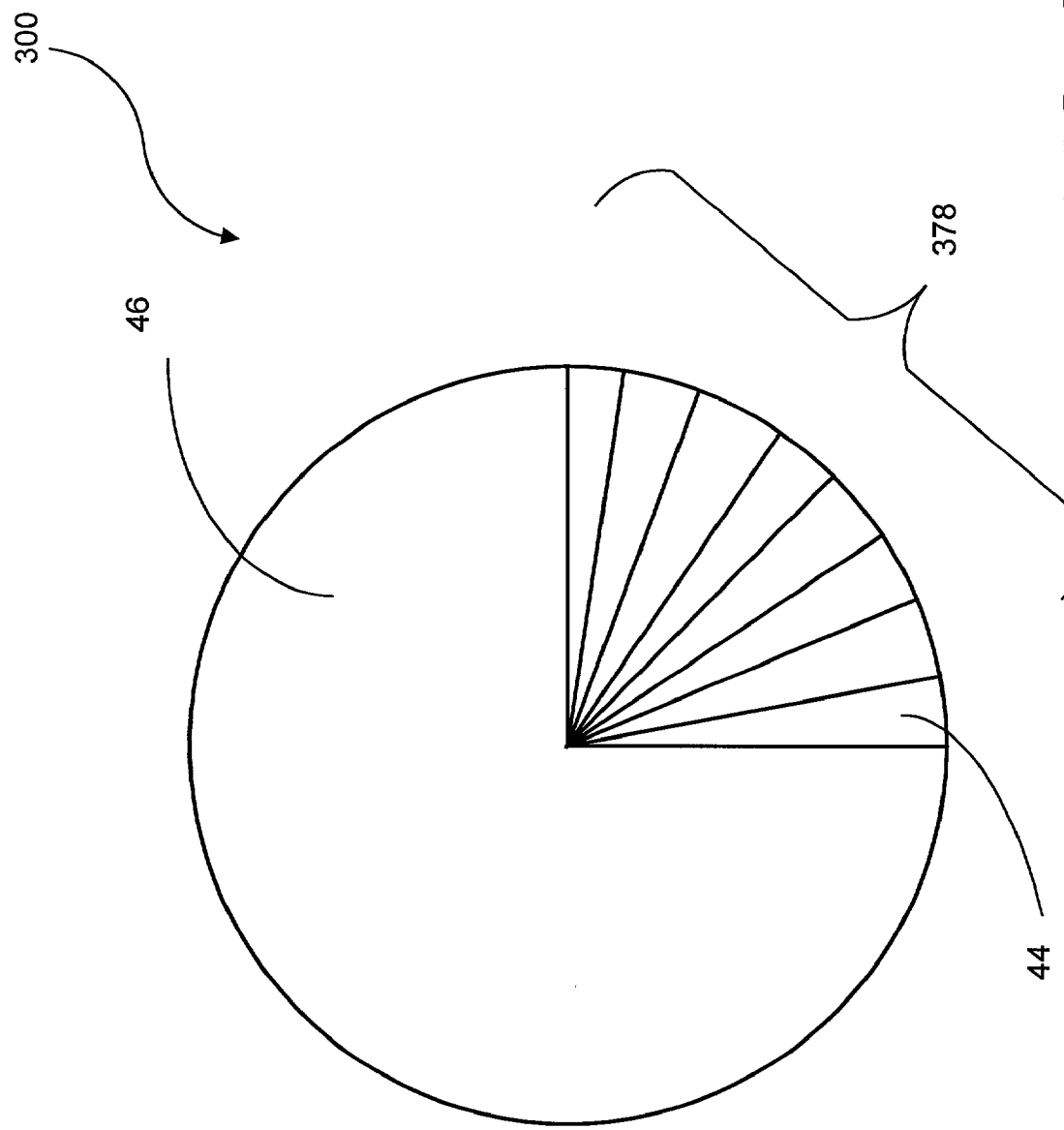
FIG. 11 is a block diagram representing a hard disk divided into a time shift buffer and non buffer space, with the time shift buffer comprising several media content instances, in accordance with one embodiment of the invention.

FIGS. 11 through 15 are block diagrams that illustrate how PVR application 377 management of the TSB 378 effects operations at the hard disk 300 of the storage device 373. FIG. 11 is non-limiting illustrative example of the hard disk 300 in storage device 373. The hard disk 300 has a finite amount of hard disk drive space. Assume for this example a 40 GB hard disk. Also assume that the PVR application 377 will maintain a 3-hour buffer (i.e. a 3-hour TSB 378), which, based on a substantially constant data rate of 2 Mbps at standard quality, equates to a TSB 378 of approximately 3 GB. Alternatively, other variable or constant data rates may be used. For example, regardless of the bit rate, the PVR application 377 continuously queries the device driver 311 (FIG. 3A) for information regarding hard disk space. If the bit rate is fast, the PVR application 377 will delete files at a faster rate than if the bit rate is slow. In some embodiments, excessive data rates, such as those associated with high definition TV (HDTV) and quickly consume the TSB 378. In such embodiments, the PVR application 377 can determine the quality level from the incoming content stream, or monitor how fast disk space is being consumed. If the bit rate is excessive, the PVR application 377 can cause the content to bypass the TSB 378 and either be permanently recorded, or refused as a download. In other embodiments, such as DHCTs with large enough hard disk drives to handle HDTV, practically any bit rate can be accommodated by the TSB 378.

In this example, eight media content instances, or programs, were written to the hard disk until the TSB 378 capacity of 3-GB was reached. TSB 378 is illustrated as broken down into eight triangular pie portions, each portion depicting one or more clusters, such as first cluster group 44, wherein the clusters are used for storing a downloaded media content instances. Each media content instance is represented by a management file created and stored by the PVR application 377. Thus, first cluster group 44 comprises segments holding data corresponding to a first buffered media content instance. Thus, TSB 378 is illustrated here with 8 buffered audio/video (A/V) media content instances, as depicted by the 8 pie portions. The media content instances written to the TSB 378 are represented as a group of contiguous cluster groups apportioned from the free, or available, space 46. The writing of the media content instances to the hard disk 300 have resulted in a reduction of available free space in the amount of 3-GB, resulting in 37 GB (40–3) of free space 46. Although shown as contiguous groups of clusters, it is understood and well known to those of ordinary skill in the art that a downloaded media content instance can be stored in one or more clusters that are scattered, or fragmented, throughout the available hard disk space as described earlier. The TSB 378 is not necessarily a pre-designated, physically bounded area of the hard disk space, but instead represents temporarily un-writeable hard disk space, in this example equating to 3-GB as provided for by the PVR application 377. Alternatively, the hard disk space may be physically divided into free space and buffer space, or alternatively, free space, buffer space, and relatively permanently recorded space. When a new media content instance starts, or when the display channel is changed (via selection by a viewer using a remote control, as one example), a management file and media content instance file are created by the PVR application 377, as described above. The PVR application 377 causes the media content instance to be written into the available hard disk space under the media content instance file name provided by the PVR application 377. In one implementation, the PVR application 377 will generate a unique file name, for every media content instance, that may or may not be based on the name of the media content instance. In the case of being named for the media content instance, the file name can also comprise (in addition to the information provided for by the "avFileData" structure of FIG. 10A) the display channel number, the source of the media content instance, or any combination of this information, or more. The PVR application 377 also tracks the incoming, deleted, and permanently recorded media content instances in order to add and discard media content instances from the TSB 378 to maintain the TSB capacity as substantially constant. The media content instance file name associated with the downloaded media content instance is entered into the FAT table, enabling the PVR application 377 to identify a downloaded media content instance with a corresponding file name.

The TSB 378 is dynamic, and acts as a carousel in that the clusters storing the oldest media content instances are made writeable, and hence removable, to make room for replacement clusters for storing new media content instances while maintaining the capacity of the TSB 378 substantially constant. Thus, media content instances have a temporary residence in the TSB 378. For example, cluster group 44 stores the first media content instance received into the TSB 378. Assume that the TSB 378 (the capacity of which is provisioned for by PVR application 377) is at or near capacity. Either by channel change, or new media content instance start, a cluster group is required to receive the new media content instance into the TSB 378. At the application level, as described earlier, the PVR application 377 deletes the earliest temporarily management file corresponding to the earliest buffered media content instance, and creates a new management file for the next downloaded media content instance. At a lower level of abstraction, the PVR application 377 communicates to the operating system 353, as described earlier, which media content instance file name in the FAT to make available, or write-able. The FAT is updated by the operating system 353 to configure the cluster group 44 corresponding to that media content instance file name as available, or writeable, and communicates this information to the device driver 311. The device driver 311 can cause the driver controller 379 to effect the next write operation over any available clusters in the hard disk space, including one or more of the clusters of cluster group 44. This process is dynamic, wherein the PVR application 377 causes the earliest media content instance temporarily stored in the TSB 378 to be write-able (i.e. its clusters writeable) to make room for a new downloaded media content instance while maintaining a substantially constant TSB capacity. If the newly downloaded media content instance eventually required more clusters than were made available by the deletion of the earliest temporary media content instance file, the PVR application 377 would delete the next earliest temporary media content instance file, and the corresponding clusters would be made available for eventual writing operations. There are at least two additional considerations regarding the aforementioned scheme. The first consideration is for media content instances that the user requests to be permanently recorded as scheduled permanent recordings. This user request can be explicit or implicit based on viewing habits. For example, a scheduled permanent recording can be effected by the user selecting a desired media content instance or one or more types of media content from a list on a screen display. The type of media content (e.g. westerns, comedies, action, etc) can be presented to the user (for selection, or user configurable without a pre-configured list), and then a preference filter can seek and effect the receipt of such content for contemporaneous and/or later viewing. A preference filter can also be employed that tracks the viewing habits of one or more users and autonomously selects, for scheduled permanent recordings, media content instances that match the type of media content (or the specific media content instance—for example, a particular show) the user has historically viewed. The second consideration is for permanent recordings made out of the TSB 378. In some embodiments, the preference filter discussed in relation to scheduled permanent recordings can also be employed to select media content from the TSB 378 that match user preferences for automatic or user-confirmed permanent recordings from the TSB 378.

Figure 12:
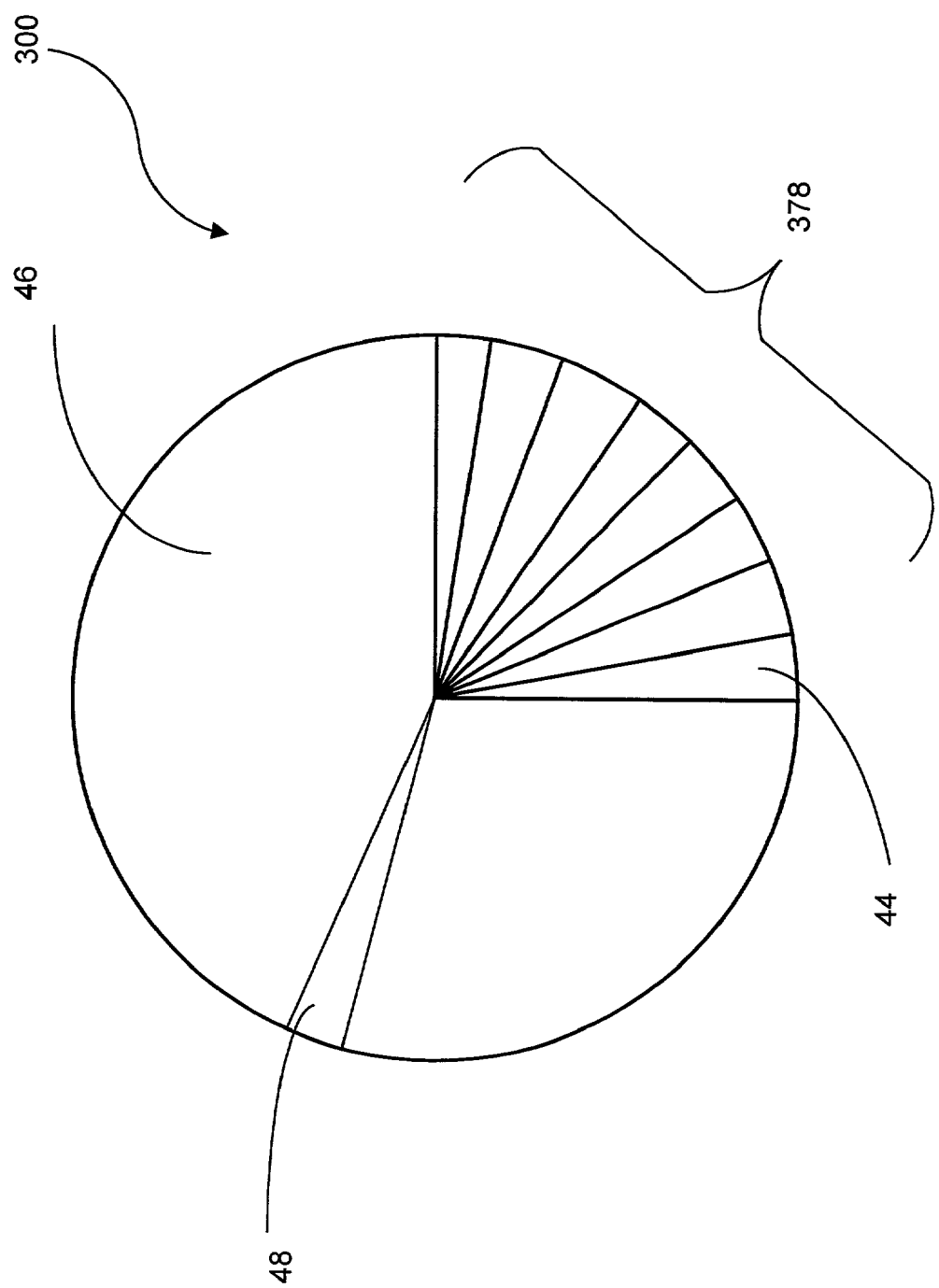
FIG. 12 is a block diagram illustrating how the hard disk space depicted in FIG. 11 is effected by the PVR application for a scheduled permanent recording, in accordance with one embodiment of the invention.

FIG. 12 is a block diagram of the example hard disk 300 illustrating a non-limiting example of a scheduled permanent recording. A scheduled permanent recording is a recording where preparations are made in advance of the scheduled media content instance start time. For instance, today may be Wednesday, and the viewer knows he or she will be out of town Thursday and unable to watch his or her favorite media content instance that is presented on Thursday. The user may program the DHCT 16 to permanently record the favorite media content instance when it airs on Thursday. As noted from FIG. 12, scheduled media content instances are not received into the TSB 378. That is, the PVR application 377 causes the scheduled media content instance to be written to free space clusters under a given media content instance file name, but a temporary management file is not created in the PVR application 377 for management of the size and/or capacity of the TSB 378. The TSB 378 is not directly impacted by the writing of the scheduled media content instance to the hard disk space. Thus, the scheduled permanent recording is effectively stored under a non buffer space cluster group 48 apportioned out of the free space 46 on the hard disk 300. Alternatively, the hard disk space may be physically partitioned into free space, permanently recorded space, and buffered space, wherein the scheduled permanent recording would consequently be received into a permanent recorded space cluster group. In this example, the scheduled permanent recording requires 3 GB of the 37 GB of available free space 46 (recall from FIG. 11, 40 GB initially less the 3 GB for the TSB 378). Thus, after the scheduled permanent recording, 34 GB (37−3) of free space 46 is available. This update is communicated by the device driver 311 to the operating system 353, which can communicate this status to the PVR application 377.

Figure 13:
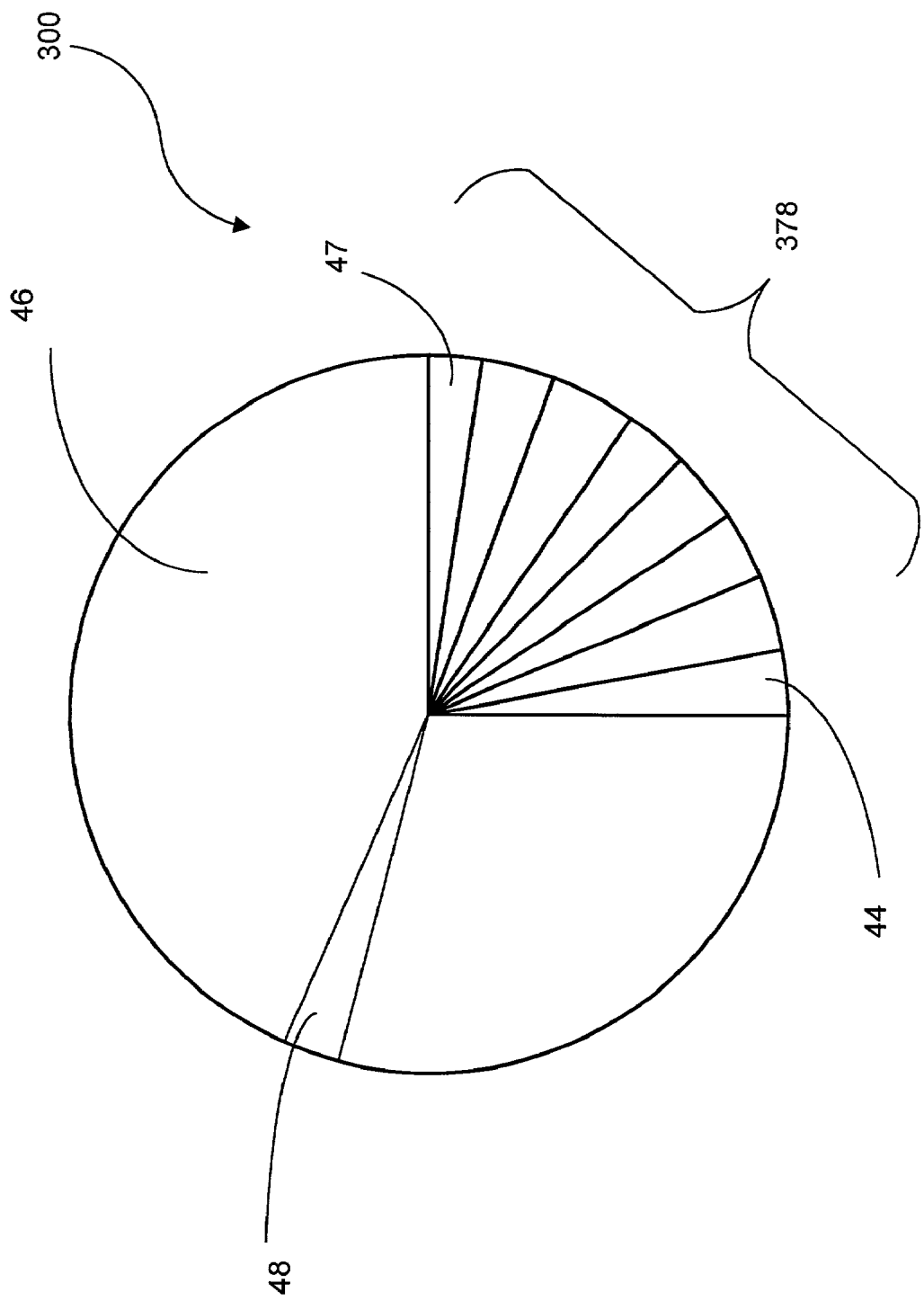
FIG. 13 is a block diagram illustrating how the hard disk space depicted in FIG. 11 is effected by the PVR application for permanent recordings out of the time shift buffer, in accordance with one embodiment of the invention.
Figure 14:
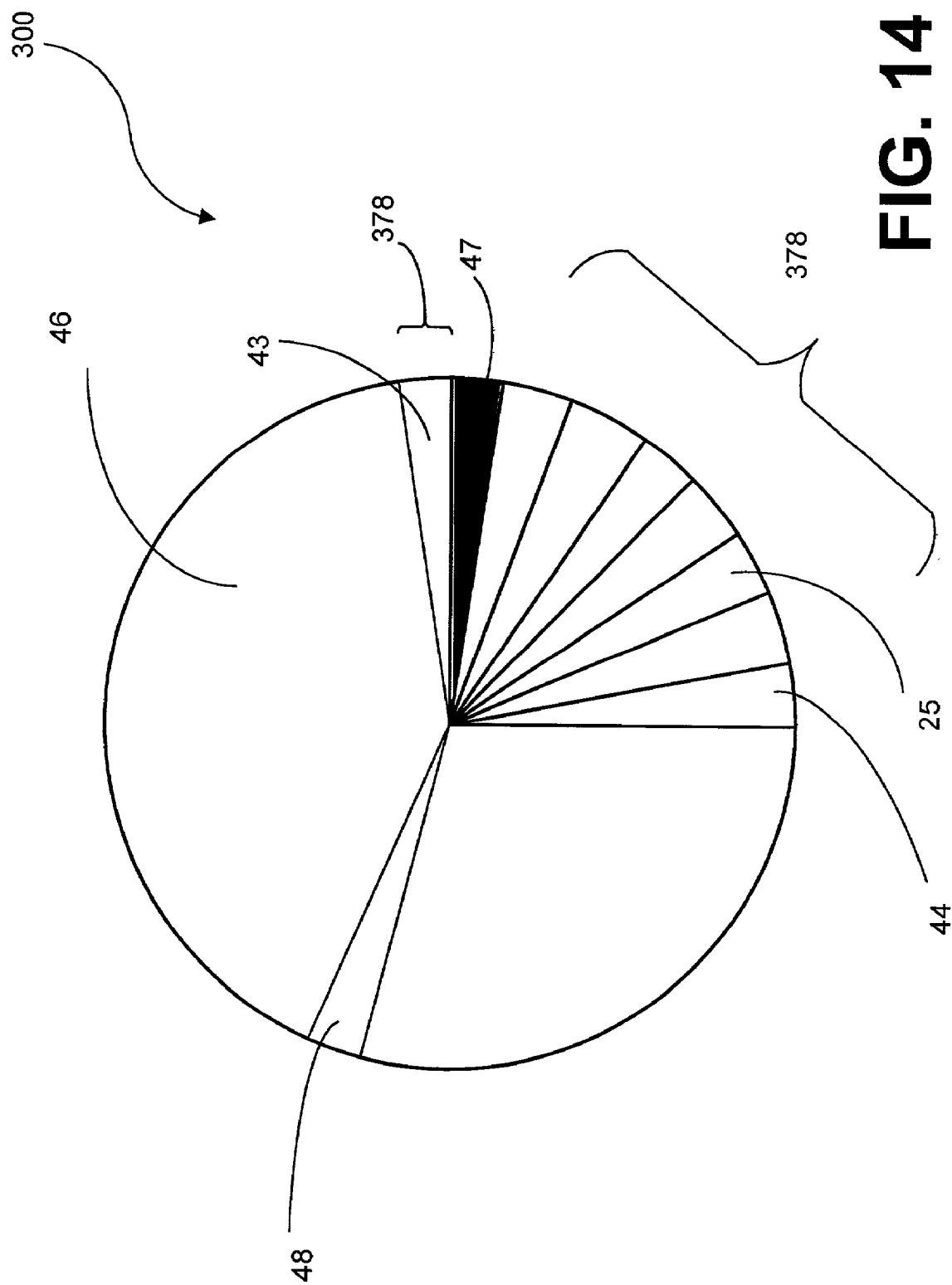
FIG. 14 is a block diagram illustrating how a cluster group in the hard disk space depicted in FIG. 13 is allocated as non buffer space in response to the PVR application effecting a permanent recording out of the time shift buffer, in accordance with one embodiment of the invention.
Figure 15:
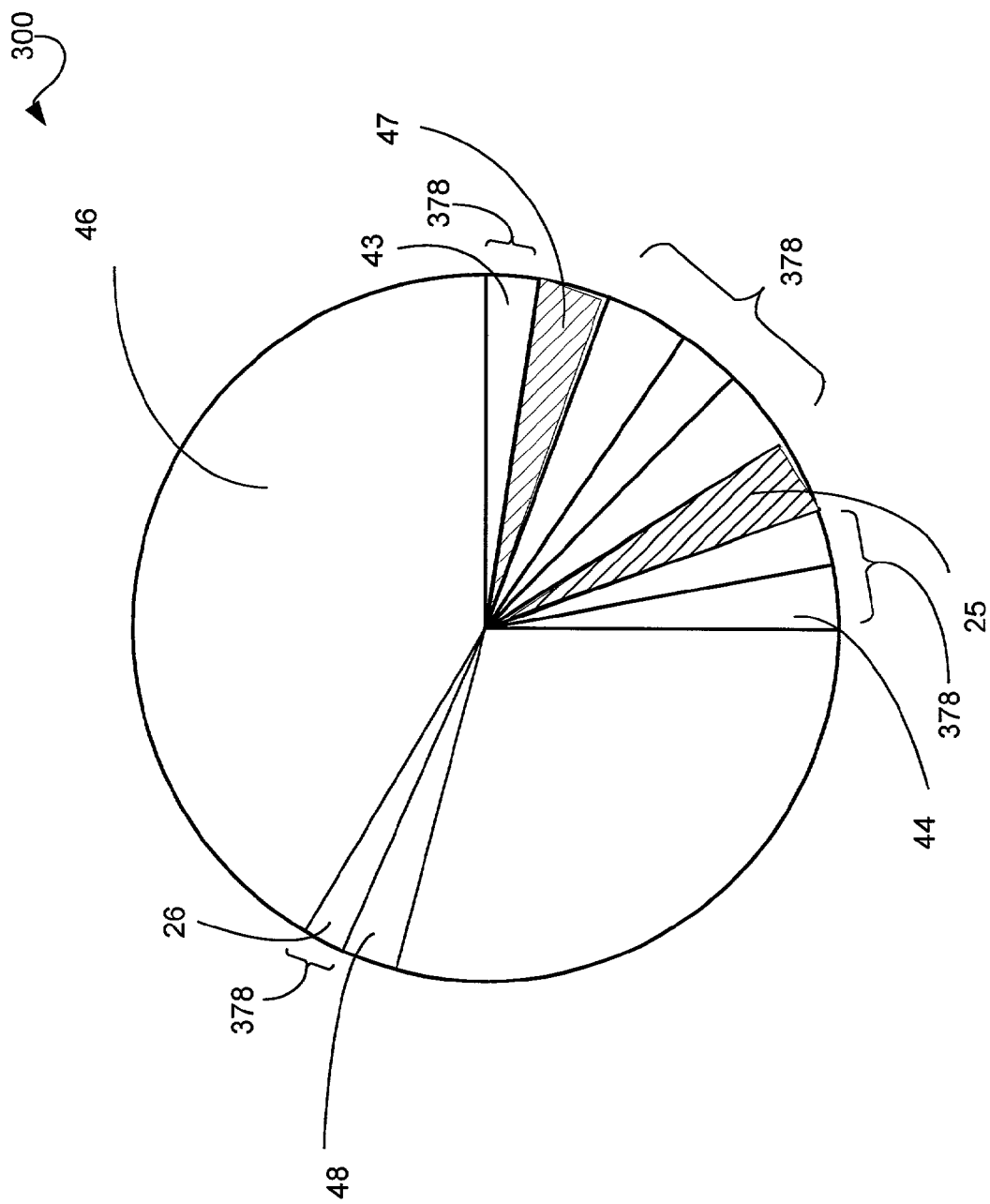
FIG. 15 is a block diagram illustrating how the media content instance cluster group as depicted in the hard disk space of FIG. 14 becomes allocated as non buffer space while an equivalent amount of free space is allocated as buffer space, in accordance with one embodiment of the invention.

FIG. 13 is a block diagram illustrating how the hard disk space is effected by the PVR application 377 (FIG. 3A) for permanent recordings out of the TSB 378. In the preferred embodiment, the user may permanently record any media content instance temporarily stored in the TSB 378. For example, and continuing with the prior example illustrated in FIG. 12, assume the user is viewing a media content instance, requiring 2-GB of disk space, which is being received in cluster group 47 (FIG. 13), and the user decides that he or she likes this media content instance enough to permanently record it. Upon a user request to permanently record the media content instance, the PVR application 377, as described previously, designates the corresponding management file as a permanently recorded file. The PVR application 377 communicates this change in configuration to the device driver 311 (with the cooperation of the operating system 353), causing the media content instance cluster group 47 to be designated as non buffer space as illustrated by the hashed lines through cluster group 47 in FIG. 14. Further, the PVR application 377, in cooperation with the operating system 353 and device driver 311, eventually reallocates a substantially equivalent amount of free space in the form of cluster group 43 as buffer space in the TSB 378 to maintain the TSB capacity as relatively constant. Note that by using the term eventual, or eventually, it will be understood to mean that clusters are allocated as needed by a write operation effected by the PVR application 377. Thus, if a media content instance file is made permanent, there can be several clusters storing the corresponding media content. An immediate replacement cluster is allocated to write content to the TSB 378, but replacement clusters totaling the clusters lost to the permanent recording will be allocated on a cluster-by-cluster basis up to the TSB capacity. Continuing, the media content instance will then continue to be permanently recorded into the media content instance cluster group 47 designated as non buffer space, or rather, permanently recorded space. The PVR application 377 also "recognizes", as described earlier, that the amount of free space has been reduced (40 GB−3 GB−3 GB−2 GB=32 GB). As another example, assume that the user desires to permanently record an earlier buffered media content instance, for example, a media content instance stored under a media content instance file name corresponding to cluster group 25. The user "returns" or rewinds to anywhere in the selected media content instance (as will be described later) in the TSB 378 and, in one implementation, selects "record" from a remote device 380 or directly on the DHCT 16. Referring to FIG. 15, the cluster group 25 storing the newly permanently recorded media content instance is designated as non-buffer space (again as indicated by the hashed lines through cluster group 25), and an equivalent amount of free space 26 to be used as buffer space in the TSB 378 is eventually allocated and now available for a write operation in the TSB 378.

Figure 16:
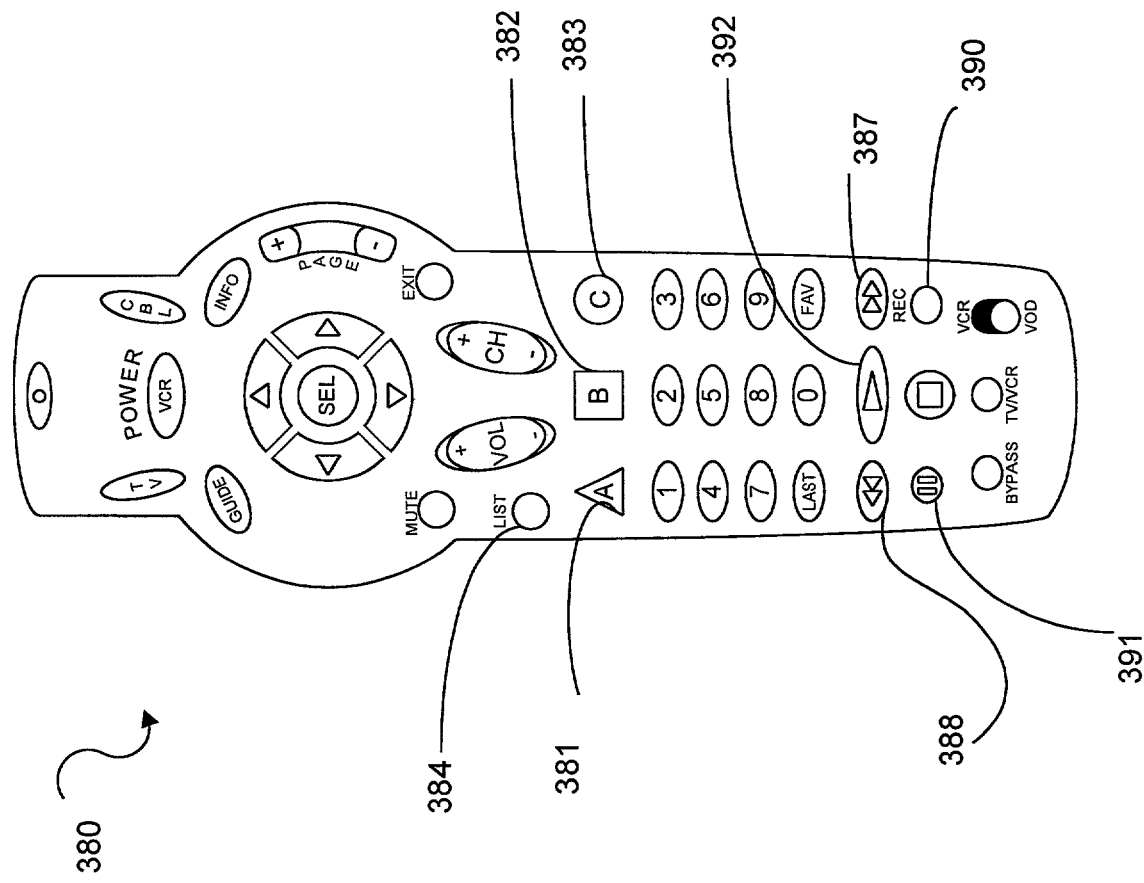
FIG. 16 is a block diagram of an example remote control device to provide input to the DHCT 16 illustrated in FIG. 3A, in accordance with one embodiment of the invention.

As described earlier, the user preferably permanently records from the TSB 378 by recording a currently viewed media content instance in real-time or returning to any part of a media content instance in the TSB 378 and selecting record from a remote device 380, or alternatively, from selecting record on the DHCT 16. An example remote control device 380 to provide input to the DHCT 16 is illustrated in FIG. 16. Rewind 388 and fast-forward 387 buttons enable a user to access buffered media content instances in the TSB 378. Record button 390 enables the user to permanently record any media content instance buffered into the TSB 378, as described below. Pause button 391 enables the user to pause a media content instance, or pause during a search for a particular media content instance. Playback 392 enables the playback of a media content instance. "A" 381, "B" 382, and "C" 383 buttons can correspond to certain application-defined functions that have a corresponding "A", "B", or "C" symbol displayed on the user interface. List button 384 is used to invoke various PVR application 377 user interface screens, as described below. Many alternative methods of providing user input may be used including a remote control device with different buttons and/or button layouts, a keyboard device, a voice activated device, etc. The embodiments of the present invention described herein is not limited by the type of device used to provide user input.

The PVR application 377 provides several different user interfaces that provide the user with easy to follow and informative information about the media content instances written to, or about to be written to, the hard disk 300 (FIG. 3A). As described above, the user can schedule a permanent recording in advance or select record on the remote control device, among other mechanisms, to initiate permanent recordings from the TSB 378 (i.e. manual permanent recordings). When a user decides to permanently record (e.g. from an IPG grid for future permanent recordings or directly from the TSB 378), a sequence of events occurs before the permanent recording takes place. These events include operations within the DHCT 16 and/or in cooperation with the headend 11 (FIG. 2). These events include, among others, checks to ensure the user is authorized to receive the media content instance of interest, and checks to detect and resolve permanent recording scheduling conflicts. If the user is authorized, and scheduling conflicts are resolved, the hard disk 300 can be checked for enough space to permanently record the entire media content instance. For example, FIG. 17A is an example screen display barker that is overlaid on a currently viewed media content instance (not shown) after the permanent recording sequence has begun for a scheduled permanent recording. The example screen display barker 1700 is prompted when there is not enough space for a single episode. As noted by the available free space line 1755, there is only 14 minutes of free space available for the user to permanently record to. This 14 minutes does not include the disk space reserved for the TSB 378. This 14-minute calculation is determined like all other free space indications. First, the PVR application 377 reserves disk space for the TSB 378, and then accounts for that value before providing an available free space amount. For example, if a 40-GB hard disk is used, and 10 GB was reserved by the PVR application for the TSB 378, 10-GB is subtracted from the total available disk space to determine the available free space for permanent recordings. All permanent recording space indications (i.e. available free space) on a displayed screen will start with, in this example, 30 GB (40−10), regardless of whether there is content in the TSB 378 or not. The user is thus presented with a consistent free space indication, or rather, an available free space indication that is independent of the TSB 378, and unaffected by media content downloaded into the TSB. As illustrated in FIG. 17A, the user is presented with a series of options in order to resolve this full hard disk situation. Note that the available free space indication (for FIGS. 17-19) is presented as a time display (e.g. hours and minutes). All of the displays herein present an estimated time available for permanent recordings based on the amount of disk space available (after the TSB is accounted for) at a defined average bit rate. The PVR application 377 (FIG. 3A) provides for a default value for the bit rate which equates to the average bit rate for most media content instances. In other embodiments, the bit rate can be estimated, and in other embodiments, the PVR application 377 can use the combination of a default value and an estimated value based on monitoring the disk space consumed for downloaded media content. Still in other embodiments, the user can be presented with a screen display that configures the bit rate based on a selectable list of quality settings (e.g. low, medium, or high quality settings) that the PVR application can adjust to.

FIG. 17B is an example screen display barker that is overlaid on a currently viewed media content instance (not shown) after the permanent recording sequence has begun for a manual permanent recording (i.e. directly from the TSB 378). As illustrated, example screen display barker 1710 includes an available free space line 1760 to provide the user with a consistent indication of available free space, as well as an indication as to the required disk space for the permanent recording. Again, the TSB 378 is not included in the available free space line 1760, although as described above, the TSB is reserved and thus accounted for.

FIG. 18 is a screen diagram of an example confirm recording screen display, in accordance with one embodiment. This display 1800 is prompted after authorization and conflict checks have been resolved, and there is sufficient space on the hard disk 300 for a permanent recording. As with the example screen display barker 1700, the example confirm recording screen display includes an available free space line 1855 that provides the user with a consistent indication of available free space. Media content instances buffered to the TSB 378 will have no effect on the time shown in the available free space line 1855.

Figure 19:
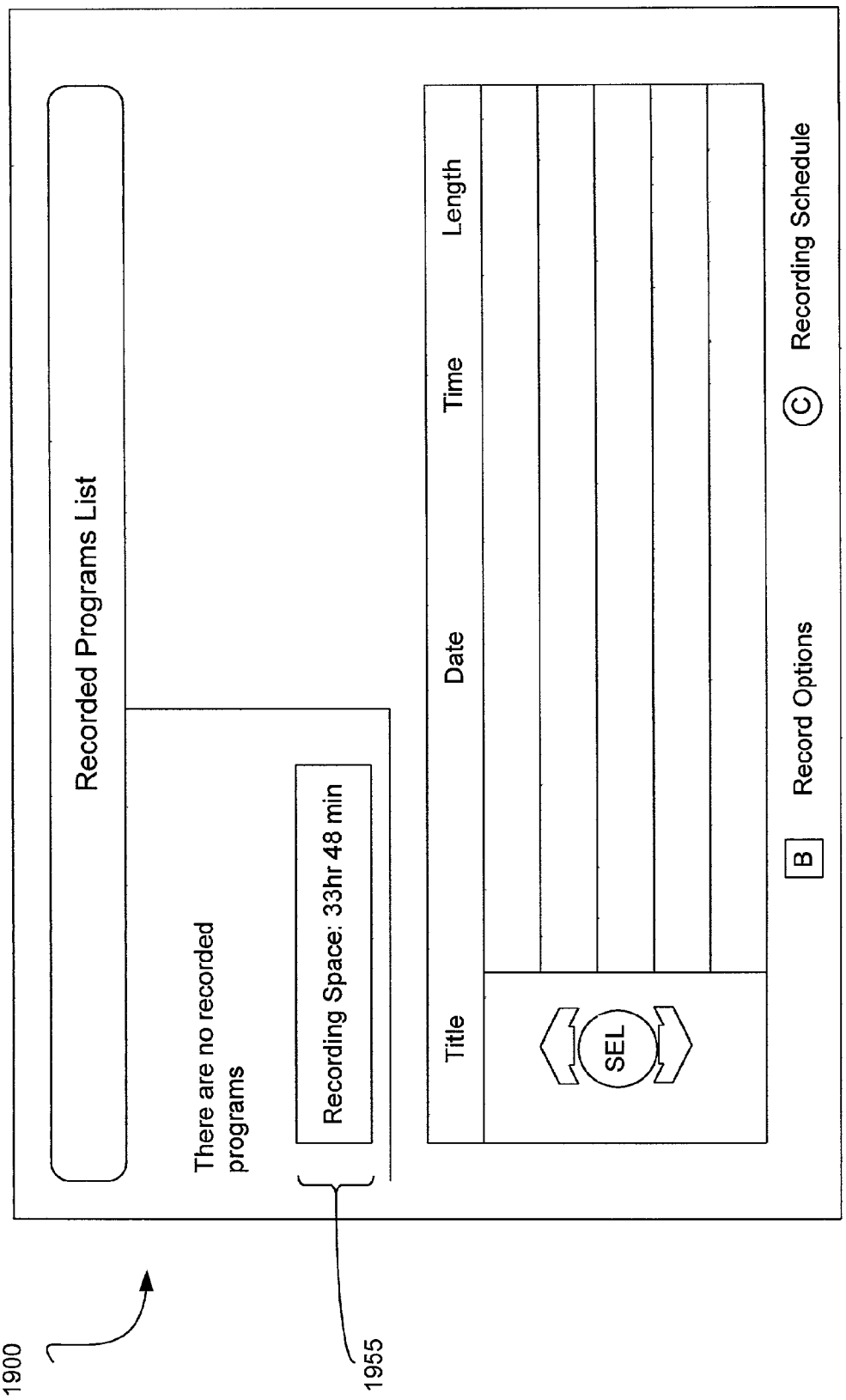
FIG. 19 is a screen diagram of an example recorded programs list screen display, with consistent free space indication, in accordance with one embodiment of the invention.

Once the permanent recording sequence is put into effect, the user can maintain the hard disk space through various screen displays. FIG. 19 is a screen diagram of an example recorded program (media content instance) list screen display, in accordance with one embodiment. In the example display 1900 of FIG. 19, no scheduled or manually permanently recorded media content instances are listed. The user can also reach the recorded programs list screen 1900 by selecting the "List" button 384 on the remote control device 380 (FIG. 16), among other mechanisms for reaching this screen. Note however that the user is presented with an available free space line 1955 that indicates to the user how much hard disk 300 (FIG. 3B) free space is available. As the user schedules permanent recordings or permanently records from the TSB 378, the time listed in the available free space line decreases, reflecting the usage of available hard disk free space for the permanent recordings. As noted, the user can press the remote button "C" 383 (FIG. 16) corresponding to the lettered symbol "C" shown at the bottom of the screen display 1900 in order to view a list of all scheduled permanent recordings on the hard disk 300. Also, the user can select the "B" button 382 on the remote control device 380 for learning about media content instance options.

Figure 20:
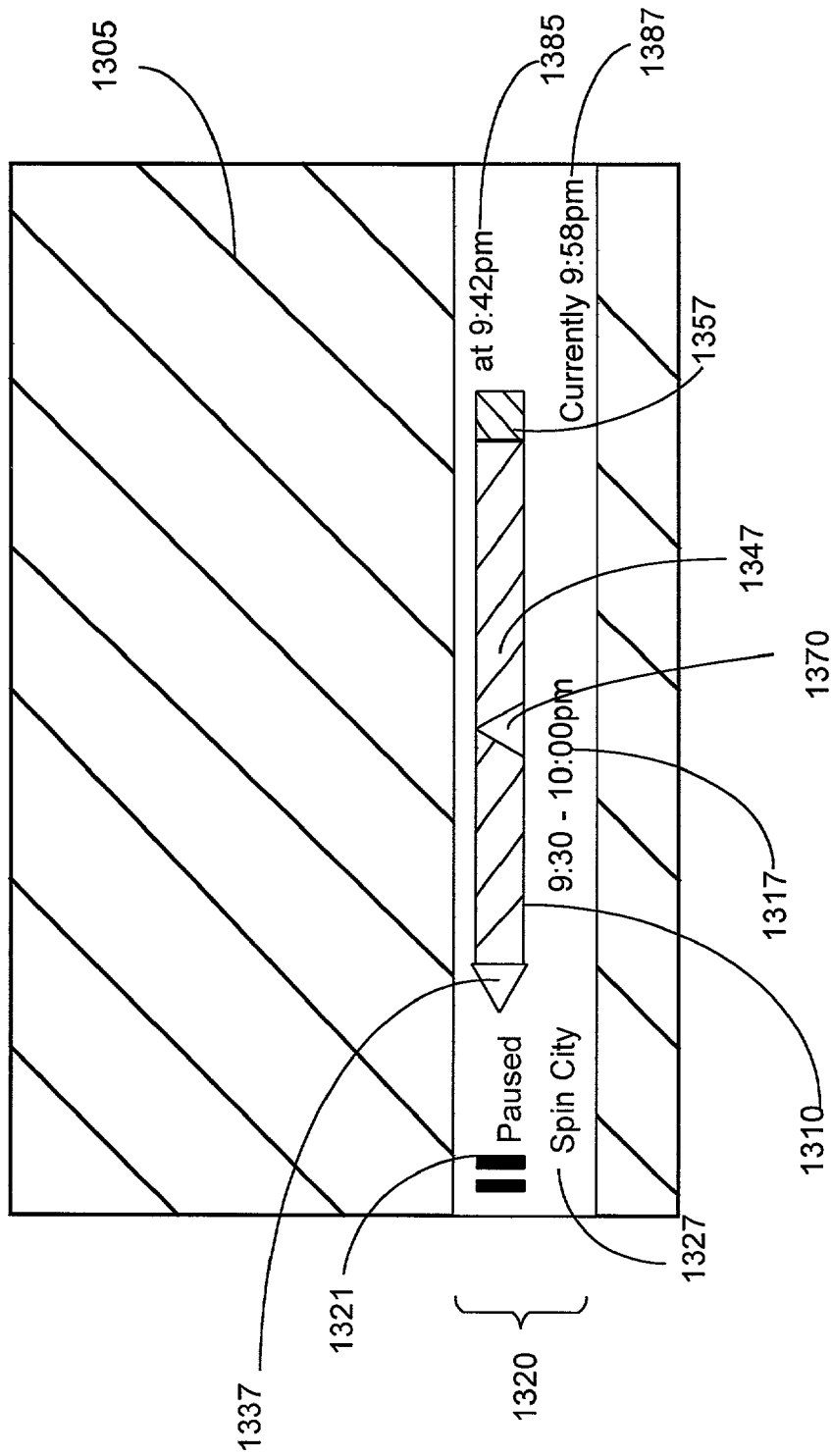
FIG. 20 is a screen diagram of an example user interface screen display depicting a progress bar for the most recent media content instance after rewinding and then pausing, in accordance with one embodiment of the invention.
Figure 21:
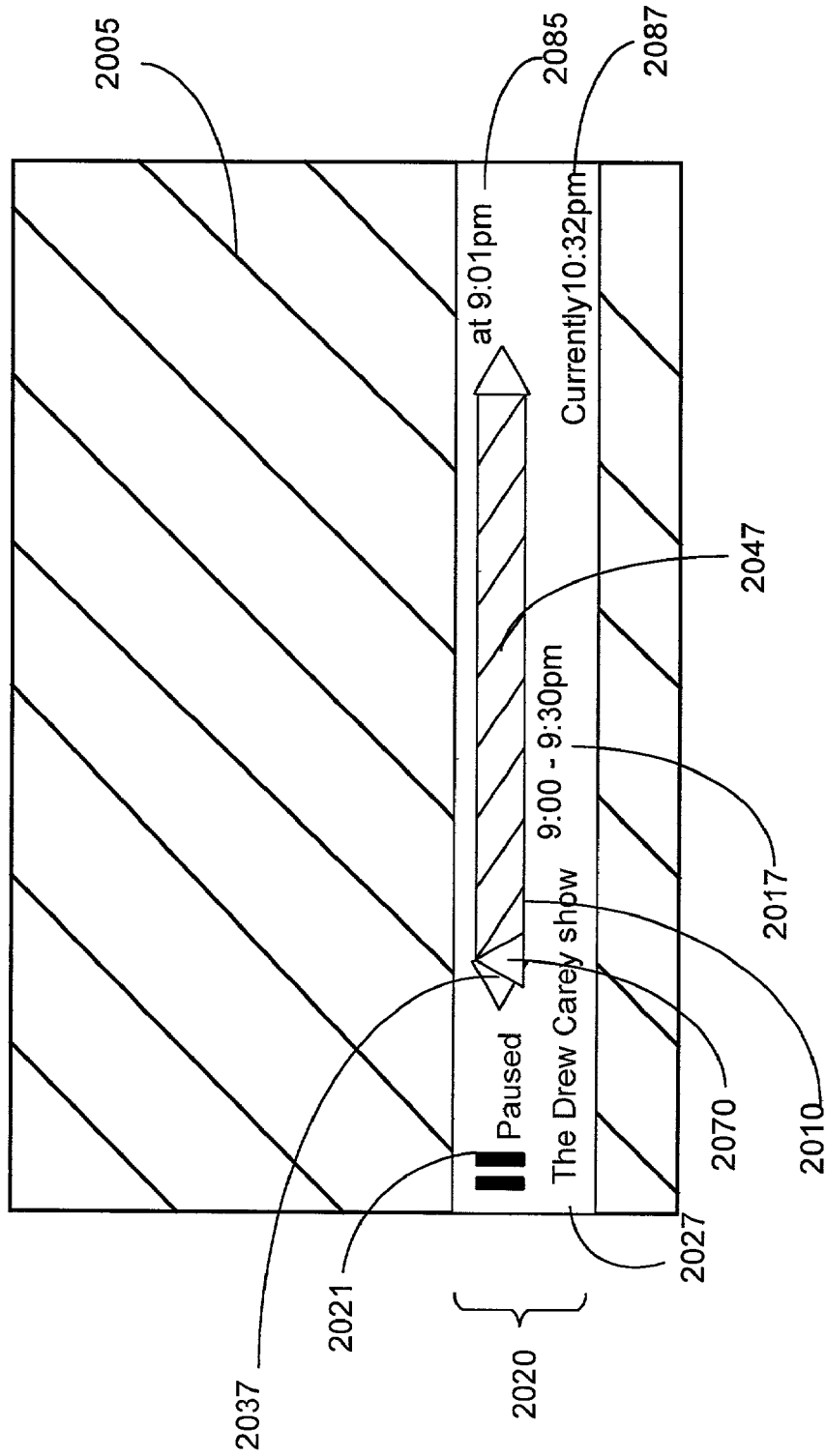
FIG. 21 is a screen diagram of an example user interface screen display depicting the progress bar for a media content instance buffered into the time shift buffer before the media content instance display depicted in FIG. 20 and after rewinding it 30 minutes or the whole media content instance length, in accordance with one embodiment of the invention.
Figure 22:
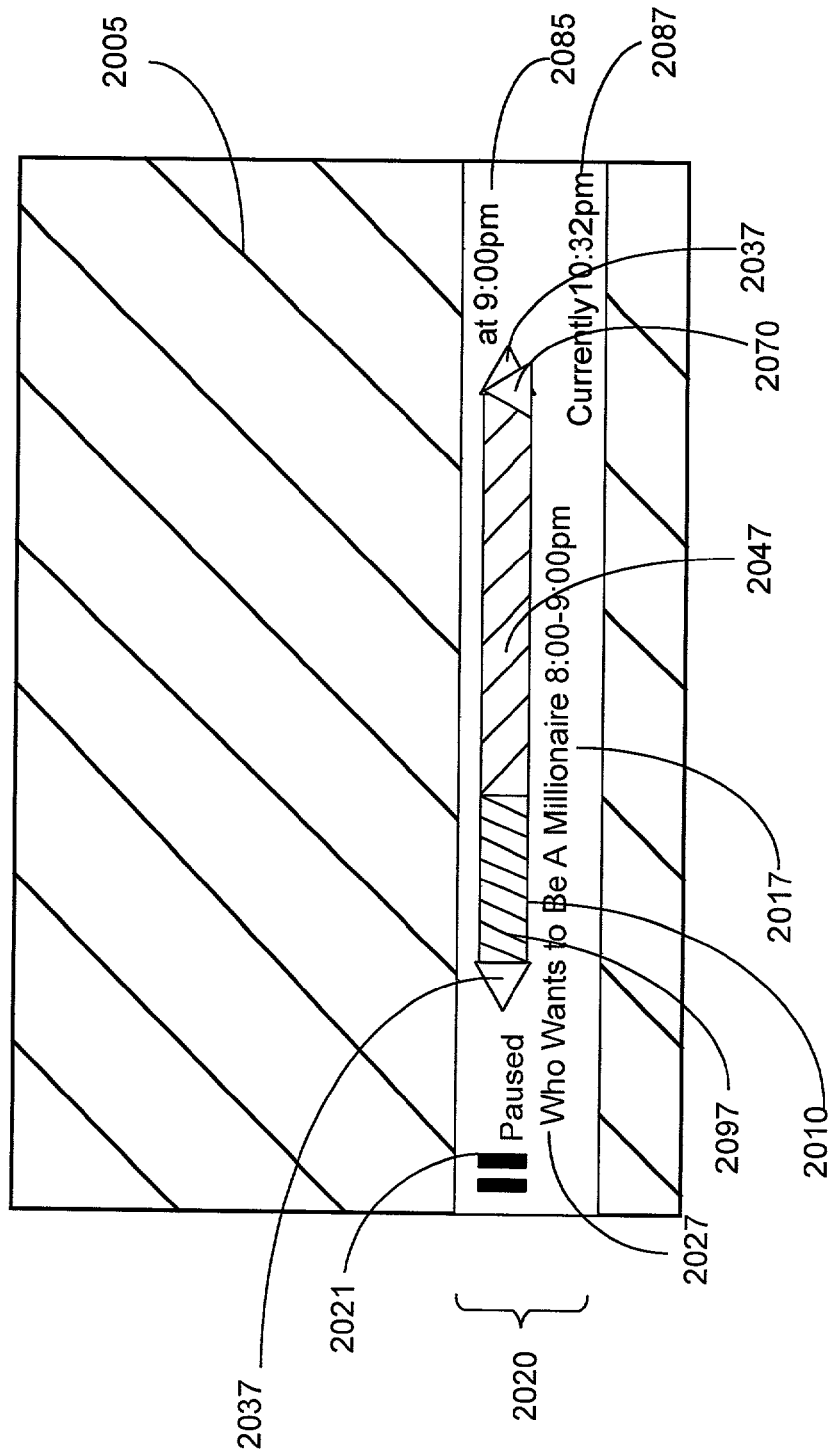
FIG. 22 is a screen diagram of an example user interface screen display depicting the progress bar for a media content instance buffered into the time shift buffer before the media content instance referenced in FIG. 21, where no rewinding of this media content instance has occurred, in accordance with one embodiment of the invention.

The PVR application 377 provides a user interface that assists the user in navigating to, and between, buffered media content instances. Specifically, the user interface provides a display of the user's current position in a buffered media content instance (e.g. TV program or show) relative to the currently viewed time-shifted media content instance. The currently viewed, time shifted media content instance length is represented by a "progress bar" displayed on the bottom of the screen. Thus, the "progress bar" indicates the media content instance time boundaries, and is labeled with the media content instance information, as will be described below. FIGS. 20-22 are screen diagrams that illustrate an example user interface screen display that can be presented on, for example, a television or other display device. These example screen displays depict a progression through three media content instances of a TSB 378, including a short rewind between the beginning of one media content instance and the end of the media content instance before it. During rewind of the TSB 378, one or more media content instances may be available for playback or permanent recording depending on the length of time the channel was tuned. FIG. 20 is an example screen display of the most recent media content instance after rewinding 16 minutes and then pausing. A pause banner 2020 and progress bar 2010 are overlaid on top of a display of a media content instance. The media content instance display area is depicted as closely hashed lines 2005. Pause banner 2020 includes pause icon 2021, and time status 2085 indicating the location in the buffered media content instance. Current time 2087 indicates the current time of day. Title portion 2027 indicates the title of the buffered media content instance associated with the current progress bar 2010. The progress bar 2010 shows progression, in terms of buffer space, through a media content instance as the viewer moves, or navigates, through it. Although depicted as a media content instance specific indicator, other embodiments are contemplated, including, but not limited to, indicators of the entire time shift buffer capacity. Media content instance time 2017 indicates the scheduled media content instance start and end time. Bar arrow 2037 represents that there are more buffered media content instances available. The bar arrow 2037 suggests that these other buffered media content instances can be accessed by, for example, rewinding to them. First portion 2047 (depicted with hash lines) indicates the amount of the current media content instance that is buffered (i.e. written to the TSB 378, FIG. 3A). Thus, first portion 2047 provides the user with an indication as to what portion of the current media content instance is available for rewinding and fast-forwarding. Second portion 2057 (indicated with reverse hash lines) indicates that the media content instance is not over, as indicated also by the current time 2087 in the media content instance (i.e. 9:58 pm). For example, the user has rewound for 16 minutes. From the current time 2087, that places the status arrow 2070 at 9:58 minus 16 minutes, or at 9:42 within the buffered media content instance Spin City, which is reflected by time status 2085. In other words, if the user had entered into the room at 9:42, the screen display would show the same media content instance "snap-shot" as it does now. If the user wants to permanently record, the user preferably selects the record button 390 on the remote device 380 (FIG. 16).

The next example screen display, as depicted in FIG. 21, is of a display of a media content instance buffered into the TSB 377 before the most recent one (FIG. 20) and after rewinding it 30 minutes or the whole media content instance length. As noted by title portion 2027 and status arrow 2070 and time status 2085, the user has rewound to approximately the beginning of The Drew Carey Show. The first portion 2047 indicates that the entire show was buffered into the TSB 378. Bar arrows 2037 on each end of the progress bar 2010 suggest to the user that there are buffered media content instances accessible before and after The Drew Carey Show. Note current time 2087 of 10:32 PM, further illustrating the ability of the PVR application 377 to access and permanently record buffered media content instances. To permanently record, the user preferably selects the record button 390 on the remote control device 380 (FIG. 16) at any point within the Drew Carey Show. Alternatively, the user can select the record button 390 while the media content instance is paused.

The next example screen display depicted in FIG. 22 is of the display of a media content instance just before the media content instance display shown in FIG. 21. No rewinding of this media content instance has occurred yet, as indicated by status arrow 2070 and the time status 2085. As noted by the title portion 2027, this buffered media content instance is Who Wants To Be A Millionaire. Note that the progress bar 2010 shows only one bar arrow 2037 on the right hand side, illustrating the fact that there are no other media content instances buffered in the TSB 378 before Who Wants To Be A Millionaire. Also note that unavailable portion 2097 indicates the amount of the media content instance that is unavailable to permanently record or view. It would be unavailable, for example, if the channel with this media content instance were not tuned during this time. Again, to permanently record, the user preferably selects the record button 390 on the remote control device 380 (FIG. 16) during any point in Who Wants To Be A Millionaire.

As an alternative to rewinding to the media content instance in the TSB 378 desired for permanent recording, a user interface screen may be presented that lists the media content instances currently in the TSB 378, with a mechanism to select which of these media content instances the user desires to permanently record (i.e. make permanent, not part of the TSB 378). The list of media content instances can be ascertained from the media content instance guide data.

The PVR application 377 may be implemented to manage and maintain a substantially constant buffer space capacity (and in a large enough buffer space, a substantially constant buffer space) in the storage device 373, or in any memory-type device, such as RAM, DRAM, or related memory. Further, the scope of the preferred embodiment is not meant to be limited to downloads of content through cache transfers between the storage device 373 and system memory 349, but may include direct downloads to system memory 349 alone, or to the storage device 373 alone.

The PVR application 377 can be implemented in hardware, software, firmware, or a combination thereof. In the preferred embodiment(s), the PVR application 377 is implemented in software or firmware that is stored in a memory and that is executed by a suitable instruction execution system. If implemented in hardware, as in an alternative embodiment, the PVR application 377 may be implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

The PVR application 377, which comprises an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

It should be emphasized that the above-described embodiments of the present invention, particularly, any "preferred embodiments" are merely possible examples of implementations, merely setting forth a clear understanding of the principles of the inventions. Many variations and modifications may be made to the above-described embodiments of the invention without departing substantially from the spirit of the principles of the invention. All such modifications and variations are intended to be included herein within the scope of the disclosure and present invention and protected by the following claims.

Therefore, having thus described the invention, at least the following is claimed:

1. A system for managing the allocation and storage of media content instance files in a hard disk of a storage device coupled to a media client device in a subscriber television system, comprising:
    a memory for storing logic;
    a buffer space in the hard disk for buffering media content instances as buffered media content instance files; and
    a processor configured with the logic to track the size of permanent media content instance files and the buffered media content instance files to provide a visual indication of an amount of available free space, such that the indication is independent of the buffer space.

2. The system of claim 1, wherein the processor is further configured with the logic to provide a user interface, responsive to a user input, wherein the user interface provides the indication of available free space for permanently recording media content instances, wherein the permanently recorded media content instances are configured as the permanently recorded media content instance files.

3. The system of claim 2, wherein the permanently recorded media content instance files can be deleted from the storage device.

4. The system of claim 2, wherein the permanently recorded media content instances are from the buffer space.

5. The system of claim 2, wherein the permanently recorded media content instances are a scheduled recording initially written to non-buffer space.

6. The system of claim 1, wherein the buffer space, the available free space, and a permanently recorded space are located on the hard disk.

7. The system of claim 1, wherein the buffer space and a permanently recorded space are allocated from the free space on the hard disk.

8. The system of claim 1, wherein the buffer space and a permanently recorded space have physical locations on the hard disk.

9. The system of claim 1, wherein the buffer space and the available free space is measured in units of time.

10. The system of claim 1, wherein the buffer space and the available free space is measured in units of hard disk space.

11. The system of claim 1, wherein the processor is further configured with the logic to convert analog broadcast media content instances, received at a communications interface, into digitally compressed media content instances stored in a buffer.

12. The system of claim 1, wherein the processor is further configured with the logic to convert an analog signal received at a connector from a consumer electronics device to a digitally compressed signal, and buffer the digitally compressed signal as a digitally compressed media content instance.

13. The system of claim 1, wherein the processor is further configured with the logic to buffer digital broadcast media content instances, received at a communications interface, as digitally compressed media content instances.

14. The system of claim 1, wherein the processor is further configured with the logic to buffer digital media-on-demand media content instances, received at a communications interface from a remote server, as digitally compressed media content instances.

15. The system of claim 1, wherein the processor is further configured with the logic to buffer digital media content instances, received at a digital communications port from a local network, as digitally compressed media content instances.

16. The system of claim 1, wherein the processor is further configured with the logic to buffer digital media content instances, received at a digital communications port from a local device, as digitally compressed media content instances.

17. The system of claim 1, wherein the processor is further configured with the logic to determine the available free space after subtracting buffer space capacity from total disk space.

18. The system of claim 1, wherein the processor is configured with the logic to reduce the available free space by the amount of the space used for the permanent media content instance files.

19. The system of claim 1, wherein the processor is configured with the logic to increase the available free space by the amount of the space recovered from a deleted permanent media content instance file.

20. The system of claim 1, wherein the indication of the free space available is configured in time of space available for the permanent media content instance files.

21. The system of claim 1, wherein the free space indication is unaffected by writes to and deletions from the buffer space.

22. The system of claim 1, wherein the processor is further configured with the logic to provide an indication that insufficient free space is available for a requested recording.

23. A method for managing the allocation and storage of media content instance files in a disk of a storage device coupled to a media client device in a subscriber television system, comprising the steps of:
  buffering media content instances into buffer space of the storage device as buffered media content instance files;
  tracking the size of permanent media content instance files and buffered media content instance files; and
  providing a visual indication of an amount of available free space of the storage device, such that the indication is independent of the buffer space.

24. The method of claim 23, further comprising the step of providing a user interface, responsive to a user input, wherein the user interface provides the indication of available free space for permanently recording media content instances, wherein the permanently recorded media content instances are configured as the permanently recorded media content instance files.

25. The method of claim 24, wherein the permanently recorded media content instance files can be deleted from the storage device.

26. The method of claim 24, wherein the user input is implemented with a remote control device.

27. The method of claim 24, wherein the permanently recorded media content instances are from the buffer space.

28. The method of claim 24, wherein the permanently recorded media content instances are a scheduled recording initially written to non-buffer space.

29. The method of claim 23, wherein the buffer space, the available free space, and permanently recorded space are located on the disk of the storage device.

30. The method of claim 23, wherein the buffer space and permanently recorded space are allocated from the free space on the disk of the storage device.

31. The method of claim 23, wherein the buffer space and permanently recorded space have physical locations on the disk of the storage device.

32. The method of claim 23, wherein the buffer space and the available free space is measured in units of time.

33. The method of claim 23, wherein the buffer space and the available free space is measured in units of disk space of the storage device.

34. The method of claim 23, further comprising the step of converting analog broadcast media content instances, received at a communications interface, in digitally compressed media content instances, and buffering the digitally compressed media content instances as digitally compressed media content instances.

35. The method of claim 23, further comprising the step of converting an analog signal received at a connector from a consumer electronics device to a digitally compressed signal, and buffering the digitally compressed signal as a digitally compressed media content instance.

36. The method of claim 23, further comprising the step of buffering digital broadcast media content instances, received at a communications interface, as digitally compressed media content instances.

37. The method of claim 23, further comprising the step of buffering digital media-on-demand media content instances, received at a communications interface from a remote server, as digitally compressed media content instances.

38. The method of claim 23, further comprising the step of buffering digital media content instances, received at a digital communications port from a local network, as digitally compressed media content instances.

39. The method of claim 23, further comprising the step of buffering digital media content instances, received at a digital communications port from a local device, as digitally compressed media content instances.

40. The method of claim 23, further comprising the step of determining the available free space after subtracting buffer space capacity from total disk space of the storage device.

41. The method of claim 23, further comprising the step of reducing the available free space by the amount of the space used for the permanent media content instance files.

42. The method of claim 23, further comprising the step of increasing the available free space by the amount of the space recovered from deleted permanent media content instance files.

43. The method of claim 23, further comprising the step of configuring the indication of the free space available in time of space available for the permanent media content instance files.

44. The method of claim 23, wherein the indication of the free space available is unaffected by writes to and deletions from the buffer space.

* * * * *